(12) United States Patent
Ono et al.

(10) Patent No.: US 11,506,527 B2
(45) Date of Patent: Nov. 22, 2022

(54) SENSOR, DETECTION METHOD, AND SENSOR MANUFACTURING METHOD

(71) Applicants: MITSUI CHEMICALS, INC., Tokyo (JP); TOHOKU UNIVERSITY, Sendai (JP)

(72) Inventors: Takahito Ono, Sendai (JP); Masaya Toda, Sendai (JP); Mai Kurihara, Sodegaura (JP)

(73) Assignees: MITSUI CHEMICALS, INC., Tokyo (JP); TOHOKU UNIVERSITY, Sendai (JP)

( * ) Notice: Subject to any disclaimer, the term of this patent is extended or adjusted under 35 U.S.C. 154(b) by 328 days.

(21) Appl. No.: 16/975,275

(22) PCT Filed: Mar. 11, 2019

(86) PCT No.: PCT/JP2019/009577
§ 371 (c)(1),
(2) Date: Aug. 24, 2020

(87) PCT Pub. No.: WO2019/188164
PCT Pub. Date: Oct. 3, 2019

(65) Prior Publication Data
US 2020/0400478 A1 Dec. 24, 2020
US 2022/0228898 A2 Jul. 21, 2022

(30) Foreign Application Priority Data

Mar. 29, 2018 (JP) .............................. JP2018-063978
Mar. 29, 2018 (JP) .............................. JP2018-063987

(51) Int. Cl.
*G01F 22/02* (2006.01)
(52) U.S. Cl.
CPC ................................... *G01F 22/02* (2013.01)

(58) Field of Classification Search
None
See application file for complete search history.

(56) References Cited

U.S. PATENT DOCUMENTS 5,323,636 A * 6/1994 McGowan ........... G01N 29/022
73/24.01
7,500,379 B2 * 3/2009 Hines ................. G01N 29/2481
73/24.01

(Continued)

FOREIGN PATENT DOCUMENTS

| JP | 5083984 B2 | 11/2012 |
| WO | 03/102218 A2 | 12/2003 |
| WO | 2013157581 A1 | 10/2013 |

OTHER PUBLICATIONS

International Search Report (PCT/ISA/210) dated Apr. 23, 2019, by the Japan Patent Office as the International Searching Authority for International Application No. PCT/JP2019/009577, and an English translation of the International Search Report.

(Continued)

*Primary Examiner* — Peter J Macchiarolo
*Assistant Examiner* — Jermaine L Jenkins
(74) *Attorney, Agent, or Firm* — Buchanan Ingersoll & Rooney PC

(57) ABSTRACT

A sensor includes a body member, a volume change body, and a detection member. The body member has a flat plate-like shape, a first end in a first direction being supported, and a storage space opening at at least one of both end faces in a thickness direction. The volume change body, whose volume changes depending on an amount of a target, is supported by the body member so that at least a part of the volume change body is stored in the storage space. The detection member is in contact with a second end in the first (Continued)

direction of the body member, and detects stress caused by the change in the volume of the volume change body.

20 Claims, 37 Drawing Sheets

(56) References Cited

U.S. PATENT DOCUMENTS

| | | | |
|---|---|---|---|
| 8,136,403 B2 * | 3/2012 | Seppa | G01N 29/022 73/504.05 |
| 2003/0010097 A1 | 1/2003 | Porter et al. | |
| 2004/0223884 A1 | 11/2004 | Chen et al. | |
| 2014/0134607 A1 | 5/2014 | Lin et al. | |
| 2014/0352447 A1 | 12/2014 | Yoshikawa et al. | |

OTHER PUBLICATIONS

Written Opinion (PCT/ISA/237) dated Apr. 23, 2019, by the Japan Patent Office as the International Searching Authority for International Application No. PCT/JP2019/009577.

* cited by examiner

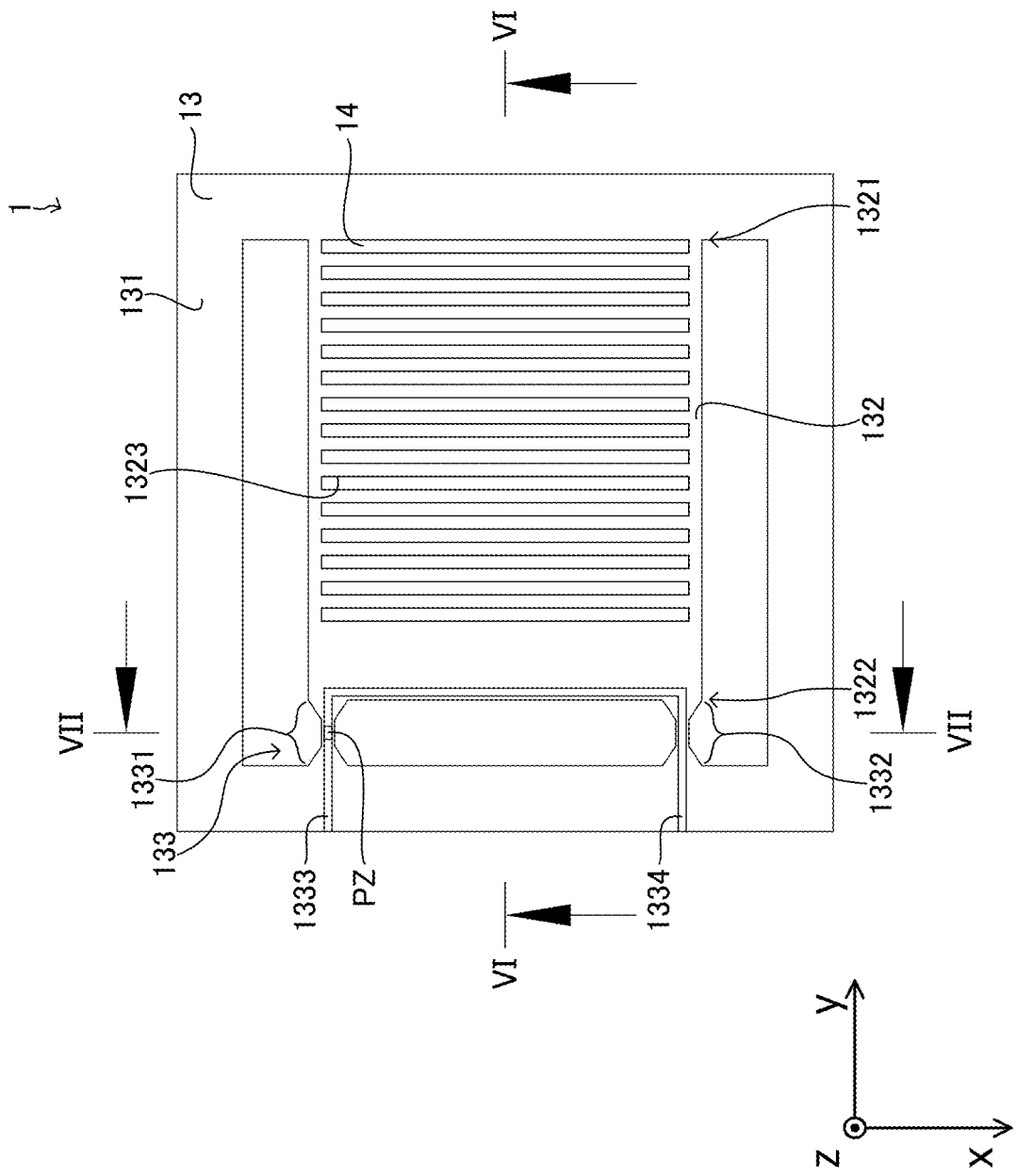

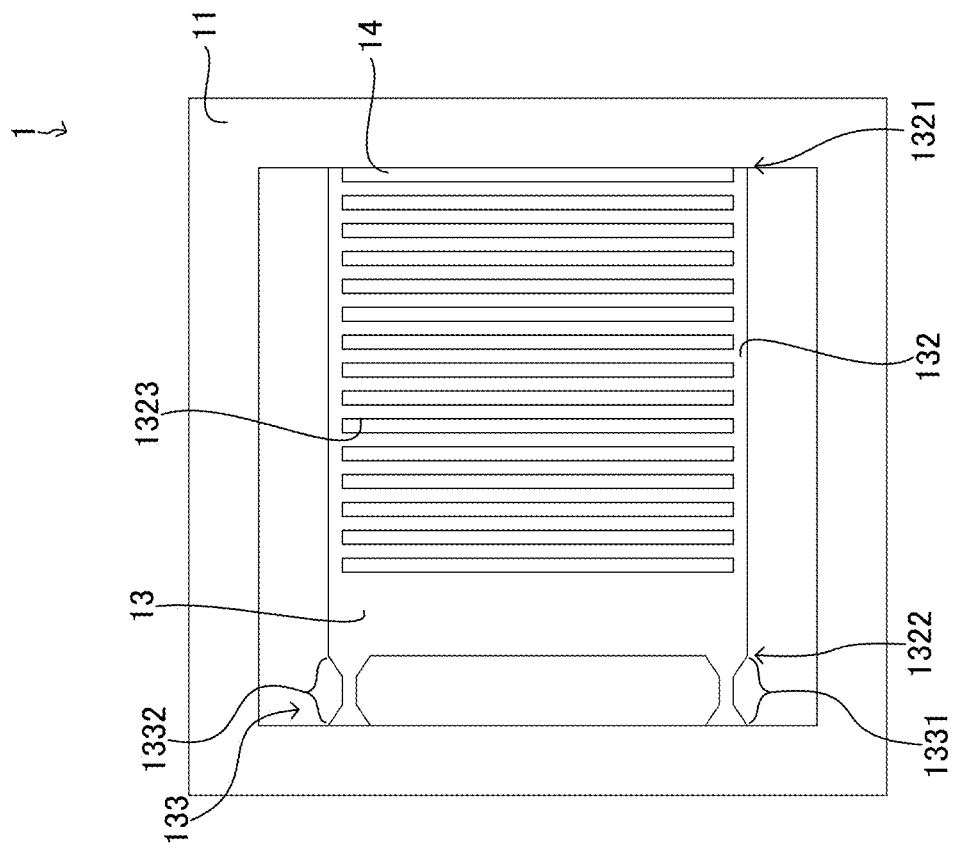

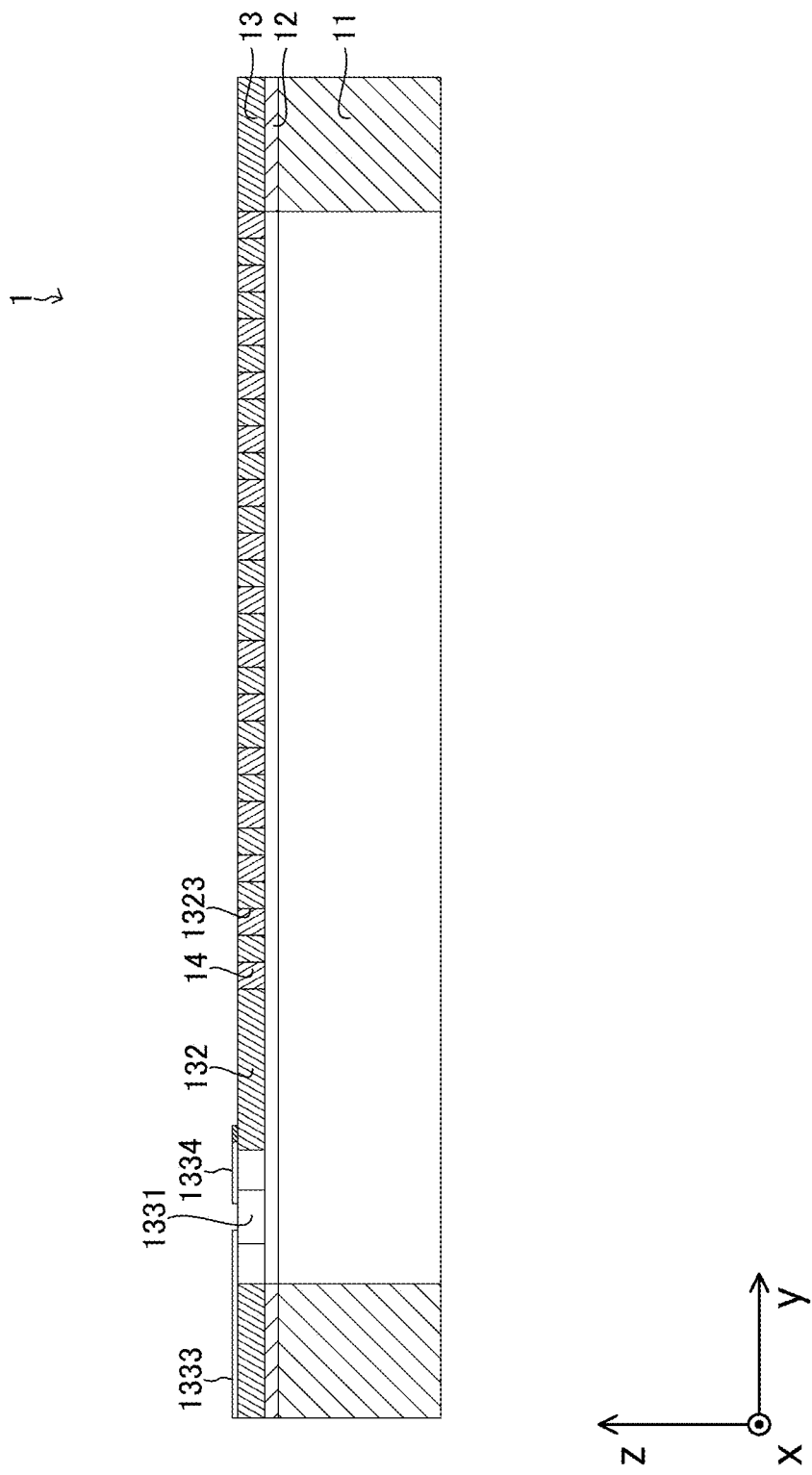

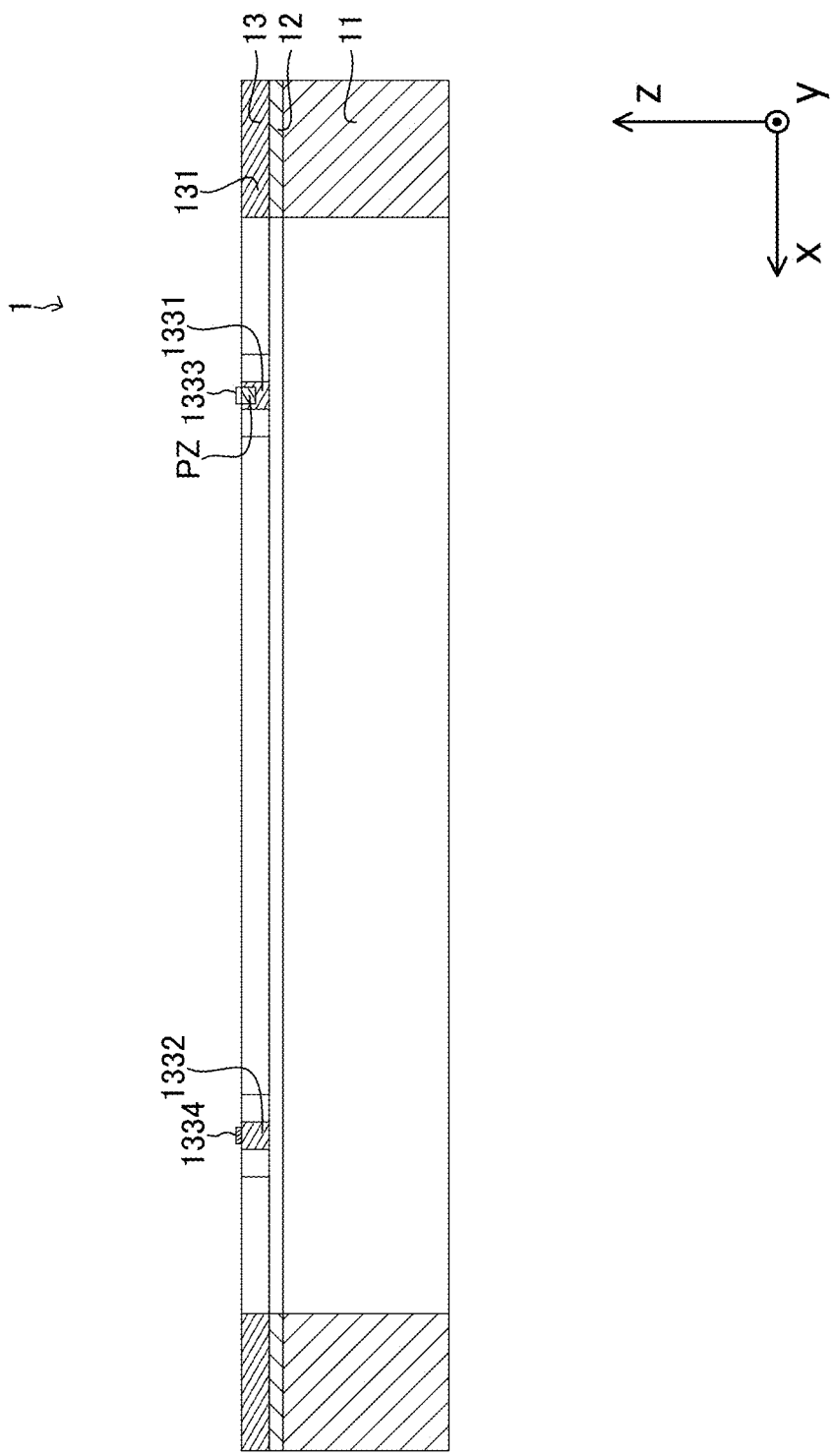

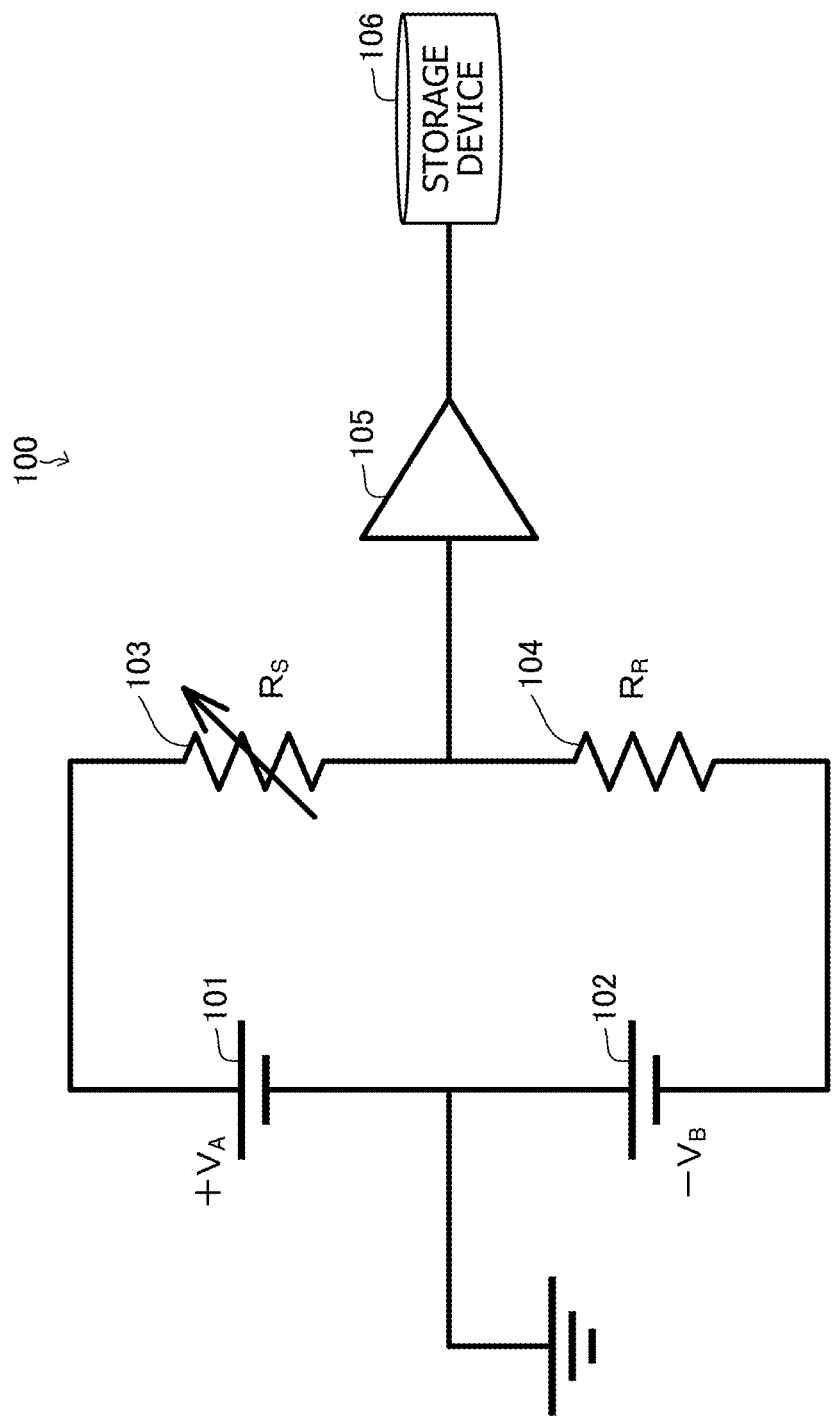

SENSOR, DETECTION METHOD, AND SENSOR MANUFACTURING METHOD

CROSS-REFERENCE TO RELATED APPLICATION

This application is a continuation application of International Application PCT/JP2019/9577, filed on Mar. 11, 2019 and designated the U.S., the entire contents of which are incorporated herein by reference.

FIELD

The present invention relates to a sensor, a detection method, and a sensor manufacturing method.

BACKGROUND

One of the known sensors has a volume change body, whose volume changes depending on the amount of a target (for example, molecules that constitute a gas or a liquid), and detects stress caused by the change in the volume of the volume change body. For example, the sensor described in Patent Literature 1 has a body member, the volume change body, and a detection member. The body member has a flat plate-like shape. The volume change body changes in the volume by receiving the target and covers both end faces in the thickness direction of the body member. The detection member, whose tip is supported, extends from the end of the body member. The detection member includes a piezoresistive element and detects the stress caused by the change in the volume of the volume change body.

CITATION LIST

Patent Literature

Patent Literature 1: International Publication No. WO2013/157581

SUMMARY

By the way, in the above sensor, the stress in the thickness direction of the body member may be caused by, for example, the variation in the amount of the target received by the volume change body. In this case, the body member may be bent. As a result, there is a possibility that the change in the volume of the volume change body may not be reflected with high accuracy in the stress occurred in the detection member. In other words, the sensor may not be able to detect the target with high accuracy.

An object of the present invention is to detect the target with high accuracy.

In one aspect, a sensor comprising: a body member that has a flat plate-like shape, a first end in a first direction being supported, and a storage space opening at at least one of end faces in a thickness direction; a volume change body, whose volume changes depending on an amount of a target, that is supported by the body member so that at least a part of the volume change body is stored in the storage space; and a detection member that is in contact with a second end in the first direction of the body member and detects stress caused by the change in the volume of the volume change body.

In another aspect, a detection method including: changing a volume of a volume change body depending on an amount of a target, the volume change body being supported by a body member so that at least a part of the volume change body is stored in a storage space, the body member having a flat plate-like shape, a first end in a first direction being supported, and the storage space opening at at least one of end faces in a thickness direction; and detecting stress caused by the change in the volume of the volume change body in a detection member that is in contact with a second end in the first direction of the body member.

In another aspect, a sensor manufacturing method including: forming a storage space in a first member, the first member having a flat plate-like shape and a first end in a first direction being supported, the storage space opening at at least one of end faces in a thickness direction, and providing an element in a second member in contact with a second end in the first direction of the first member, the element detecting stress; and storing at least a part of the volume change body, whose volume changes depending on an amount of a target, in the storage space so as to be supported by the first member.

The target can be detected with high accuracy.

BRIEF DESCRIPTION OF DRAWING

FIG. 4 is a plan view of the sensor of the first embodiment;

FIG. 5 is a bottom view of the sensor of the first embodiment;

FIG. 6 is a cross-sectional view of the sensor cut by a plane represented by a VI-VI line of FIG. 4;

FIG. 7 is a cross-sectional view of the sensor cut by a plane represented by a VII-VII line in FIG. 4;

FIG. 8 is a block diagram illustrating an electric circuit to which the sensor of the first embodiment is connected;

DESCRIPTION OF EMBODIMENTS

Each of the embodiments relating to the sensor, detection method, and sensor manufacturing method of the present invention will be described below with reference to FIGS. 1 to 37.

First Embodiment (Overview)

A sensor of a first embodiment includes a body member, a volume change body, and a detection member.

The body member has a flat plate-like shape, a first end in a first direction being supported, and a storage space opening at at least one of both end faces in a thickness direction.

The volume change body, whose volume changes depending on an amount of a target, is supported by the body member so that at least a part of the volume change body is stored in the storage space.

The detection member is in contact with a second end in the first direction in the body member, and detects stress caused by the change in the volume of the volume change body.

According to the sensor, since the volume change body is stored in the storage space, the occurrence of stress in the thickness direction of the body member can be suppressed even when the volume of the volume change body changes. This can prevent the body member from bending. Therefore, the occurrence of stress in the thickness direction of the body member at the second end can be suppressed. As a result, the change in the volume of the volume change body can be reflected with high accuracy in the stress, which occurs at the second end, in the direction along the body member. In other words, the sensor can detect the target with high accuracy.

Next, the sensor of the first embodiment will be described in detail.

(Configuration)

Hereinafter, as illustrated in FIGS. 1 to 7, the sensor 1 of the first embodiment will be described using a right-handed orthogonal coordinate system having an x-axis, a y-axis, and a z-axis. In this specification, the same coordinate system is used in FIGS. 11 to 14 and FIGS. 24 to 37 described later.

The sensor 1 detects the target. For example, the target is molecules that constitute a gas, a liquid, or a solid. Further, for example, the target is molecules that constitute a mixture of at least two of a gas, a liquid, and a solid. Further, for example, the target is fine particles, temperature, humidity, electromagnetic wave, or the like.

In this example, the x-axis direction, the y-axis direction, and the z-axis direction may be represented as the left-right direction of the sensor 1, the front-back direction of the sensor 1, and the up-down direction of the sensor 1, respectively. In this example, the positive direction of the x-axis, the negative direction of the x-axis, the positive direction of the y-axis, the negative direction of the y-axis, the positive direction of the z-axis, and the negative direction of the z-axis are the right direction of the sensor 1, the left direction of sensor 1 the front direction of the sensor 1, the back direction of the sensor 1, the up direction of the sensor 1, and the down direction of the sensor 1, respectively.

Figure 1:
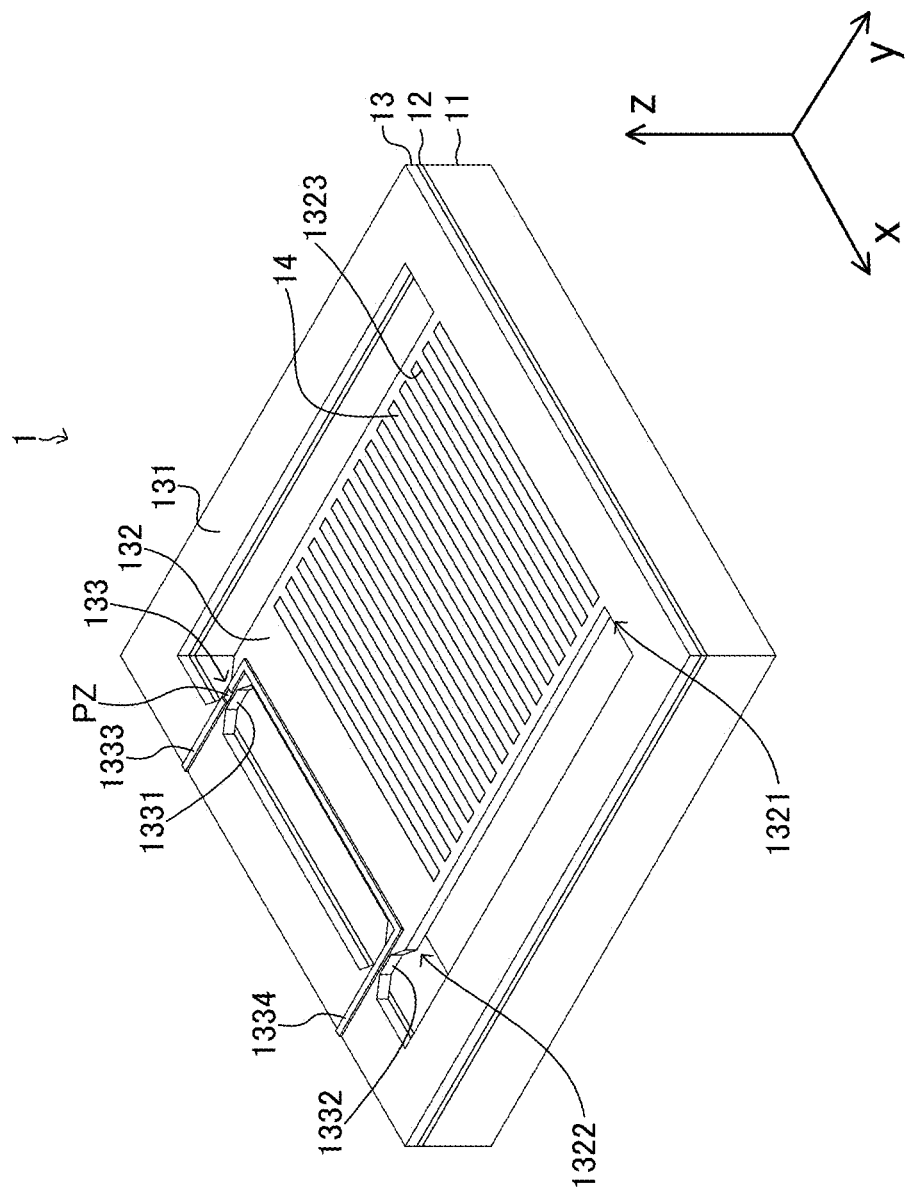
FIG. 1 is a right front upper perspective view of a sensor of a first embodiment.
Figure 2:
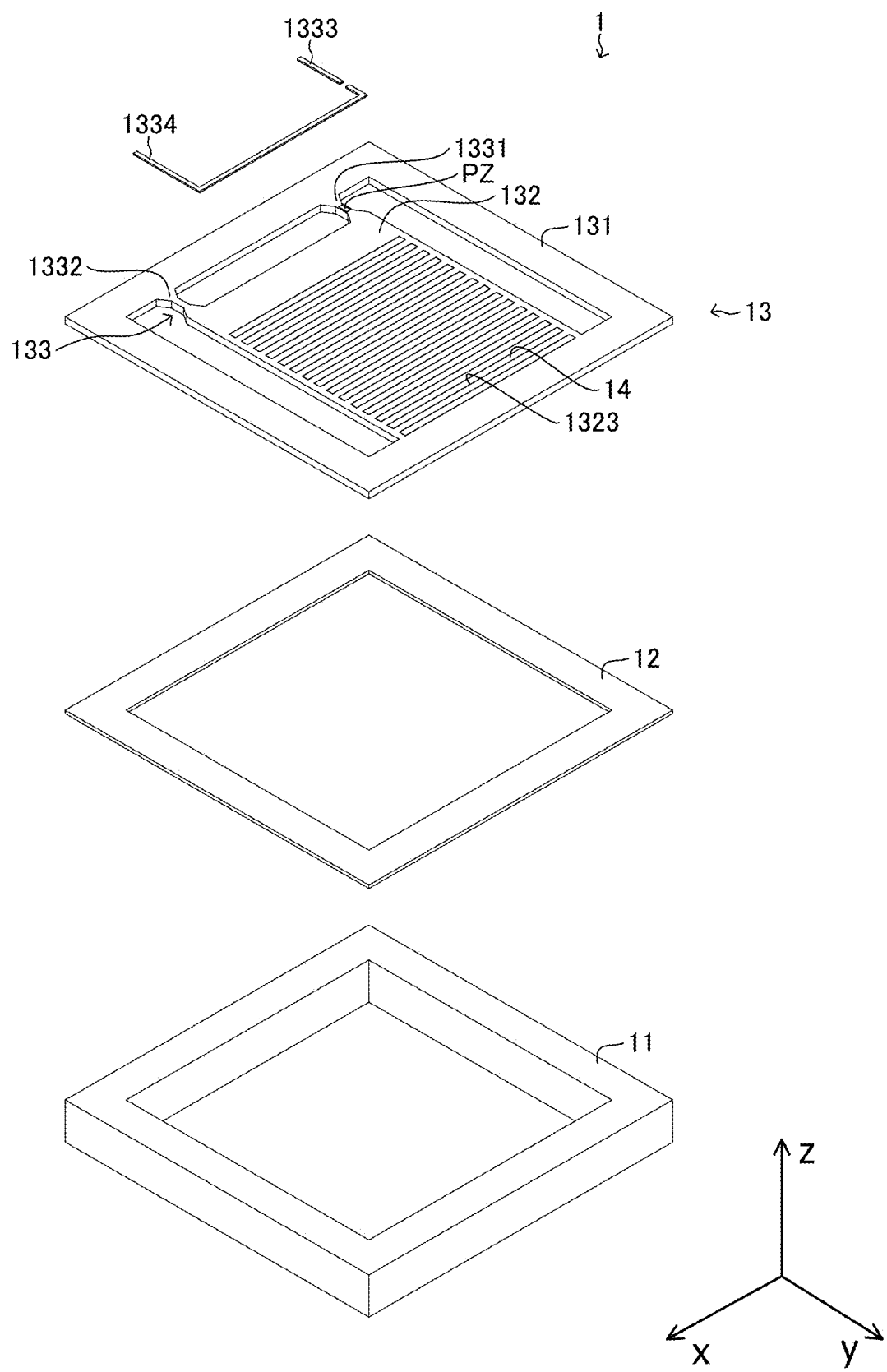
FIG. 2 is a right front upper perspective view of the sensor in a state where the sensor of the first embodiment is disassembled.
Figure 3:
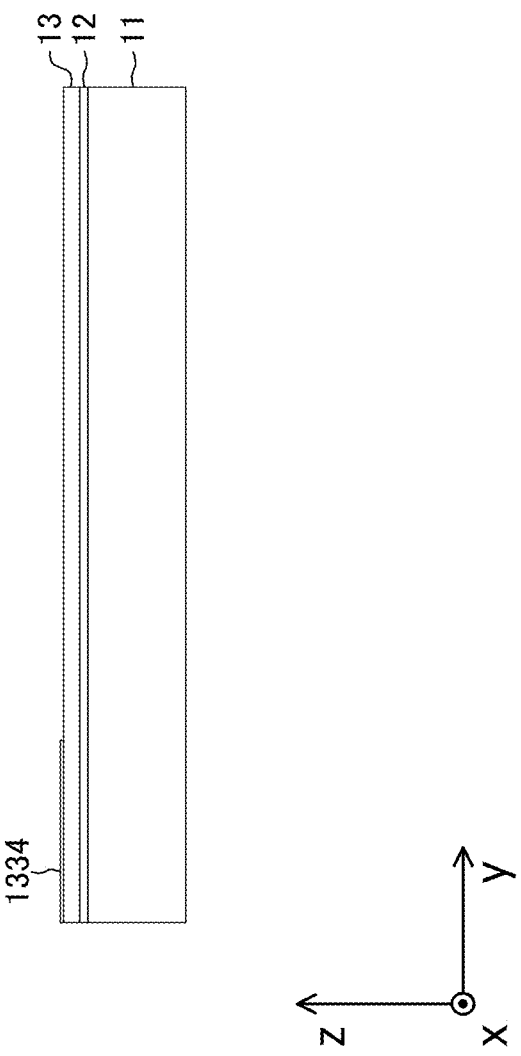
FIG. 3 is a right side view of the sensor of the first embodiment.

FIG. 1 is a view of the sensor 1 from the position to right of the sensor 1, in front of the sensor 1, and above the sensor 1 (in other words, right front upper perspective view). FIG. 2 is a right front upper perspective view of the sensor 1 in a state where the sensor is disassembled. FIG. 3 is a view of the sensor 1 from right side of the sensor 1 (in other words, right side view).

FIG. 4 is a view of the sensor 1 from above the sensor 1 (in other words, a plan view). FIG. 5 is a view of the sensor 1 from below the sensor 1 (in other words, a bottom view). FIG. 6 is a view of the cross section of the sensor 1 cut by a plane represented by a VI-VI line in FIG. 4 as viewed in the negative direction of the x-axis. FIG. 7 is a view of the cross section of the sensor 1 cut by a plane represented by a VII-VII line in FIG. 4 as viewed in the negative direction of the y-axis.

As illustrated in FIG. 1, the sensor 1 has a pillar-like shape extending in the z-axis direction. In this example, the cross section of the sensor 1 cut by the plane orthogonal to the z-axis (in other words, an xy-plane) has a square-like shape. The cross section of the sensor 1 cut by the xy-plane may have a shape (for example, a circular-like, elliptical-like, or rectangular-like shape) different from the square-like shape.

For example, the length of a side of the cross section of the sensor 1 cut by the xy-plane is a length of 50 µm to 5 mm. In this example, the length of a side of the cross section of the sensor 1 cut by the xy-plane is 500 µm. For example, the sensor 1 may be manufactured using a technique called microfabrication or nanofabrication.

The sensor 1 includes a first layered body 11, a second layered body 12, a third layered body 13, and a volume change body 14. The first layered body 11, the second layered body 12, and the third layered body 13 are laminated so as to be arranged in this order in the z-axis direction. In other words, the second layered body 12 is in contact with the first layered body 11, and the third layered body 13 is in contact with the second layered body at the opposite side of the first layered body 11. In other words, the second layered body 12 is sandwiched between the first layered body 11 and the third layered body 13.

For example, the first layered body 11 has a thickness of 0.5 μm to 50 μm, the second layered body 12 has a thickness of 0.05 μm to 5 μm, and the third layered body 13 has a thickness of 50 μm to 5 mm. In this example, the thickness of the first layered body 11 is 5 μm, the thickness of the second layered body 12 is 0.5 μm, and the thickness of the third layered body 13 is 500 μm.

In this example, the first layered body 11 is made of silicon. As illustrated in FIGS. 1 and 2, the first layered body 11 has a hollow pillar-like shape that extends in the z-axis direction and opens at both end faces in the z-axis direction.

In this example, the second layered body 12 is made of silicon dioxide. As illustrated in FIGS. 1 and 2, the second layered body 12 has a flat plate-like shape. The second layered body 12 has a hole that opens at both end faces in the z-axis direction of the second layered body 12. In this example, the cross section of the second layered body 12 cut by the xy-plane has the same shape as the cross section of the first layered body 11 cut by the xy-plane.

In this example, the third layered body 13 is made of silicon. As illustrated in FIGS. 1 and 2, the third layered body 13 has a flat plate-like shape. In this example, the exposed surface of the third layered body 13 is covered with an insulator thin film (not illustrated).

The third layered body 13 includes a frame 131, a body member 132, and a detection member 133.

The frame 131 has a hole that opens at both end faces in the z-axis direction of the frame 131. In this example, the cross section of the frame 131 cut by the xy-plane has the same shape as the cross section of the first layered body 11 cut by the xy-plane.

As illustrated in FIG. 4, the body member 132 has a rectangular-like shape having long sides extending in the y-axis direction and short sides extending in the x-axis direction. The body member 132 may have a square-like shape. The length of the body member 132 in the y-axis direction is shorter than the length of the hole of the frame 131 in the y-axis direction. In this example, the length of the body member 132 in the y-axis direction is 367 μm. The length of the body member 132 in the x-axis direction is shorter than the length of the hole of the frame 131 in the x-axis direction. In this example, the length of the body member 132 in the x-axis direction is 300 μm. Both ends in the x-axis direction of the body member 132 are separated from the frame 131.

The body member 132 is in contact with the frame 131 at the first end 1321 in the positive direction of the y-axis of the body member 132. In other words, in the body member 132, the first end 1321 in the positive direction of the y-axis of the body member 132 is supported by the frame 131.

Both end portions in the x-axis direction of the second end 1322 in the negative direction of the y-axis of the body member 132 are in contact with the frame 131 through the detection member 133. The central portion in the x-axis direction of the second end 1322 in the negative direction of the y-axis of the body member 132 is separated from the frame 131.

The body member 132 has a space formation portion 1323 that forms a storage space that opens at both end faces in the z-axis direction (in other words, the thickness direction of the body member 132) of the body member 132. The storage space includes slit-like holes extending in the x-axis direction. In this example, each hole included in the storage space is a through hole that penetrates the body member 132 in the z-axis direction. In this example, the holes in the storage space are arranged at equal intervals along the y-axis direction.

For example, the length in the y-axis direction of each hole included in the storage space is a length of 0.1 μm to 10 μm. In this example, the length in the y-axis direction of each hole included in the storage space is 1 μm. For example, the interval in the y-axis direction between the holes included in the storage space has a length of 0.1 μm to 10 μm. In this example, the interval in the y-axis direction between the holes included in the storage space is 1 μm. In this example, the number of the holes included in the storage space is 133. Note that, in FIGS. 1 to 7, the holes included in the storage space are illustrated in an enlarged manner in the y-axis direction. Therefore, in FIGS. 1 to 7, the holes included in the storage space are illustrated in a reduced number manner.

In this example, the length of the slit-like holes included in the storage space in the x-axis direction is 280 μm.

The detection member 133 includes a first supported member 1331, a second supported member 1332, a first wiring 1333, and a second wiring 1334.

As illustrated in FIG. 4, the first supported member 1331 has a strip-like shape extending in the y-axis direction. The end in the negative direction of the y-axis of the first supported member 1331 is in contact with the frame 131. The end in the positive direction of the y-axis of the first supported member 1331 is in contact with the end portion in the negative direction of the x-axis of the second end 1322 of the body member 132. In other words, the first supported member 1331 extends from the second end 1322 of the body member 132 to the negative direction of the y-axis, and the tip of the first supported member 1331 is supported by the frame 131.

The width of the first supported member 1331 (in other words, the length of the first supported member 1331 in the x-axis direction) is narrower than the width of the body member 132 (in other words, the length of the body member 132 in the x-axis direction). The width of the central portion of the first supported member 1331 in an extension direction (the y-axis direction in this example), in which the first supported member 1331 extends, is narrower than the width of each of the end portions in the extension direction of the first supported member 1331.

The first supported member 1331 includes a piezoresistive element PZ located in the central portion in the extension direction of the first supported member 1331. The piezoresistive element PZ is an element whose electric resistance changes depending on the stress applied to the piezoresistive element PZ. In other words, the piezoresistive element PZ is an element having a piezoresistive effect.

In this example, as illustrated in FIG. 7, the piezoresistive element PZ is embedded in the first supported member 1331 so as to be exposed at the end face in the positive direction of the z-axis of the first supported member 1331.

With such a configuration, the detection member 133 detects the stress transmitted from the body member 132 in the central portion in the extension direction of the first supported member 1331.

As illustrated in FIG. 4, the second supported member 1332 has a strip-like shape extending in the y-axis direction. The end in the negative direction of the y-axis of the second supported member 1332 is in contact with the frame 131. The end in the positive direction of the y-axis of the second supported member 1332 is in contact with the end portion in the positive direction of the x-axis of the second end 1322 of the body member 132. In other words, the second supported member 1332 extends from the second end 1322 of the body member 132 to the negative direction of the y-axis, and the tip of the second supported member 1332 is supported by the frame 131.

The width of the second supported member 1332 (in other words, the length of the second supported member 1332 in the x-axis direction) is narrower than the width of the body member 132. The width of the central portion of the second supported member 1332 in an extension direction (the y-axis direction in this example), in which the second supported member 1332 extends, is narrower than the width of each of the end portions of the second supported member 1332 in the extension direction.

The first wiring 1333 and the second wiring 1334 are made of conductor (aluminum in this example). The first wiring 1333 and the second wiring 1334 are laid on the end face in the positive direction of the z-axis of the third layered body 13.

For example, the thickness of the first wiring 1333 and the second wiring 1334 (in other words, the length in the z-axis direction of the first wiring 1333 and the second wiring 1334) is a thickness of 10 nm to 1 μm. In this example, the thickness of the first wiring 1333 and the second wiring 1334 is 100 nm.

In this example, a part of the exposed surface of the first wiring 1333 and the second wiring 1334 is covered with an oxide thin film (not illustrated). For example, the other part, which is not covered with the oxide thin film, of the exposed surface of the first wiring 1333 and the second wiring 1334 may be used as terminals for connection.

As illustrated in FIG. 4 and FIG. 6, one end portion of the first wiring 1333 is in contact with the end portion in the negative direction of the y-axis of the piezoresistive element PZ. The other end portion of the first wiring 1333 is located at the outer edge of the frame 131. The first wiring 1333 extends from the end portion in the negative direction of the y-axis of the piezoresistive element PZ to the outer edge of the frame 131 through the tip of the first supported member 1331 (in other words, the end, which is in contact with the frame 131, of the first supported member 1331). In other words, the first wiring 1333 connects the piezoresistive element PZ and the tip of the first supported member 1331.

One end portion of the second wiring 1334 is in contact with the end portion in the positive direction of the y-axis of the piezoresistive element PZ. The other end portion of the second wiring 1334 is located at the outer edge of frame 131. The second wiring 1334 extends from the end portion in the positive direction of the y-axis of the piezoresistive element PZ to the outer edge of the frame 131 through the proximal end (in other words, the end, which is in contact with the body member 132, of the first supported member 1331) of the first supported member 1331, the end portion in the negative direction of the y-axis of the body member 132, and the second supported member 1332.

In other words, the second wiring 1334 connects the piezoresistive element PZ and the tip (in other words, the end, which is in contact with the frame 131, of the second supported member 1332) of the second supported member 1332 through the body member 132.

The volume change body 14 is made of a sensing material whose volume changes depending on the amount of the target. The details of the sensing material will be described later. The volume change body 14 may be represented as a sensing body or a sensory body. In this example, the volume change body 14 increases the volume of the volume change body 14 (in other words, expands) by receiving (for example, adsorbing, absorbing, or sorbing) the target. In this example, the volume change body 14 may be referred to as a receptor. In this example, the volume of the volume change body 14 increases as the amount of the received target increases. The volume change body 14 may reduce the volume of the volume change body 14 (in other words, shrink) by desorbing or detaching a substance from the volume change body 14 depending on the amount of the target.

The volume change body 14 is supported by the body member 132 so as to be stored in the storage space of the body member 132. In this example, the volume change body 14 fills the storage space of the body member 132. In this example, the volume change body 14 is fixed to the space formation portion 1323 of the body member 132.

In this example, the volume change body 14 is made of material whose elastic modulus (for example, Young's modulus) is lower than that of the body member 132. For example, the elastic modulus of the body member 132 is preferably twice or more the elastic modulus of the volume change body 14.

Also, in this example, the volume change body 14 has the change in the elastic modulus before and after the change in the volume of the volume change body 14 larger than the body member 132.

For example, the volume change body 14 includes a material that adsorbs, dissolves, or diffuses certain molecules by interacting with the molecules.

According to this, when the target is certain molecules, the volume change body 14 adsorbs, dissolves, or diffuses the molecules by interacting with the molecules. As a result, the volume of the volume change body 14 changes. Therefore, the amount of the target can be reflected in the change in the volume of the volume change body 14 with high accuracy. As a result, the target can be detected with high accuracy.

Further, for example, the volume change body 14 includes a material, which will be described later, that polymerizes by absorbing heat or light.

According to this, when the target is heat or light, the volume of the volume change body 14 changes due to the polymerization of the volume change body 14. As a result, the amount of the target can be reflected in the change in the volume of the volume change body 14 with high accuracy. As a result, the target can be detected with high accuracy.

When the target is heat, at least a part of the space formation portion 1323 of the body member 132 preferably has a higher thermal conductivity than the other part of the body member 132. For example, when a part of the body member 132 other than the space formation portion 1323 is made of silicon, at least a part of the space formation portion 1323 may be made of gold, silver, aluminum or copper.

According to this, the amount of heat absorbed by the volume change body 14 can be increased. As a result, the amount of the target can be reflected in the change in the volume of the volume change body 14 with high accuracy. As a result, the target can be detected with high accuracy.

When the target is light, at least a part of the space formation portion 1323 of the body member 132 preferably has a higher light transmittance than the other part of the body member 132. For example, when a part of the body member 132 other than the space formation portion 1323 is made of silicon, at least a part of the space formation portion 1323 is made of glass, polycarbonate resin, polyvinyl chloride resin, polyvinyl acetate, polyvinyl alcohol resin, fluorine resin, polystyrene elastomer, polyolefin elastomer, or acrylic resin.

According to this, the amount of light absorbed by the volume change body 14 can be increased. As a result, the amount of the target can be reflected in the change in the volume of the volume change body 14 with high accuracy. As a result, the target can be detected with high accuracy.

Further, for example, the volume change body 14 includes a porous body or a foam.

According to this, when the target is fine particles (for example, pollen or particulate matter (for example, $PM_{2.5}$ etc.)) or aerosol (for example, mist or smoke), the amount of the target that is adsorbed or absorbed by the volume change body 14 can be increased by allowing the target to enter the pores or the recesses of the volume change body 14. As a result, the amount of the target can be reflected in the change in the volume of the volume change body 14 with high accuracy. As a result, the target can be detected with high accuracy.

Further, the first wiring 1333 and the second wiring 1334 are connected to an electric circuit not illustrated in FIGS. 1 to 7. As a result, the sensor 1 constitutes an electric circuit 100 illustrated in FIG. 8. The electric circuit 100 includes a first power source 101, a second power source 102, a first resistor 103, a second resistor 104, an amplifier 105, and a storage device 106.

The second power source 102, the first power source 101, the first resistor 103, and the second resistor 104 are connected in series in this order. The electric circuit 100 is grounded between the first power source 101 and the second power source 102. The amplifier 105 inputs the electric potential between the first resistor 103 and the second resistor 104, amplifies the input electric potential, and outputs the amplified electric potential to the storage device 106. The storage device 106 stores the signal represented by the electric potential input from the amplifier 105.

The voltage of the first power source 101 is $+V_A$ [V]. The voltage of the second power source 102 is $-V_B$ [V]. The electric resistance of the first resistor 103 is $R_S$ [Ω]. The electric resistance of the second resistor 104 is $R_R$ [Ω]. In this example, the piezoresistive element PZ of the sensor 1 constitutes the first resistor 103. Therefore, the first resistor 103 may be regarded as a variable resistor. Also, the second resistor 104 may be regarded as a reference resistor.

With such a configuration, the storage device 106 stores a signal depending on the difference between the electric resistance of the first resistor 103 and the electric resistance of the second resistor 104.

(Sensing Material)

Next, the sensing material will be described.

In this example, the sensing material has fluidity. For example, in order to form the volume change body 14 by filling the storage space with the sensing material, the sensing material preferably has a low viscosity, good wettability with a wall forming the storage space, ease of inflow into the storage space, and ease of solidification without flowing out from the storage space.

Therefore, the sensing material preferably has a viscosity measured by a Brookfield type (in other words, B-type) viscosity meter of 1000 [mPa·sec] or less, more preferably 500 [mPa·sec] or less, furthermore preferably 250 [mPa·sec] or less, particularly preferably 200 [mPa·sec] or less, and most preferably 100 [mPa·sec] or less.

The optimum viscosity of the sensing material may vary depending on the material constituting the third layered body 13, the state of the wall surface forming the storage space, the shape of the storage space, and the size of the storage space.

When the viscosity of the sensing material is less than 1 [mPa·sec], the concentration of solute contained in the sensing material tends to be excessively low, so that the solute is likely to be unevenly distributed in the storage space. Therefore, the viscosity of the sensing material is preferably 1 [mPa·sec] or more.

Further, when the viscosity of the sensing material is larger than 1000 [mPa·sec], the fluidity of the sensing material tends to be excessively low, which makes it difficult to fill the storage space with the sensing material. Therefore, the viscosity of the sensing material is preferably 1000 [mPa·sec] or less.

Accordingly, in this example, the sensing material has a value of 1 [mPa·sec] to 1000 [mPa·sec] as the viscosity measured by the B-type viscosity meter.

Further, for example, when a material constituting the wall surface forming the storage space is mainly silicon and the sensing material flows into the storage space due to a capillary phenomenon, it is preferred that the solvent contained in the sensing material has a sufficiently low surface tension. The solvent may be represented as a flux.

Note that the optimum surface tension of the solvent may vary depending on the filling method of the sensing material described below.

The method of filling the storage space with the sensing material, a technique called dipping method (in other words, dip coating method or the like), spray coating method, or spin coating method may be used. Alternatively, the sensing material may be filled into the storage space using an inkjet printer or a needle dispenser. For example, the dipping method is suitable for increasing the efficiency of the operation of filling the storage space with the sensing material.

The solvent contained in the sensing material may be able to dissolve at least a part of the solute contained in the sensing material. The solvent dissolves at least a part of the solute contained in the sensing material to constitute a solution or a suspension (for example, colloid solution or slurry liquid).

For example, the solvent may be water, alcoholic solvent (for example, isopropyl alcohol, ethanol, or phenoxyethanol), formamide-based solvent (for example, N, N-dimethylformamide), ketone-based solvent (for example, acetone, cyclohexanone, or 2-butanone), ether-based solvent (for example, diethyl ether), halogen-based solvent (for example, di-chloroform or chloroform), polar solvent with cyclic compounds (for example, 2-pyrrolidone, N-methyl-2-pyrrolidone, or tetrahydrofuran), or benzene-based solvent (for example, toluene or xylene).

For example, the sensing material is synthetic polymer (for example, thermoplastic polymer, thermosetting polymer, or photocurable polymer), polymer originating from natural matter (for example, biomolecule), inorganic material (for example, metal or ceramics), carbon material, or composition including at least one of the foregoing. Alternatively, for example, the sensing material may include fine particles of inorganic material, carbon material, low molecular compound, or polymer.

Note that the method of manufacturing the synthetic polymer, for example, is disclosed in Non Patent Literature 1.

Non Patent Literature 1: "Practical Plastics Encyclopedia", edited by Practical Plastics Encyclopedia Editorial Committee, Industrial Research Committee, 1993

The sensing material may include one type of thermoplastic polymer or may include two or more types of thermoplastic polymers.

For example, the thermoplastic polymer may be polyolefin resin (for example, polyethylene, polypropylene, polystyrene, polyvinyl chloride, or polyvinyl alcohol), a polyolefin-based wax (for example, polyethylene oligomer or polypropylene oligomer), thermoplastic acrylic resin, polycarbonate resin, thermoplastic polyester resin, polyamide resin, polyimide resin, acrylonitrile butadiene styrene (ABS) resin, elastomer (for example, polyolefin-based elastomer, hydrogenated styrene-based block copolymer, or hydrogenated styrene-based random copolymer), super engineering plastic (for example, polyphenylene sulfide, polyamide imide, polyether sulfone, or polyether ether ketone), or syndiotactic polystyrene.

For example, the thermosetting polymer or the photocurable polymer is acrylic resin, unsaturated polyester resin, epoxy resin, phenol resin, urea resin, polyurethane resin, melamine resin, silicone resin, alkyd resin, or thermosetting polyimide. When the sensing material contains the thermosetting polymer or the photocurable polymer, monomer before curing and initiator may be mixed, immediately after that, the mixture may be filled in the storage space, and the mixture may be cured by heat or light to form the volume change body 14.

For example, the polymer originating from natural matter is polysaccharide originating from natural matter (for example, cellulose, chitin, chitosan, hyaluronic acid, or xanthan gum), polysaccharide derivative originating from natural matter, amino acid polymer, amino acid polymer derivative, protein (for example, gelatin or collagen), or protein derivative.

For example, the inorganic material is made of at least one of materials selected from the group of glass fiber, carbon fiber, and inorganic filler.

For example, the inorganic filler is amorphous filler (for example, calcium carbonate, silica, kaolin, clay, titanium oxide, barium sulfate, zinc oxide, hydroxide aluminum, alumina, or magnesium hydroxide), a plate-like filler (for example, talc, mica, or glass flake), needle-like filler (for example, wollastonite, potassium titanate, basic magnesium sulfate, sepiolite, xonotlite, or aluminum borate), conductive filler (for example, metal powder, metal flake, carbon black, or carbon nanotube), glass bead, glass powder, apatite, or zeolite.

The sensing material may include one type of inorganic filler or may include two or more types of inorganic fillers. Alternatively, the surface of the inorganic filler may be coated with carbon or may be subjected to silane coupling treatment or the like.

For example, the carbon material is made of at least one of materials selected from the group of activated carbon, carbon nanotube, and graphite.

For example, the sensing material may include synthesized porous body such as metal organic framework (MOF). The metal organic framework may be referred to as porous coordination polymer. For example, the metal organic framework may be Basolite (registered trademark) C300 (manufactured by BASF) or the like.

Alternatively, the sensing material may include an additive. For example, the additive may be a flame retardant (for example, brominated bisphenol, brominated epoxy resin, brominated polystyrene, brominated polycarbonate, triphenyl phosphate, phosphonamide, or red phosphorus), a flame retardant aid (for example, antimony trioxide or sodium antimonate), a heat stabilizer (for example, phosphate ester, or phosphite ester), an antioxidant (for example, hindered phenol), a heat-resistant agent, a weathering agent, a light stabilizer, a mold release agent, a flow modifier, a colorant, a pigment, a lubricant, an antistatic agent, a crystal nucleating agent, a plasticizer, a foaming agent, a halogen catcher, or an anti-drip agent.

Alternatively, the sensing material may include spherical particles. According to this, the sensing material including spherical particles has a higher fluidity than the sensing material including non-spherical particles so that the storage space can easily be filled with the sensing material.

For example, when the target is a carbonic acid gas, the sensing material may include potassium hydroxide. For example, when the target is temperature, the sensing material may include polyethylene. For example, when the target is humidity, the sensing material may include nylon. For example, when the target is electromagnetic wave, the sensing material may include black carbon.

(Manufacturing Method)

Next, a method of manufacturing the sensor 1 of the first embodiment (in other words, a sensor manufacturing method) will be described.

In this example, the sensor 1 is manufactured according to the process illustrated in FIGS. 9 and 10. Note that at least a part of the sensor 1 may be manufactured according to a process different from the process illustrated in FIGS. 9 and 10.

Figure 9A:
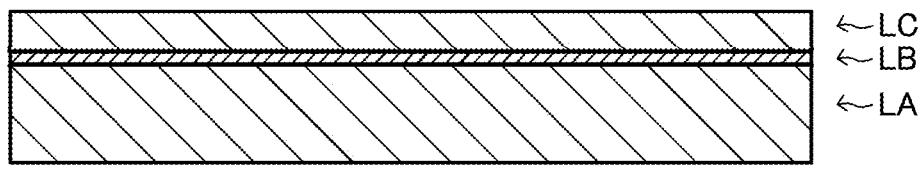
FIGS. 9A-9D are explanatory diagrams illustrating a manufacturing process of the sensor of the first embodiment.

First, as illustrated in FIG. 9A, a silicon on insulator (SOI) substrate is prepared. The SOI substrate consists of a first silicon layer LA, an insulating layer LB in contact with the first silicon layer LA, a second silicon layer LC in contact with the insulating layer LB. In this example, the insulating layer LB is made of silicon dioxide.

Figure 9B:
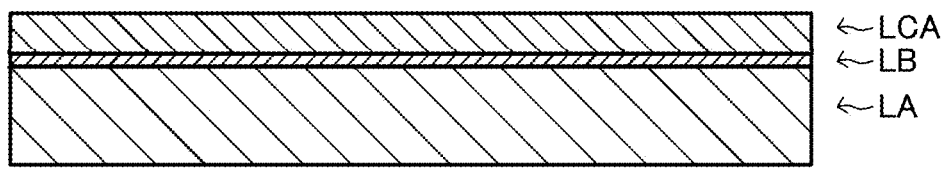

Next, as illustrated in FIG. 9B, boron is added to the second silicon layer LC. In this example, a technique called doping is used for the addition of boron. According to the second silicon layer LCA to which boron is added, the contact resistance of the conductor can be reduced.

Figure 9C:
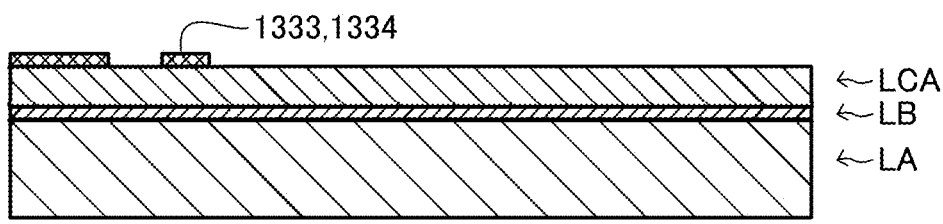

Next, as illustrated in FIG. 9C, a thin film made of aluminum is formed on the surface of the second silicon layer LCA opposite to the insulating layer LB. In this example, a technique called sputtering is used to form the thin film made of aluminum. Furthermore, the first wiring 1333 and the second wiring 1334 are formed by removing a part of the formed thin film. In this example, a technique called metal etching is used to remove the part of the thin film. In this example, the second silicon layer LCA corresponds to the first member and the second member.

Figure 9D:
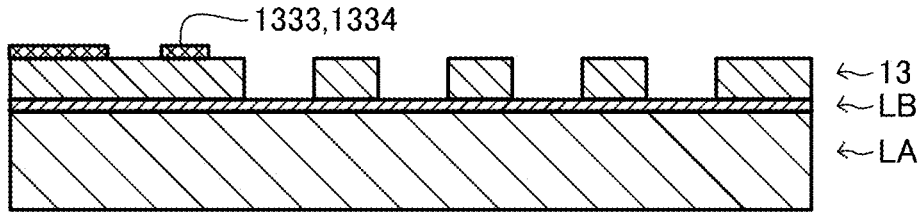

Next, as illustrated in FIG. 9D, the third layered body 13 is formed by removing a part of the second silicon layer LCA. In this example, a technique called dry etching is used to remove the part of the second silicon layer LCA.

Figure 10E:
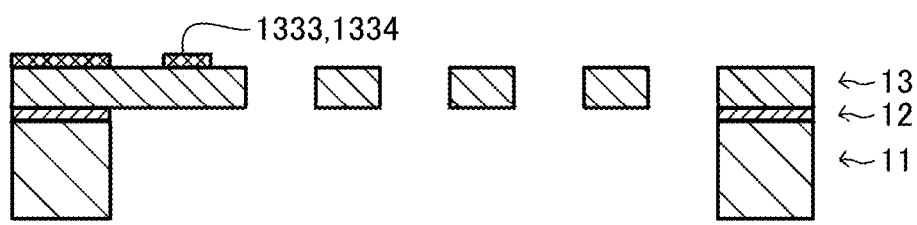
FIGS. 10E-10G are explanatory diagrams illustrating the manufacturing process of the sensor of the first embodiment.

Next, as illustrated in FIG. 10E, the first layered body 11 and the second layered body 12 are formed by removing a part of the first silicon layer LA and a part of the insulating layer LB, respectively. In this example, a technique called deep reactive ion etching (deep RIE) and vapor hydrogen fluoride etching (Vapor HF Etching) is used to remove the part of the first silicon layer LA and the part of the insulating layer LB.

Figure 10F:
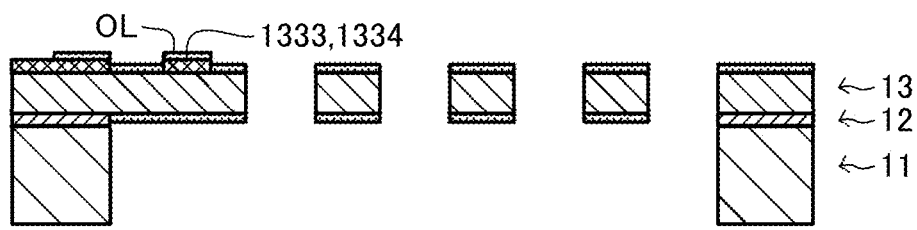

Next, as illustrated in FIG. 10F, an insulator thin film OL is formed on the exposed surface of the third layered body 13, the first wiring 1333, and the second wiring 1334. In this example, the insulator thin film OL is made of aluminum oxide. In this example, a technique called atomic layer deposition is used to form the insulator thin film. For example, the insulator thin film has a thickness of 5 nm to 50 nm. In this example, the thickness of the insulator thin film is 20 nm.

Next, terminals for connection are formed by removing a part of the insulator thin film OL formed on the surface of the first wiring 1333 and a part of the insulator thin film OL formed on the surface of the second wiring 1334. In this example, a technique called ion milling is used to form the terminals for connection.

Figure 10G:
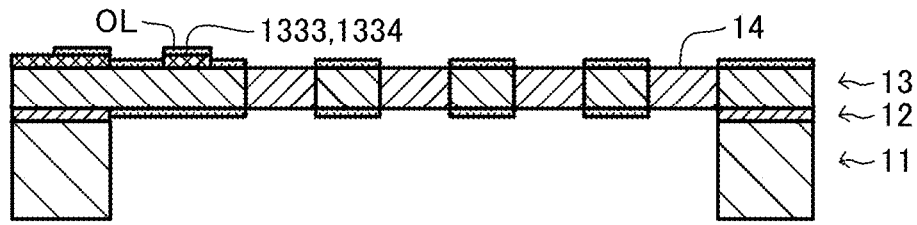

Next, as illustrated in FIG. 10G, the volume change body 14 is formed by filling the storage space of the body member 132 with the sensing material. In this example, a technique called dipping method is used to form the volume change body 14. For example, the sensing material is filled in the storage space of the body member 132 by immersing the body member 132 in a solution which is the sensing material. The volume change body 14 is formed by drying the filled sensing material at a temperature of 10 to 350° C.

In this way, the sensor 1 is manufactured.

(Operation)

Next, the operation of the sensor 1 of the first embodiment will be described.

The case where the target exists near the sensor 1 is assumed. In this case, the volume change body 14 receives the target, so that the volume increases depending on the amount of the target.

As a result, the volume change body 14 causes the stress including the component in the negative direction of the y-axis at the second end 1322 of the body member 132. The stress occurred at the second end 1322 of the body member 132 is transmitted to the detection member 133.

The electric resistance of the piezoresistive element PZ of the detection member 133 changes depending on the stress transmitted from the body member 132. The electric circuit 100 stores the signal in the storage device 106 depending on the difference between the electric resistance (in this example, the electric resistance of the first resistor 103) of the piezoresistive element PZ of the detection member 133 and the electric resistance of the second resistor 104.

In this way, the sensor 1 detects the target.

As described above, in the sensor 1 of the first embodiment, the body member 132 has a flat plate-like shape, the first end 1321 in the first direction (the y-axis direction in this example) being supported, and the storage space opening at at least one of both end faces in the thickness direction of the body member 132. Further, the volume change body 14, whose volume changes depending on the amount of the target, is supported by the body member 132 so that at least a part of the volume change body 14 is stored in the storage space. Further, the detection member 133 is in contact with the second end 1322 in the first direction of the body member 132, and detects the stress caused by the change in the volume of the volume change body 14.

According to this, since the volume change body 14 is stored in the storage space, even if the volume of the volume change body 14 changes, the occurrence of stress in the thickness direction of the body member 132 can be suppressed. This can prevent the body member 132 from bending. Therefore, the occurrence of stress in the thickness direction of the body member 132 at the second end 1322 can be suppressed. As a result, the change in the volume of the volume change body 14 can be reflected with high accuracy in the stress, which occurs at the second end 1322, in the direction along the body member 132. In other words, the sensor 1 can detect the target with high accuracy.

Further, in the sensor 1 of the first embodiment, the storage space opens at both of the end faces in the thickness direction of the body member 132.

According to this, when the volume of the volume change body 14 changes, the stress occurring in the thickness direction of the body member 132 can be suppressed as compared with the case where the storage space opens only at one end in the thickness direction of the body member. Therefore, the change in the volume of the volume change body 14 can be reflected with high accuracy in the stress occurred at the second end 1322. As a result, the target can be detected with high accuracy.

Furthermore, in the sensor 1 of the first embodiment, the storage space includes a slit-like hole extending in the second direction (the x-axis direction in this example) orthogonal to the first direction (the y-axis direction in this example).

According to this, the volume change body 14 can be easily stored in the storage space. In addition, the component in the first direction in the stress caused by the change in the volume of the volume change body 14 in the body member 132 can be increased. Therefore, the change in the volume of the volume change body 14 can be reflected with high accuracy in the stress occurred at the second end 1322. As a result, the target can be detected with high accuracy.

Further, in the sensor 1 of the first embodiment, the storage space includes a plurality of the holes, and the plurality of holes are arranged along the first direction (the y-axis direction in this example).

By the way, the larger the hole becomes, the more difficult it becomes to support the volume change body 14 by the body member 132. Therefore, the amount of the volume change body 14 is unlikely to increase.

On the other hand, according to the sensor 1, the amount of the volume change body 14 can be easily increased by increasing the number of the holes. In addition, since the plurality of holes are arranged along the first direction, the component in the first direction in the stress caused by the change in the volume of the volume change body 14 in the body member 132 can be increased. Therefore, the change in the volume of the volume change body 14 can be reflected with high accuracy in the stress occurring at the second end 1322. As a result, the target can be detected with high accuracy.

Further, in the sensor 1 of the first embodiment, the detection member 133 includes the first supported member 1331. The first supported member 1331, whose tip is supported, extends from the second end 1322 to the first direction (the y-axis direction in this example). The detection member 133 detects the stress caused by the change in the volume of the volume change body 14 at the first supported member 1331.

According to this, the compressive stress or the tensile stress caused by the change in the volume of the volume change body 14 in the first supported member 1331 can be increased. Therefore, the change in the volume of the volume change body 14 can be reflected with high accuracy in the stress occurring in the first supported member 1331. As a result, the target can be detected with high accuracy.

Further, in the sensor 1 of the first embodiment, the first supported member 1331 has a narrower width than a length of the body member 132 in the second direction (the x-axis direction in this example) orthogonal to the first direction (the y-axis direction in this example).

According to this, the stress caused by the change in the volume of the volume change body 14 in the first supported member 1331 can be larger than the stress occurring in the body member 132. Therefore, the change in the volume of the volume change body 14 can be reflected with high accuracy in the stress occurring in the first supported member 1331. As a result, the target can be detected with high accuracy.

Further, in the sensor 1 of the first embodiment, the detection member 133 includes the second supported member 1332. The second supported member 1332, whose tip is supported, extends from the second end 1322 in the first direction (the y-axis direction in this example). The detection member 133 has the piezoresistive element PZ located in the first supported member 1331. The detection member 133 includes the first wiring 1333 that connects the piezoresistive element PZ and the tip of the first supported member 1331, and the second wiring 1334 that connects the piezoresistive element PZ and the tip of the second supported member 1332 through the body member 132.

According to this, the leak current occurring between the first wiring 1333 and the second wiring 1334 can be suppressed. Therefore, the target can be detected with high accuracy.

Further, in the sensor 1 of the first embodiment, the central portion in the extension direction, in which the first supported member 1331 extends, of the first supported member 1331 has a narrower width than a width of each of the end portions in the extension direction of the first supported member 1331. The detection member 133 detects the stress caused by the change in the volume of the volume change body 14 in the central portion in the extension direction of the first supported member 1331.

According to this, the stress caused by the change in the volume of the volume change body 14 in the central portion in the extension direction of the first supported member 1331 can be larger than the stress occurring in each end portion in the extension direction of the first supported member 1331. Therefore, the change in the volume of the volume change body 14 can be reflected with high accuracy in the stress occurring in the central portion. As a result, the target can be detected with high accuracy.

Furthermore, in the sensor 1 of the first embodiment, the volume change body 14 is made of material whose elastic modulus is lower than that of the body member 132.

According to this, the stress distribution, which is caused by the change in the volume of the volume change body 14, in the volume change body 14 can be close to a uniform state. As a result, the change in the volume of the volume change body 14 can be reflected with high accuracy in the stress occurred in the body member 132. As a result, the target can be detected with high accuracy.

In the sensor 1 of the first embodiment, the volume change body 14 may be made of material having an elastic modulus higher than that of the body member 132.

In this case, the deformation of the body member 132 caused by the change in the volume of the volume change body 14 can be increased. As a result, the change in the volume of the volume change body 14 can be reflected with high accuracy in the stress, which occurs at the second end 1322, in the direction along the body member 132. In other words, the sensor 1 can detect the target with high accuracy.

Furthermore, in the sensor 1 of the first embodiment, the volume change body 14 has the change in the elastic modulus before and after the change in the volume of the volume change body 14 larger than that of the body member 132.

For example, when the reduction in the elastic modulus of the volume change body 14 before and after the change in the volume of the volume change body 14 is larger than that of the body member 132, the strength of the sensor 1 before the change in the volume of the volume change body can be increased. Further, in this case, after the change in the volume of the volume change body 14, the stress distribution, which is caused by the change in the volume of the volume change body 14, in the volume change body 14 can be close to a uniform state. As a result, the change in the volume of the volume change body 14 can be reflected with high accuracy in the stress occurring in the body member 132. As a result, the target can be detected with high accuracy.

Further, the method of manufacturing the sensor 1 of the first embodiment includes filling the storage space with the sensing material having fluidity and drying the filled sensing material to form the volume change body 14.

According to this, the volume change body 14 filling the storage space can be easily formed.

Furthermore, in the method of manufacturing the sensor 1 of the first embodiment, the viscosity of the sensing material is a value of 1 [mPa·sec] to 1000 [mPa·sec].

According to this, the fluidity of the sensing material is sufficiently high so that the sensing material can easily fill the storage space.

In the sensor 1 of the first embodiment, the volume change body 14 is entirely stored in the storage space of the body member 132. In the sensor 1 of a first modified example of the first embodiment, a part of the volume change body 14 may be stored in the storage space, and the other part of the volume change body 14 may cover at least a part of both end faces in the thickness direction of the body member 132. For example, the volume change body 14 may cover an area in which the space formation portion 1323 exists in both end faces in the thickness direction of the body member 132.

In the sensor 1 of the first embodiment, the body member 132 is in contact with the frame 131 at the second end 1322 through two supported members consisting of the first supported member 1331 and the second supported member 1332. In the sensor 1 of a second modified example of the first embodiment, the body member 132 may be in contact with the frame 131 at the second end 1322 through one supported member, or through three or more supported members. Alternatively, the body member 132 may be in contact with the frame 131 at the first end 1321 through one or more supported members.

Figure 11:
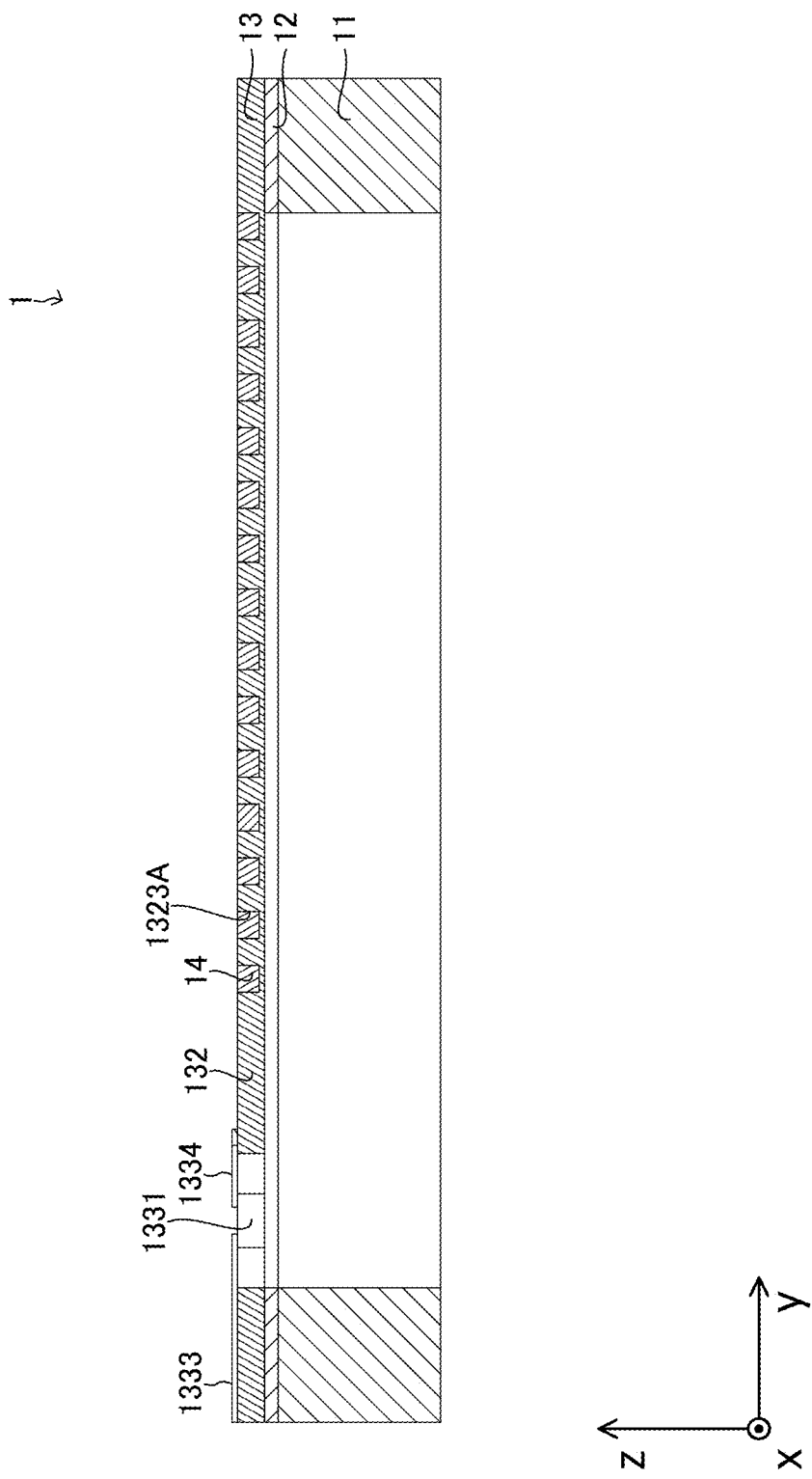
FIG. 11 is a cross-sectional view of a sensor of a third modified example of the first embodiment.

As illustrated in FIG. 6, in the sensor 1 of the first embodiment, each hole included in the storage space formed by the space formation portion 1323 of the body member 132 is a through hole that penetrates the body member 132 in the thickness direction of the body member 132. As illustrated in FIG. 11, in the sensor 1 of a third modified example of the first embodiment, each hole included in the storage space formed by the space formation portion 1323A of the body member 132 may be a bottomed hole that opens at the end face in the positive direction of the z-axis of the body member 132.

Figure 12:
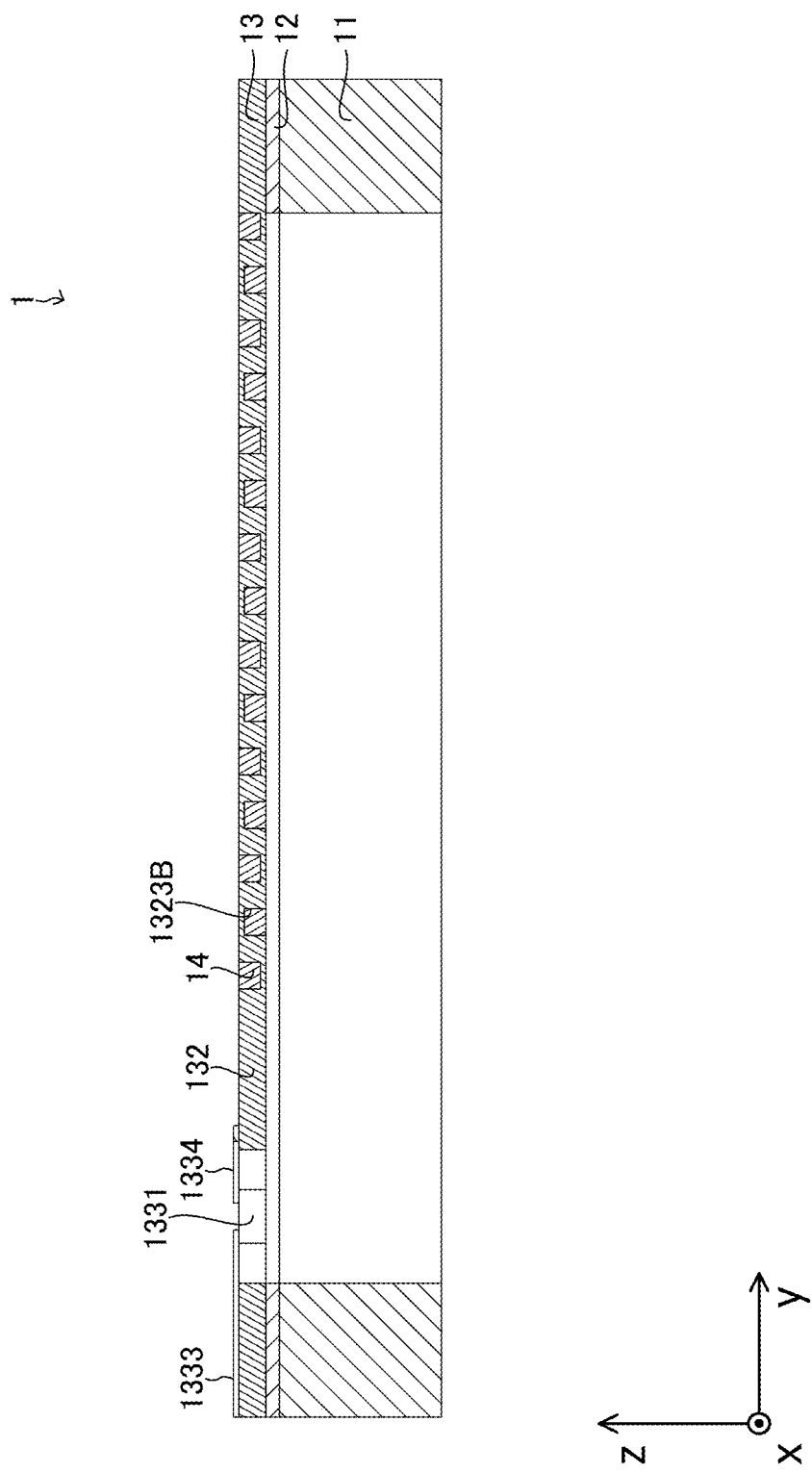
FIG. 12 is a cross-sectional view of a sensor of a fourth modified example of the first embodiment.

Alternatively, as illustrated in FIG. 12, in the sensor 1 of a fourth modified example of the first embodiment, each hole included in the storage space formed by the space formation portion 1323B of the body member 132 may be a first hole that is bottomed and opens at the end face in the positive direction of the z-axis of the body member 132, or a second hole that is bottomed and opens at the end face in the negative direction of the z-axis of the body member 132. For example, as illustrated in FIG. 12, the holes included in the storage space may be in such a manner that the first hole and the second hole are alternately arranged along the y-axis direction.

Figure 13:
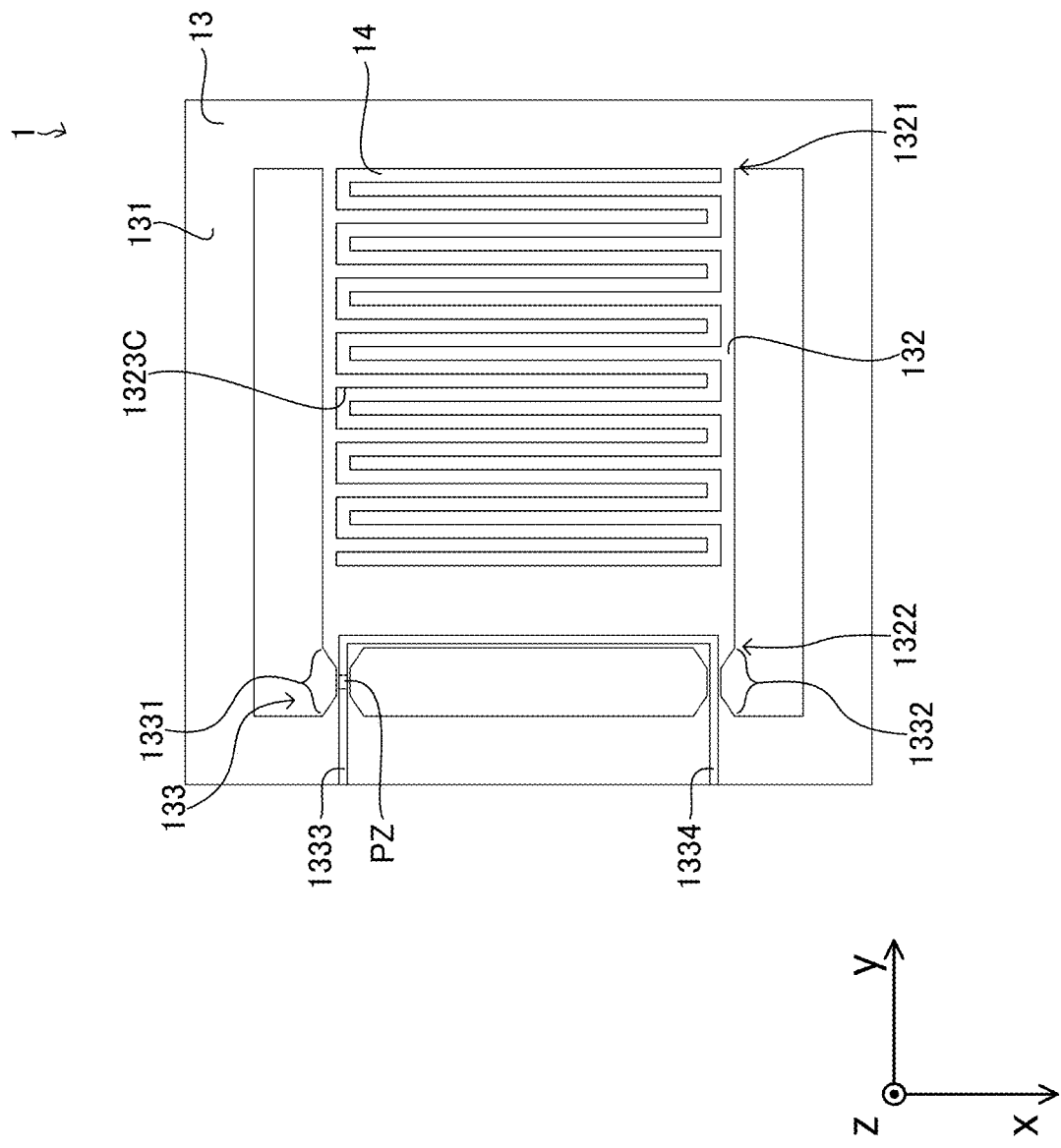
FIG. 13 is a plan view of a sensor of a fifth modified example of the first embodiment.

As illustrated in FIG. 4, in the sensor 1 of the first embodiment, the number of holes included in the storage space formed by the space formation portion 1323 of the body member 132 is 2 or more. As illustrated in FIG. 13, in the sensor 1 of a fifth modified example of the first embodiment, the number of holes included in the storage space formed by the space formation portion 1323C of the body member 132 may be one. For example, as illustrated in FIG. 13, the space formation portion 1323C of the body member 132 may have a comb teeth-like shape in the plan view of the body member 132 (in other words, when the body member 132 is viewed in the negative direction of the z-axis).

Figure 14:
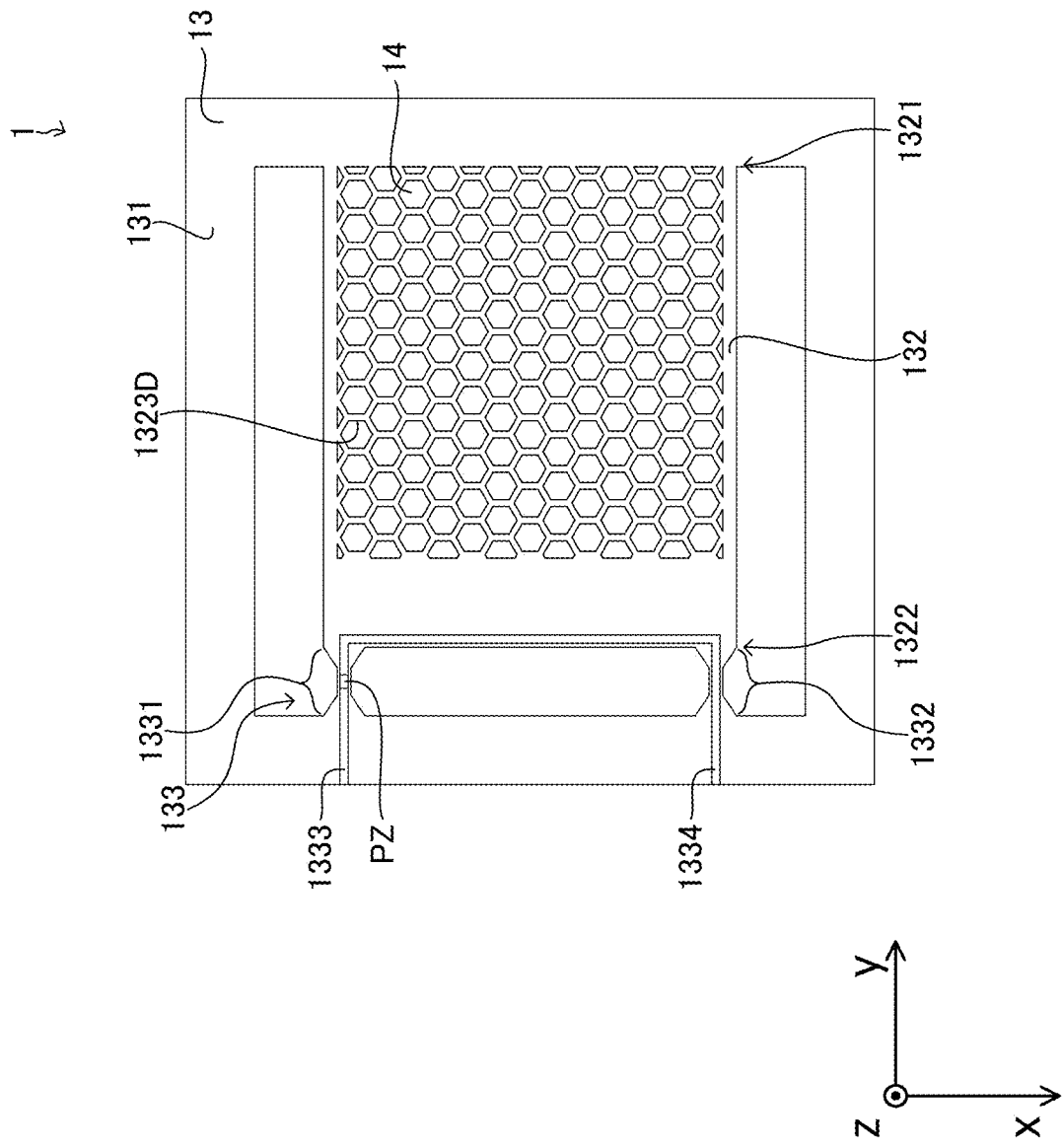
FIG. 14 is a plan view of a sensor of a sixth modified example of the first embodiment.

Alternatively, as illustrated in FIG. 4, in the sensor 1 of the first embodiment, the storage space formed by the space formation portion 1323 of the body member 132 includes the slit-like holes. As illustrated in FIG. 14, in the sensor 1 of a sixth modified example of the first embodiment, the space formation portion 1323C of the body member 132 may have a mesh-like shape in the plan view of the body member 132 (in other words, when the body member 132 is viewed in the negative direction of the z-axis). For example, as illustrated in FIG. 14, each hole included in the storage space may be a regular hexagon in the plan view of the body member 132. Each hole included in the storage space may have a shape (circular, elliptical, or polygonal shape other than regular hexagon) other than regular hexagon in the plan view of the body member 132.

In the sensor 1 of the first embodiment, the corner portion of the storage space formed by the space formation portion 1323 of the body member 132 may have a curved shape or a chamfered shape.

When the volume change body 14 is formed by filling the storage space with the sensing material having fluidity and the corner portion of the storage space forms a ridge, the sensing material may unlikely spread over the corner portion. In other words, the volume change body 14 may not fill the storage space. In this case, the change in the volume of the volume change body 14 may not be reflected with high accuracy in the stress, which occurs at the second end 1322, in the direction along the body member 132.

On the other hand, when the corner portion of the storage space has a curved shape or a chamfered shape and the volume change body 14 is formed by filling the storage space with the sensing material having fluidity, the sensing material can spread over the corner portion. Therefore, the volume change body 14 can fill the storage space. As a result, the change in the volume of the volume change body 14 can be reflected with high accuracy in the stress, which occurs at the second end 1322, in the direction along the body member 132. In other words, the target can be detected with high accuracy.

The sensor 1 of the first embodiment may be applied to a detecting device that detects each of different targets. In this case, the detecting device preferably includes a plurality of the sensors 1 having different sensing materials. For example, the plurality of sensors 1 may be arranged in a grid pattern.

First Example

Next, a first example of the sensor 1 of the first embodiment will be described.

In the sensor 1 of the first example, the sensing material is a solution obtained by dissolving OLESTER (registered trademark) Q517 (manufactured by Mitsui Chemicals, Inc.) as a solute in a mixed solvent consisting of cyclohexanone and dimethylformamide. In this example, the mixed solvent has a mixture ratio of cyclohexanone to dimethylformamide of 2:1. In this example, the weight ratio of the solute to the mixed solvent in the sensing material is 1:7.

In this example, the sensing material has a viscosity of 2 [mPa·sec]. In this example, using a B-type rotating viscosity meter (TV-35 type viscosity meter, manufactured by Toki Sangyo Co., Ltd.), 1 mL of solution is placed in a measurement container and the viscosity is measured at 25° C. and 50% relative humidity (RH) after rotating for 60 seconds at a rotation speed of 50 rpm. The viscosity described below is also measured similarly to this example.

In this example, the sensing material is filled in the storage space of the body member 132 by dipping the body member 132 into the solution which is the sensing material. The filled sensing material is dried at a room temperature for 8 to 12 hours to form the volume change body 14.

In this example, the volume change body 14 has an elastic modulus (in this example, Young's modulus) of 2.5 GPa. In this example, using a micro hardness meter (DUH-W201S, manufactured by Shimadzu Corporation), the elastic modulus is measured under the condition where the test force is 0.5 mN, the load speed is 0.142 mN/sec, and the holding time is 5 sec. Note that the elastic modulus described later is also measured similarly to this example.

In this example, the ratio $\Delta R/R_S$ of the variation $\Delta R$ of the electric resistance $R_S$ of the first resistor 103 to the electric resistance $R_S$ of the first resistor 103 is represented by Math. 1. Here, $V_{OUT}$ represents the electric potential (in other words, the electric potential representing the signal stored in the storage device 106) output from the amplifier 105. Further, G represents the amplification rate (in other words, the ratio of the electric potential output from the amplifier 105 to the electric potential input to the amplifier 105) of the amplifier 105. Further, I represents the current flowing through the electric circuit illustrated in FIG. 8 as represented in Math. 2.

$$\frac{\Delta R}{R_S} = \frac{V_{OUT}}{G \cdot I \cdot R_S} \qquad [\text{Math. 1}]$$

$$I = \frac{V_A + V_B}{R_S + R_R} \qquad [\text{Math. 2}]$$

As represented in Math. 1, the electric potential $V_{OUT}$ representing the signal stored in the storage device 106 changes in proportion to the ratio $\Delta R/R_S$ of the variation $\Delta R$ of the electric resistance $R_S$ of the first resistor 103 to the electric resistance $R_S$ of the first resistor 103.

In a first operation example, the sensor 1 detects humidity as the target. In a second operation example, the sensor 1 detects hydrogen sulfide ($H_2S$) as the target.

In both of the first operation example and the second operation example, the sensor 1 is installed inside a gas chamber. Further, in both of the first operation example and the second operation example, a humidity sensor for measuring a reference value of humidity is installed inside the gas chamber.

In the first operation example, a gas consisting of nitrogen (in other words, nitrogen gas) is supplied into the gas chamber for a certain period, and then a gas consisting of water and nitrogen (in other words, a water mixed gas) is supplied into the gas chamber for a certain period. Thus, the humidity inside the gas chamber changes over time.

Figure 15:
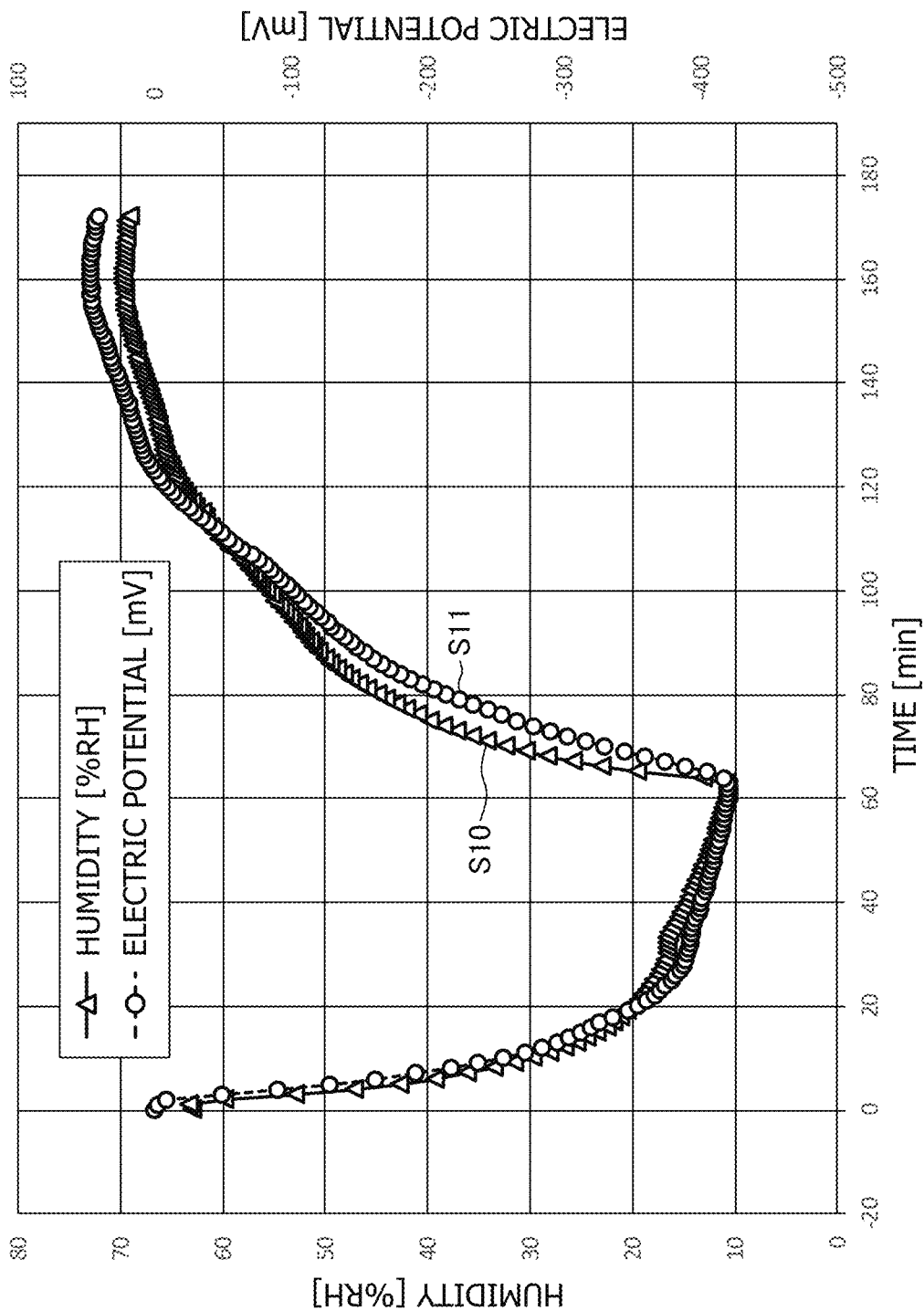
FIG. 15 is a graph illustrating a responsiveness to humidity of a sensor of a first example of the first embodiment.

As illustrated in FIG. 15, the signal S11 stored in the storage device 106 in the sensor 1 changes so as to follow the reference signal S10 represented by the reference value measured by the humidity sensor with sufficiently high accuracy.

Furthermore, in the first operation example, changing the humidity inside the gas chamber over time, in which the nitrogen gas is supplied into the gas chamber for a certain period, and then the water mixed gas is supplied into the gas chamber for a certain period, is repeated.

Figure 16:
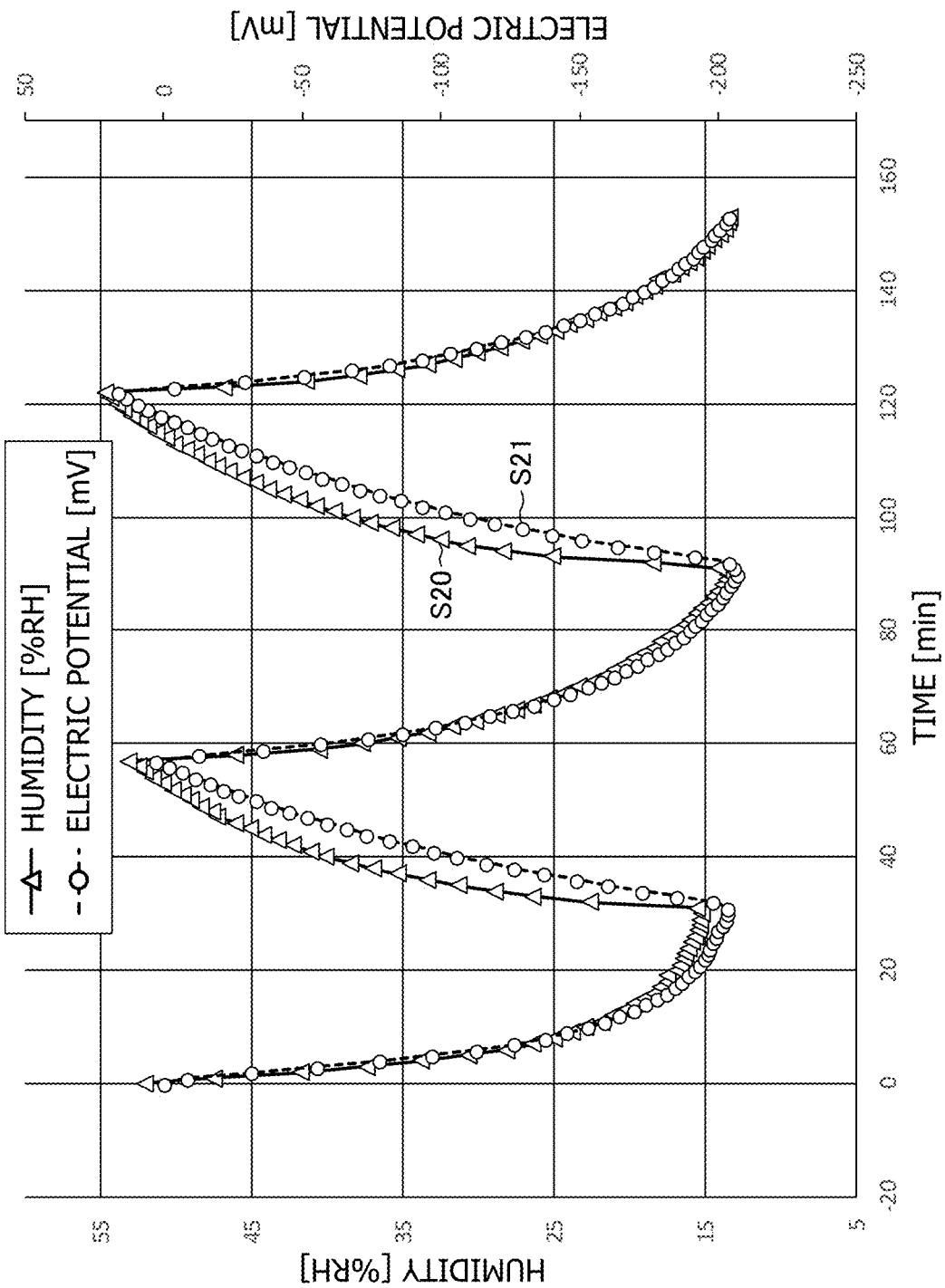
FIG. 16 is a graph illustrating a responsiveness to humidity of the sensor of the first example of the first embodiment.

As illustrated in FIG. 16, the signal S21 stored in the storage device 106 in the sensor 1 changes so as to follow the reference signal S20 represented by the reference value measured by the humidity sensor with sufficiently high accuracy even with repeated changes in the humidity.

Figure 17:
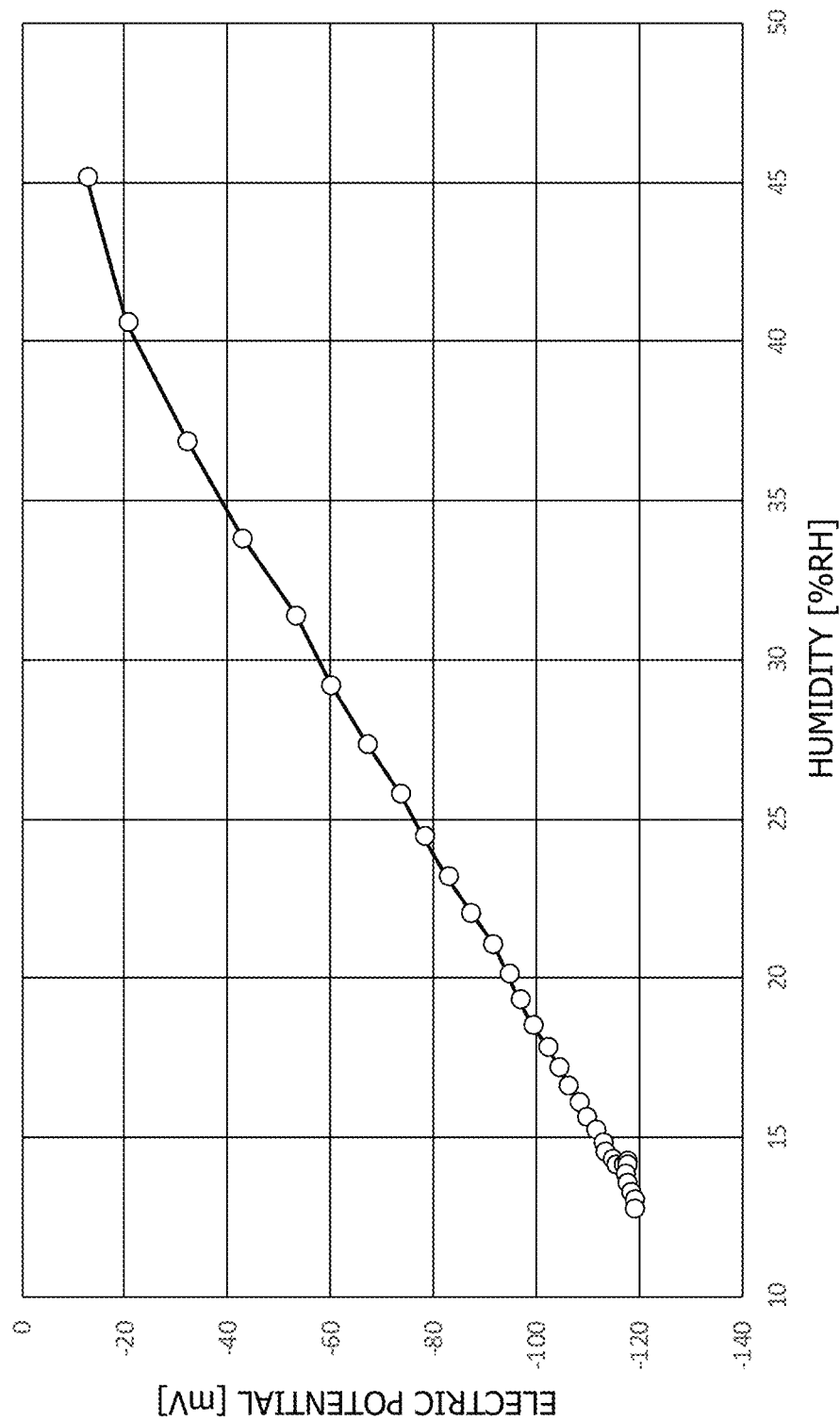
FIG. 17 is a graph illustrating a responsiveness to humidity of the sensor of the first example of the first embodiment.

As illustrated in FIG. 17, the electric potential represented by the signal stored in the storage device 106 in the sensor 1 and the reference value measured by the humidity sensor have a strong correlation (in this example, a linear relationship).

Thus, according to the sensor 1 of the first example, the humidity can be detected with high accuracy over a relatively wide range of humidity.

In the second operation example, the nitrogen gas is supplied into the gas chamber for a certain period, and then, a gas consisting of nitrogen and hydrogen sulfide and having a hydrogen sulfide concentration of 4.75 ppm (in other words, hydrogen sulfide mixed gas) is supplied into the gas chamber for a certain period. Thus, the concentration of hydrogen sulfide inside the gas chamber changes over time. In this example, the concentration of hydrogen sulfide ($H_2S$) is measured by a gas detector tube (hydrogen sulfide No. 4LB, manufactured by Gastec Corporation).

Figure 18:
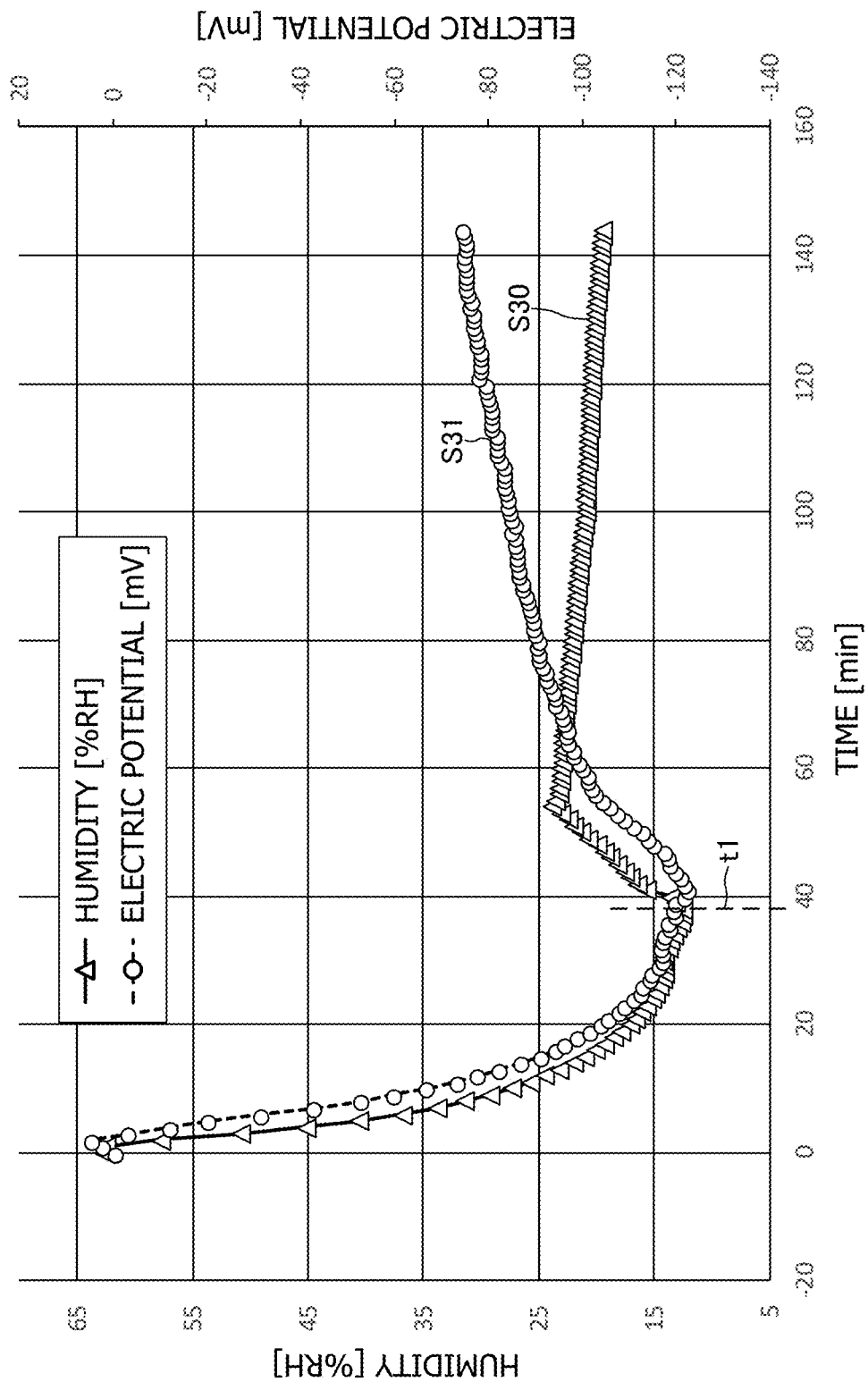
FIG. 18 is a graph illustrating a responsiveness to hydrogen sulfide of the sensor of the first example of the first embodiment.

As illustrated in FIG. 18, after the time point t1 when the gas supplied into the gas chamber is switched from the nitrogen gas to the hydrogen sulfide mixed gas, the reference signal S30 represented by the reference value measured by the humidity sensor represents the reference value decreasing with the passage of time. On the other hand, after the time point t1, the signal S31 stored in the storage device 106 of the sensor 1 represents the electric potential increasing with the passage of time.

Therefore, the volume change body 14 of the sensor 1 is estimated to interact with molecules (in this example, hydrogen sulfide) other than humidity (for example, adsorb or sorb hydrogen sulfide).

Thus, in the sensor 1, the volume of the volume change body 14 changes due to the interaction of the volume change body 14 with the target. Therefore, the amount of the target can be reflected with high accuracy in the change in the volume of the volume change body 14. As a result, the target can be detected with high accuracy.

Second Example

Next, a second example of the sensor 1 of the first embodiment will be described.

In the sensor 1 of the second example, the sensing material is a solution obtained by dissolving U-VAN (registered trademark) 20SE60 (manufactured by Mitsui Chemicals, Inc.) as a solute in a solvent consisting of dimethylformamide. In this example, the weight ratio of the solute to the mixed solvent in the sensing material is 1:3. In this example, similarly to the first example, the volume change body 14 is formed using the dipping method.

In the first operation example, similarly to the first example, the sensor 1 detects humidity as the target. In the second operation example, similarly to the first example, the sensor 1 detects hydrogen sulfide ($H_2S$) as the target.

In the first operation example, the nitrogen gas is supplied into the gas chamber for a certain period, and then the water-mixed gas is supplied into the gas chamber for a certain period. Thus, the humidity inside the gas chamber changes over time.

Figure 19:
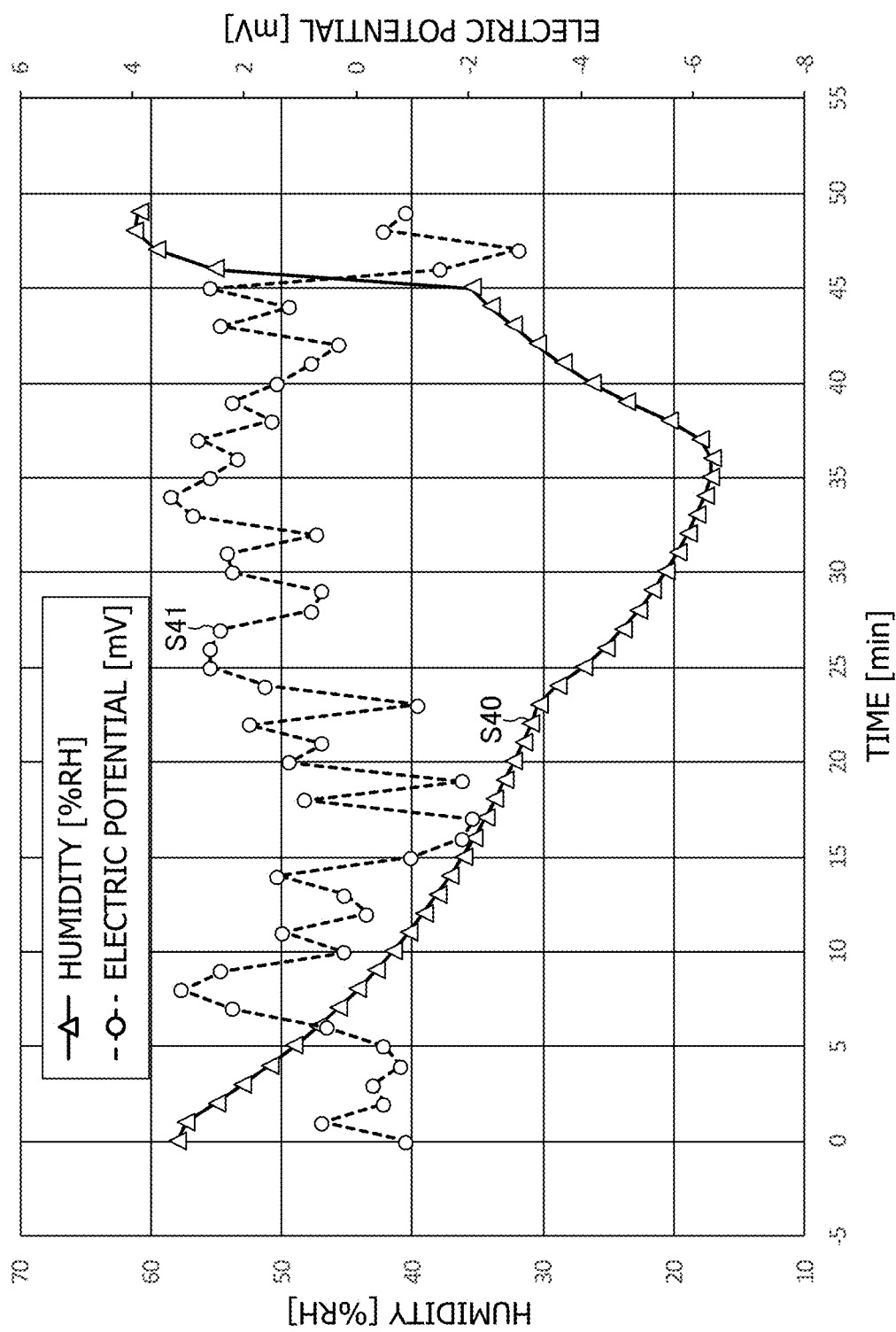
FIG. 19 is a graph illustrating a responsiveness to humidity of a sensor of a second example of the first embodiment.

As illustrated in FIG. 19, the signal S41 stored in the storage device 106 in the sensor 1 does not change to follow the reference signal S40 represented by the reference value measured by the humidity sensor. In other words, the responsiveness of the sensor 1 of the second example to humidity is lower than that of the sensor 1 of the first example.

In the second operation example, the hydrogen sulfide mixed gas is supplied into the gas chamber for a certain period. Thus, the concentration of hydrogen sulfide inside the gas chamber changes over time.

Figure 20:
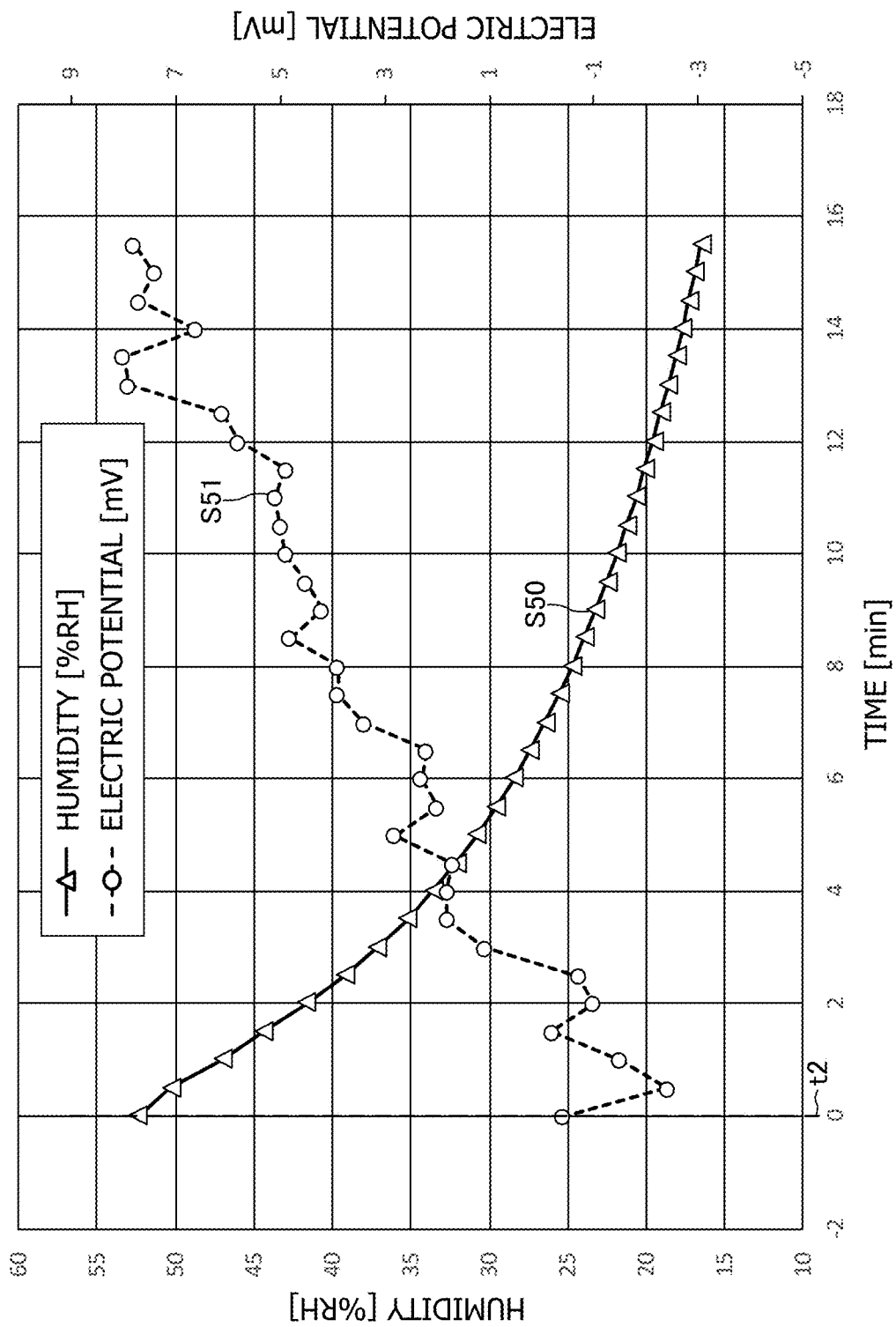
FIG. 20 is a graph illustrating a responsiveness to hydrogen sulfide of the sensor of the second example of the first embodiment.
Figure 21:
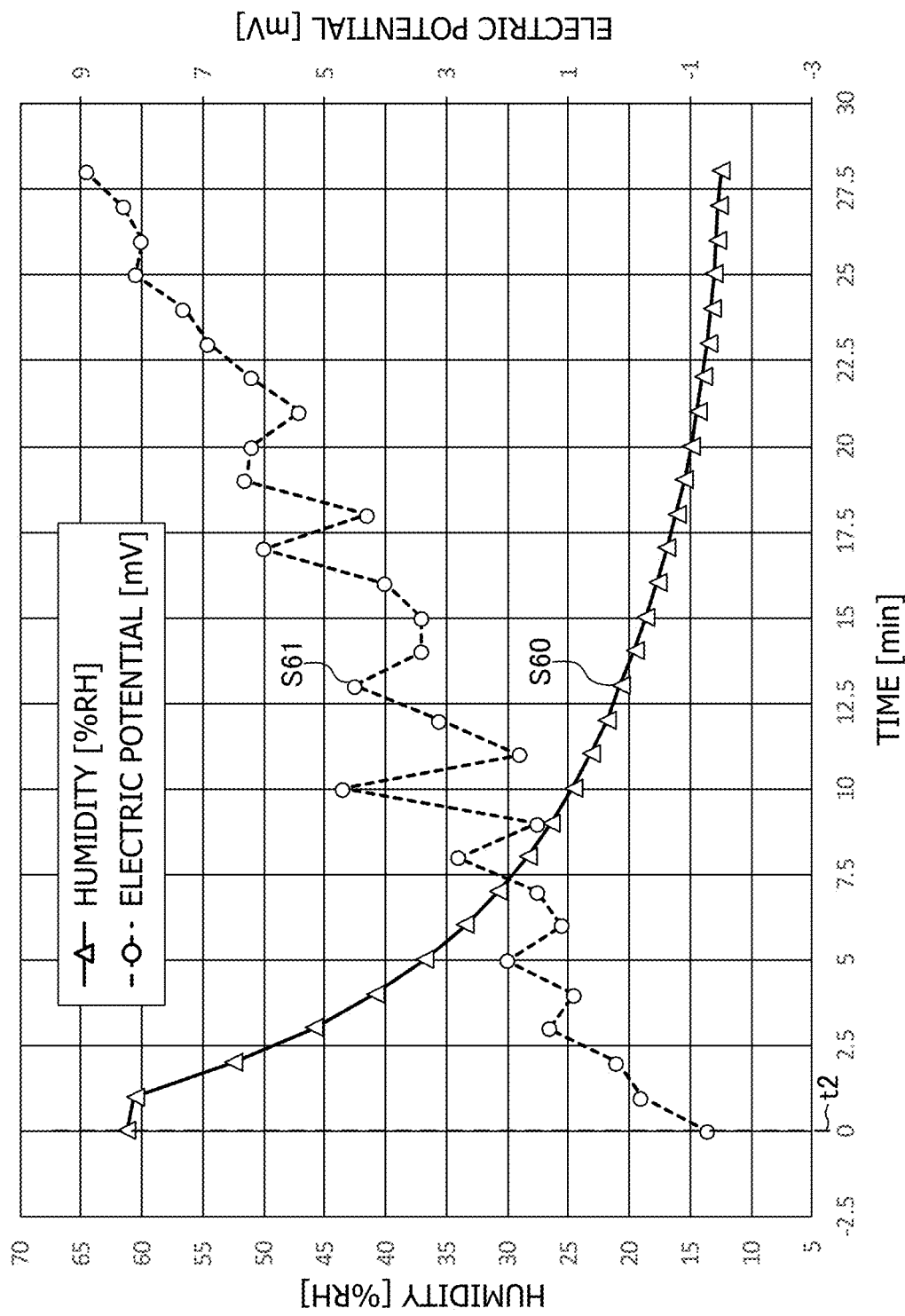
FIG. 21 is a graph illustrating a responsiveness to hydrogen sulfide of the sensor of the second example of the first embodiment.

As illustrated in FIG. 20 and FIG. 21, after the time point t2 when the hydrogen sulfide mixed gas begins to be supplied into the gas chamber, the reference signals S50, S60 represented by the reference values measured by the humidity sensor represent the reference values decreasing with the passage of time. On the other hand, after the time point t2, the signals S51 and S61 stored in the storage device 106 of the sensor 1 represent the electric potentials increasing with the passage of time.

Therefore, the volume change body 14 of the sensor 1 is estimated to interact with molecules (in this example, hydrogen sulfide) other than humidity (for example, adsorb or sorb hydrogen sulfide).

Thus, in the sensor 1, the volume of the volume change body 14 changes due to the interaction of the volume change body 14 with the target. Therefore, the amount of the target can be reflected with high accuracy in the change in the volume of the volume change body 14. As a result, the target can be detected with high accuracy.

Third Example

Next, a third example of the sensor 1 of the first embodiment will be described.

In the sensor 1 of the third example, the sensing material is a solution obtained by dissolving EPOKEY (registered trademark) 863 (manufactured by Mitsui Chemicals, Inc.) as a solute in a solvent consisting of dimethylformamide. In this example, the weight ratio of the solute to the mixed solvent in the sensing material is 1:7. In this example, similarly to the first example, the volume change body 14 is formed using the dipping method. In this example, the elastic modulus (Young's modulus in this example) of the volume change body 14 is 2.5 GPa.

In the first operation example, similarly to the first example, the sensor 1 detects humidity as the target. In the second operation example, similarly to the first example, the sensor 1 detects hydrogen sulfide ($H_2S$) as the target.

In the first operation example, the nitrogen gas is supplied into the gas chamber for a certain period, and then the water-mixed gas is supplied into the gas chamber for a certain period. Thus, the humidity inside the gas chamber changes over time.

Figure 22:
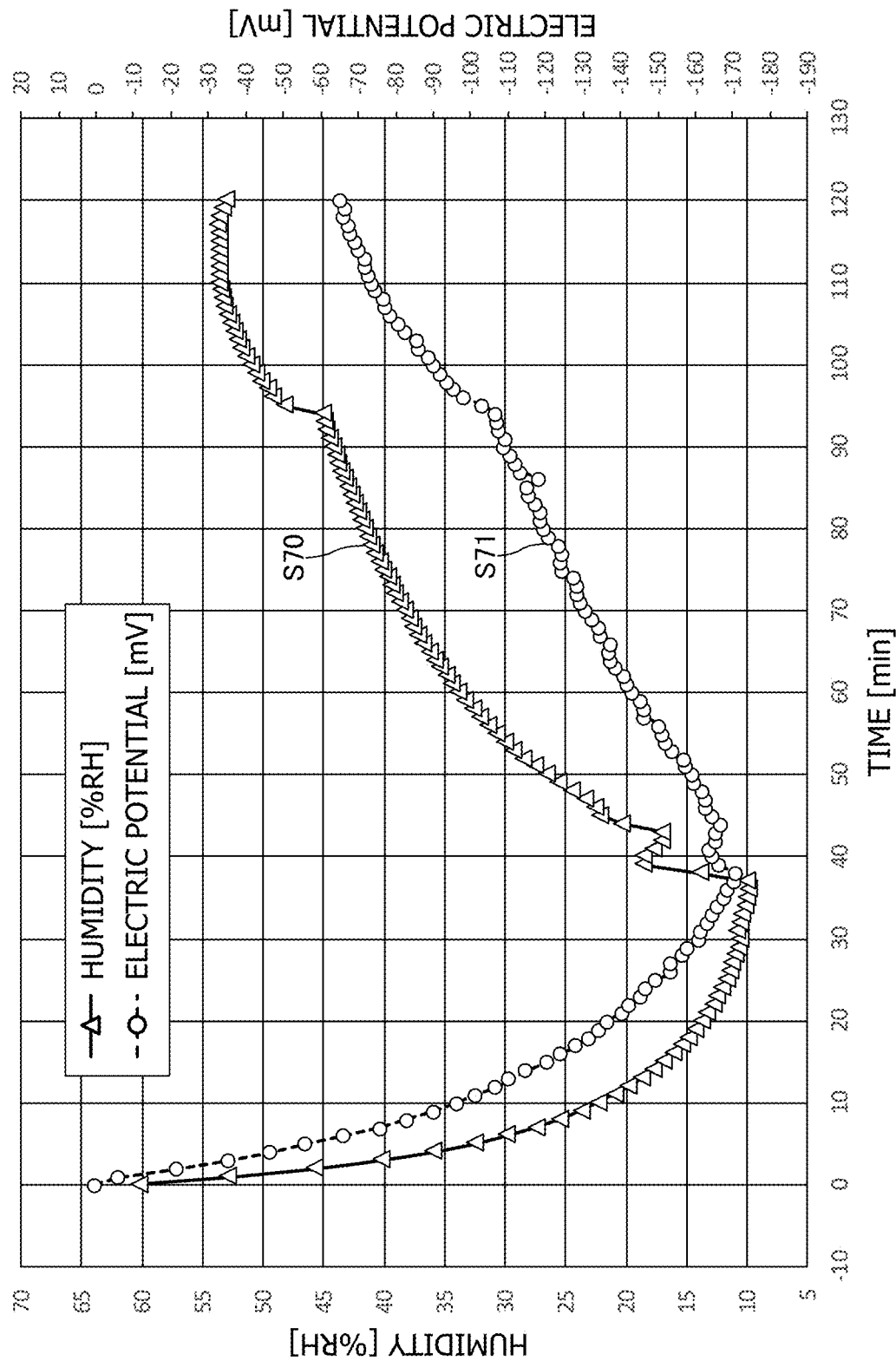
FIG. 22 is a graph illustrating a responsiveness to humidity of a sensor of a third example of the first embodiment.

As illustrated in FIG. 22, the signal S71 stored in the storage device 106 in the sensor 1 changes to follow the reference signal S70 represented by the reference value measured by the humidity sensor with sufficiently high accuracy. In this example, the responsiveness of the sensor 1 of the third example to humidity is lower than that of the sensor 1 of the first example.

In the second operation example, the nitrogen gas is supplied into the gas chamber for a certain period, and then the hydrogen sulfide mixed gas is supplied into the gas chamber for a certain period. Thus, the concentration of hydrogen sulfide inside the gas chamber changes over time.

Figure 23:
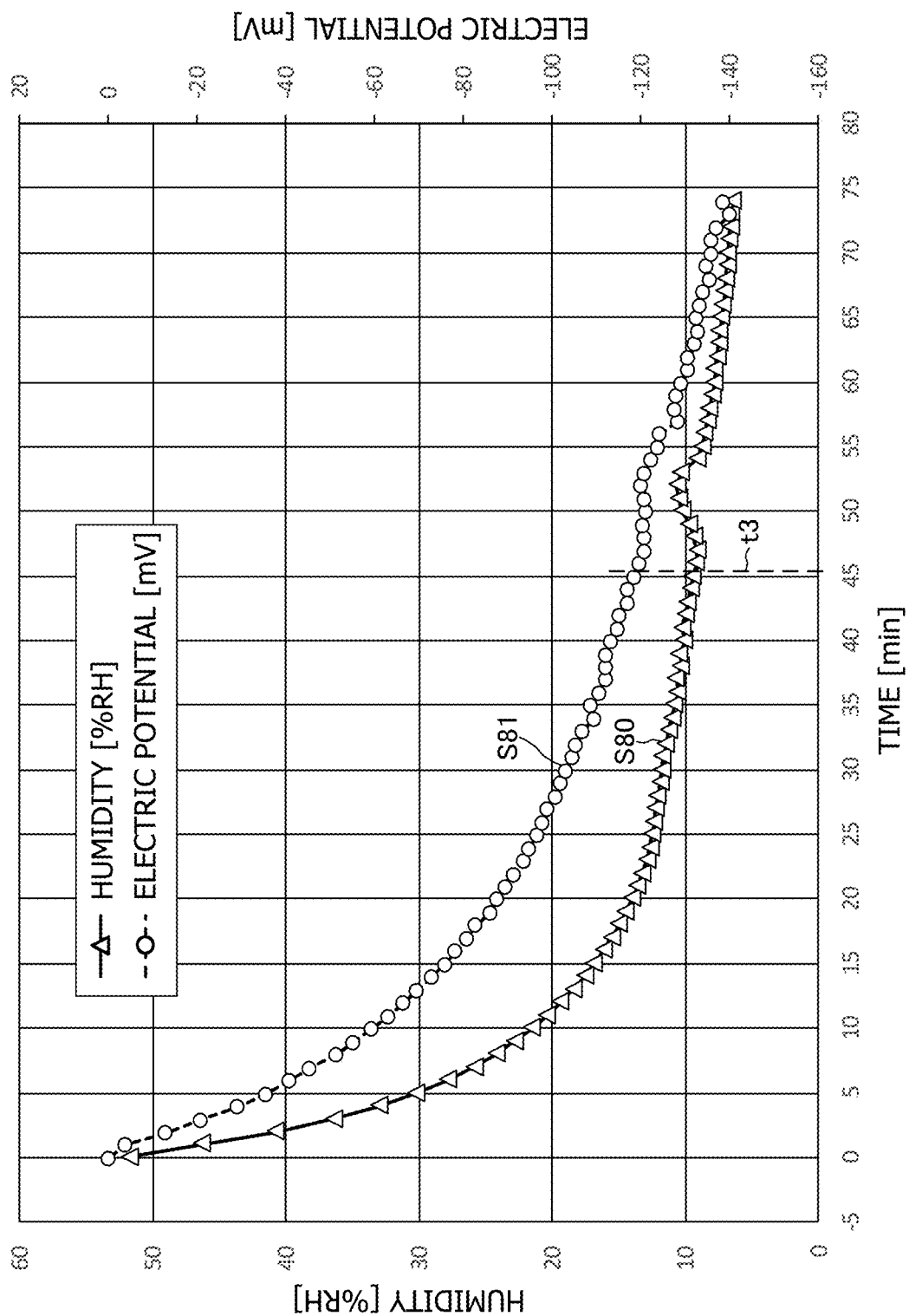
FIG. 23 is a graph illustrating a responsiveness to hydrogen sulfide of the sensor of the third example of the first embodiment.

As illustrated in FIG. 23, after the time point t3 when the gas supplied into the gas chamber is switched from the nitrogen gas to the hydrogen sulfide mixed gas, the signal S81 stored in the storage device 106 of the sensor 1 decreases, similarly to the reference signal S80 represented by the reference value measured by the humidity sensor, almost monotonically with the passage of time.

Therefore, the volume change body 14 of the sensor 1 is estimated to be unlikely to interact with molecules (in this example, hydrogen sulfide) other than humidity (for example, adsorb or sorb hydrogen sulfide).

The responsiveness of the sensor 1 in each example is represented in Table 1. In Table 1, double circles indicate higher responsiveness than circles, and circles indicate higher responsiveness than triangles.

TABLE 1

|  | RESPONSIVENESS TO HUMIDITY | RESPONSIVENESS TO HYDROGEN SULFIDE |
| --- | --- | --- |
| FIRST EXAMPLE | ◎ | ◎ |
| SECOND EXAMPLE | Δ | ○ |
| THIRD EXAMPLE | ○ | Δ |

Second Embodiment

Next, a sensor of the second embodiment will be described. The sensor of the second embodiment differs from the sensor of the first embodiment in that the target is detected based on bending stress. The difference will be mainly described below. In the description of the second embodiment, the one with the same reference sign as used in the first embodiment is the same or substantially the same one.

As illustrated in FIGS. 24 to 27, similarly to the sensor 1 of the first embodiment, the sensor 1A of the second embodiment includes a first layered body 11, a second layered body 12, a third layered body 13, and a volume change body 14.

Figure 24:
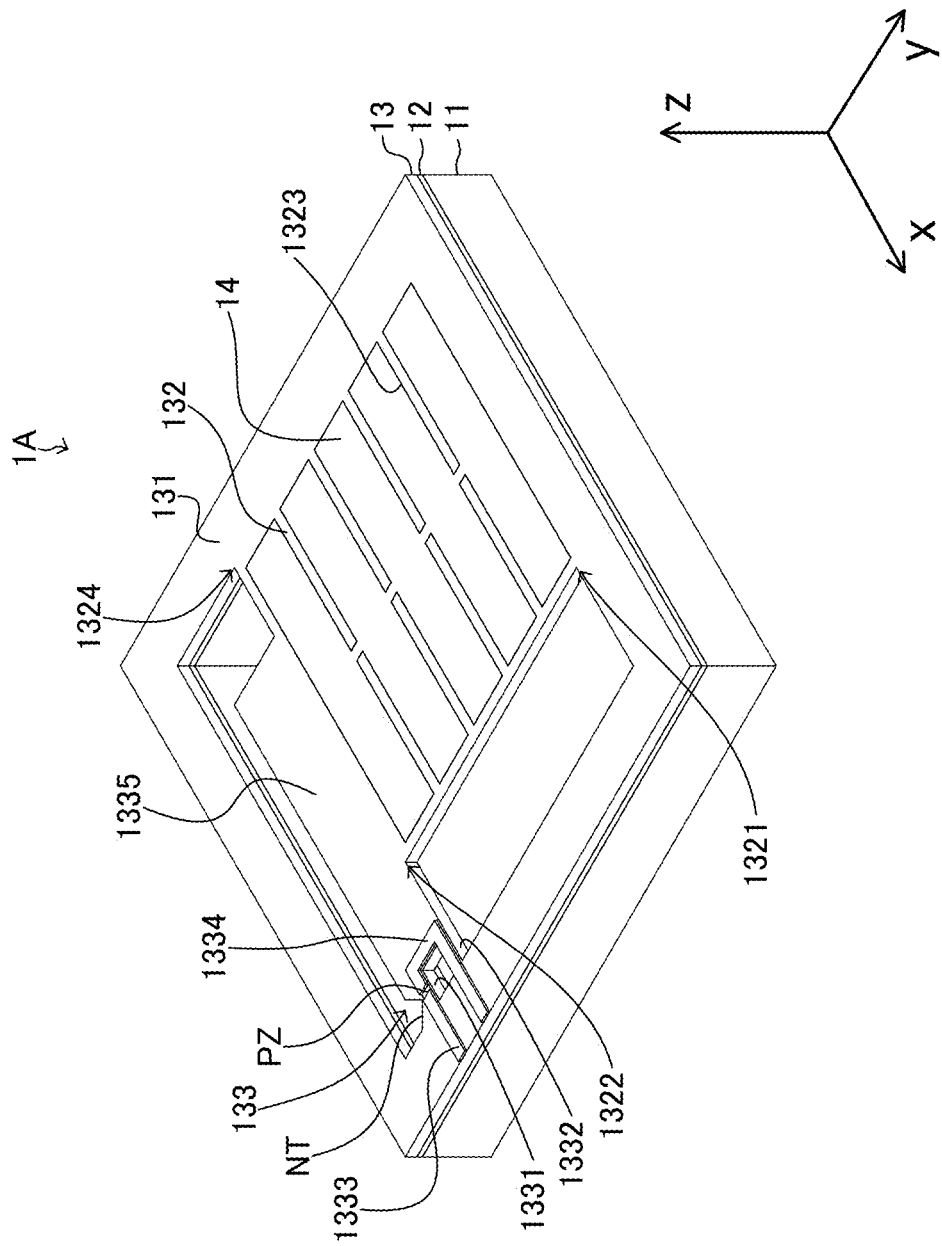
FIG. 24 is a right front upper perspective view of a sensor of a second embodiment.
Figure 25:
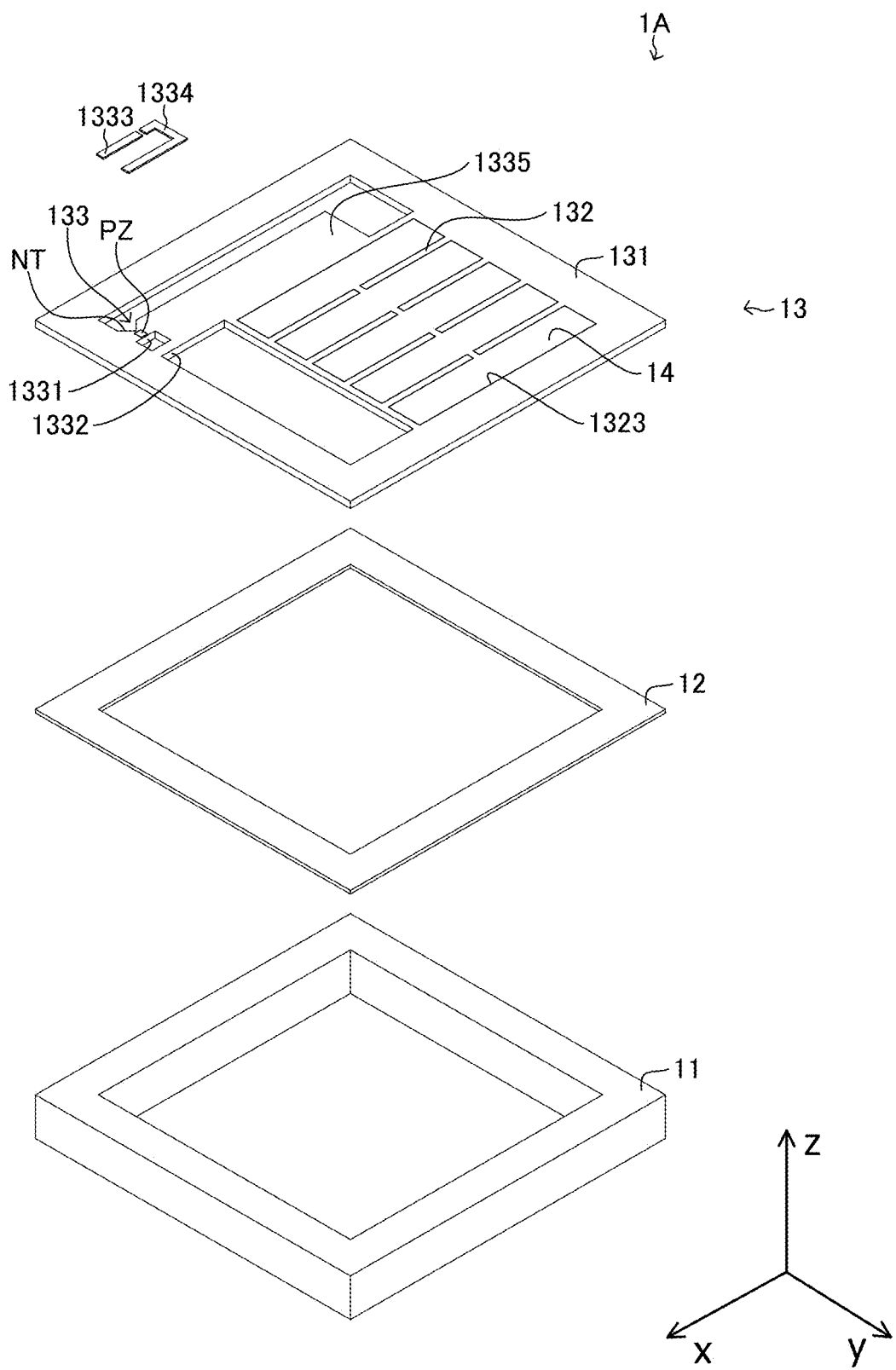
FIG. 25 is a right front upper perspective view of the sensor in a state where the sensor of the second embodiment is disassembled.
Figure 26:
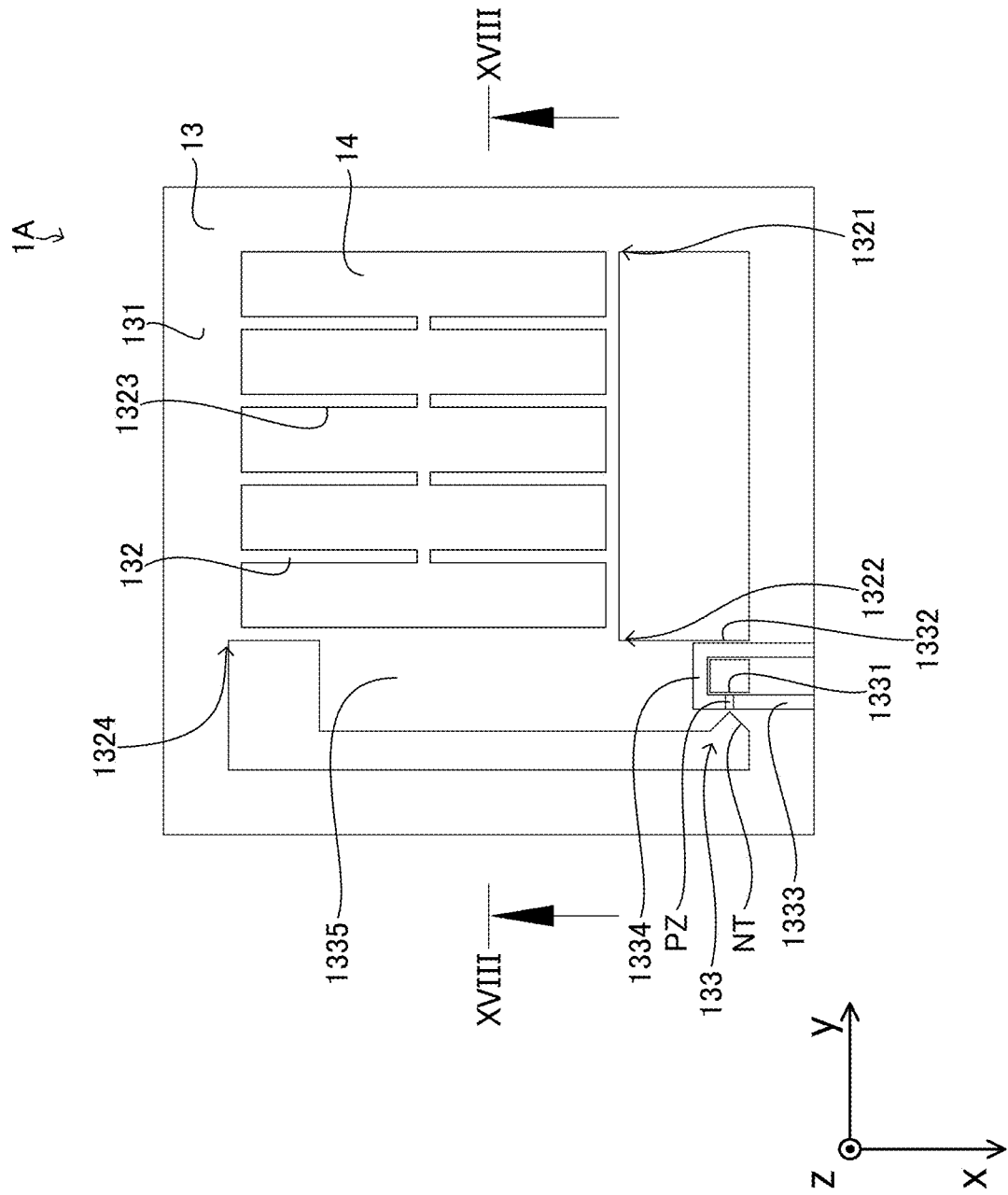
FIG. 26 is a plan view of the sensor of the second embodiment.
Figure 27:
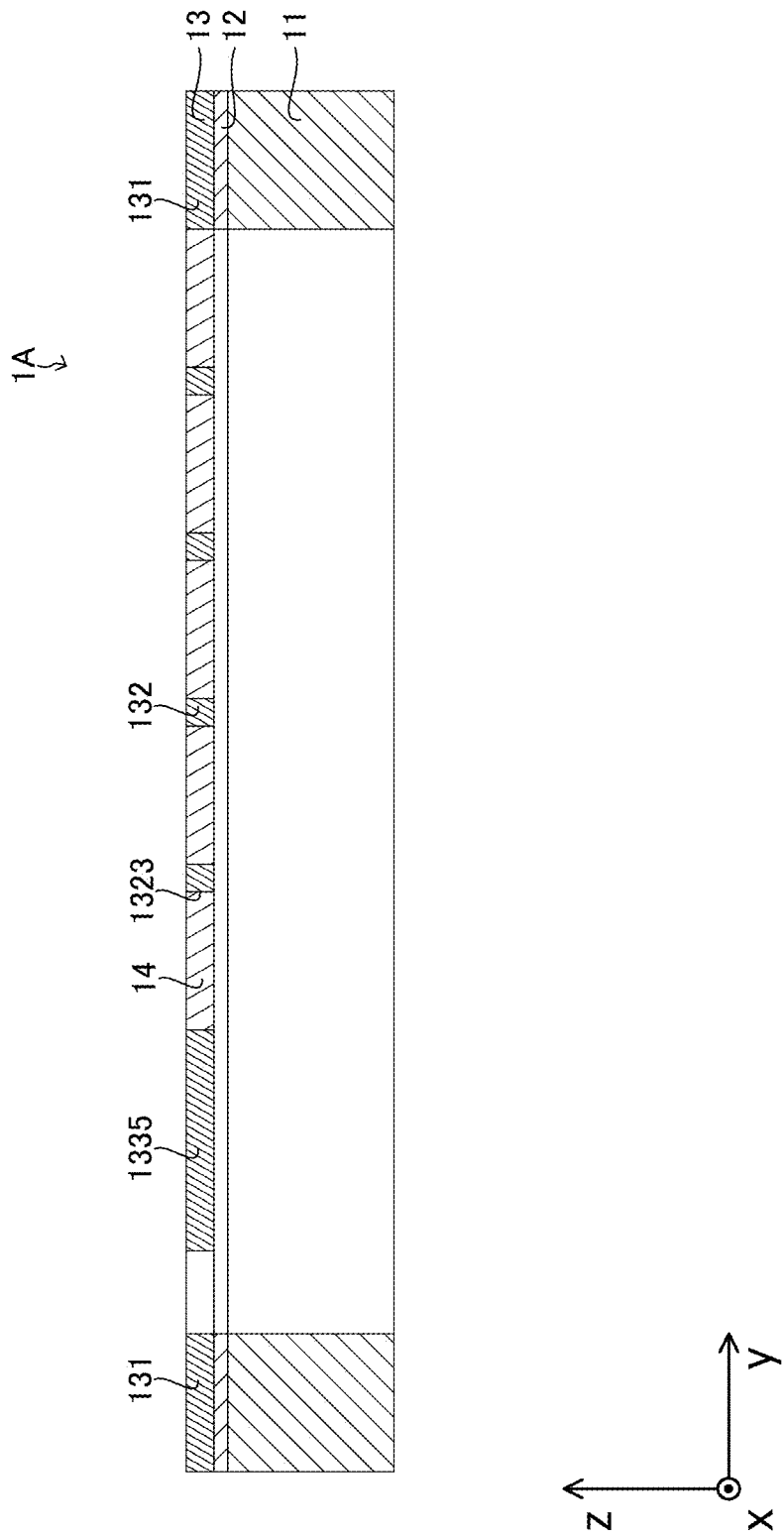
FIG. 27 is a cross-sectional view of the sensor cut by a plane represented by an XVIII-XVIII line in FIG. 26.

FIG. 24 is a right front upper perspective view of the sensor 1A. FIG. 25 is a right front upper perspective view of the sensor 1A in a state where the sensor 1A is disassembled. FIG. 26 is a plan view of the sensor 1A. FIG. 27 is a view of the cross section of the sensor 1A cut by a plane represented by an XVIII-XVIII line in FIG. 26 as viewed in the negative direction of the x-axis.

As illustrated in FIG. 26, the third layered body includes a frame 131, a body member 132, and a detection member 133. The detection member 133 includes an extension member 1335 in addition to the first supported member 1331, the second supported member 1332, the first wiring 1333, and the second wiring 1334 included in the detection member 133 of the first embodiment.

The frame 131 has a configuration similar to the frame 131 of the first embodiment.

The body member 132 has a rectangular-like shape having long sides extending in the y-axis direction and short sides extending in the x-axis direction. The body member 132 may have a square-like shape. The length of the body member 132 in the y-axis direction is shorter than the length of the hole of the frame 131 in the y-axis direction. In this example, the length of the body member 132 in the y-axis direction is 260 μm. The length of the body member 132 in the x-axis direction is shorter than the length of the hole of the frame 131 in the x-axis direction. In this example, the length of the body member 132 in the x-axis direction is 240 μm. The end in the positive direction of the x-axis of the body member 132 is separated from the frame 131.

The body member 132 is in contact with the frame 131 at the first end 1321 in the positive direction of the y-axis of the body member 132. In other words, in the body member 132, the first end 1321 in the positive direction of the y-axis of the body member 132 is supported by the frame 131.

A part of the body member 132 other than the end portion in the negative direction of the x-axis in the second end 1322 in the negative direction of the y-axis is in contact with the extension member 1335. The end portion in the negative direction of the x-axis in the second end 1322 in the negative direction of the y-axis of the body member 132 is separated from the frame 131.

The body member 132 is in contact with the frame 131 at the third end 1324 in the negative direction of the x-axis of the body member 132. In other words, in the body member 132, the third end 1324 in the negative direction of the x-axis of the body member 132 is supported by the frame 131.

The body member 132 has a space formation portion 1323. The space formation portion 1323 forms the storage space opening at both end faces in the z-axis direction (in other words, the thickness direction of the body member 132) of the body member 132. In this example, the storage space is a through hole that penetrates the body member 132 in the z-axis direction.

The storage space includes slit portions, each of which has a slit-like shape extending in the x-axis direction, and a connection portion that connects two adjacent slit portions at the central portion in the x-axis direction. In this example, the slit portions included in the storage space are arranged at equal intervals along the y-axis direction.

For example, the length in the y-axis direction of each slit portion included in the storage space is a length of 1 μm to 10 μm. In this example, the length in the y-axis direction of each slit portion included in the storage space is 5 μm. For example, the interval in the y-axis direction between the slit portions included in the storage space is a length of 1 μm to 10 μm. In this example, the interval in the y-axis direction between the slit portions included in the storage space is 1 μm. In this example, the number of the slit portions included in the storage space is 40. Note that in FIGS. 24 to 27, the slit portions included in the storage space are illustrated in an enlarged manner in the y-axis direction. Therefore, in FIGS. 24 to 27, the slit portions included in the storage space are illustrated in a reduced number manner.

In this example, the length in the x-axis direction of the slit portions included in the storage space is 220 μm.

As illustrated in FIG. 26, the extension member 1335 has a rectangular-like shape having long sides extending in the x-axis direction and short sides extending in the y-axis direction. The end in the negative direction of the x-axis of the extension member 1335 is separated from the frame 131. The end in the negative direction of the y-axis of the extension member 1335 is separated from the frame 131.

A part of the extension member 1335 other than the end portion in the positive direction of the x-axis in the end in the positive direction of the y-axis is in contact with the second end 1322 of the body member 132. The end portion in the positive direction of the x-axis in the end in the positive direction of the y-axis of the extension member 1335 is separated from the frame 131.

In this way, the extension member 1335 extends from the second end 1322 to a position (in this example, the position in the positive direction of the x-axis relative to the position in contact with the second end 1322) different from a position in contact with the second end 1322 in the x-axis direction.

Both end portions in the y-axis direction in the end (in other words, the tip of the extension member 1335) in the positive direction of the x-axis of the extension member 1335 are in contact with the frame 131 through the first supported member 1331 and the second supported member 1332. The central portion in the y-axis direction of the tip of the extension member 1335 is separated from the frame 131.

The first supported member 1331 has a strip-like shape extending in the x-axis direction. The end in the positive direction of the x-axis of the first supported member 1331 is in contact with the frame 131. The end in the negative direction of the x-axis of the first supported member 1331 is in contact with the end portion in the negative direction of the y-axis in the tip of the extension member 1335. In other words, the first supported member 1331 extends from the tip of the extension member 1335 to the positive direction of the x-axis. The tip of the first supported member 1331 is supported by the frame 131.

The width (in other words, the length of the first supported member 1331 in the y-axis direction) of the first supported member 1331 is narrower than the width (in other words, the length of the extension member 1335 in the y-axis direction) of the extension member 1335.

The first supported member 1331 has a notch portion NT. In this example, as a position in the x-axis direction approaches the center from the end in the x-axis direction of the first supported member 1331, a position of the end in the negative direction of the y-axis of the notch portion NT changes toward the positive direction of the y-axis. Therefore, the width of the central portion in an extension direction (the x-axis direction in this example), in which the first supported member 1331 extends, of the first supported member 1331 is narrower than the width of each of the end portions in the extension direction of the first supported member 1331.

The first supported member 1331 includes a piezoresistive element PZ located in the central portion in the extension direction of the first supported member 1331. The piezoresistive element PZ is an element whose electric resistance changes depending on the stress applied to the piezoresistive element PZ. In other words, the piezoresistive element PZ is an element having a piezoresistive effect.

Similarly to the piezoresistive element PZ of the first embodiment, the piezoresistive element PZ is embedded in the first supported member 1331 so as to be exposed at the end face in the positive direction of the z-axis of the first supported member 1331.

With such a configuration, the detection member 133 detects the stress transmitted from the body member 132 in the central portion in the extension direction of the first supported member 1331.

The second supported member 1332 has a strip-like shape extending in the x-axis direction. The end in the positive direction of the x-axis of the second supported member 1332 is in contact with the frame 131. The end in the negative direction of the x-axis of the second supported member 1332 is in contact with the end portion in the positive direction of the y-axis of the tip of the extension member 1335. In other words, the second supported member 1332 extends from the tip of the extension member 1335 to the positive direction of the x-axis. The tip of the second supported member 1332 is supported by the frame 131.

The width (in other words, the length in the y-axis direction of the second supported member 1332) of the second supported member 1332 is narrower than the width of the extension member 1335. The width of the central portion in an extension direction (the x-axis direction in this example), in which the second supported member 1332 extends, of the second supported member 1332, is equal to the width of each of the end portions in the extension direction of the second supported member 1332.

The first wiring 1333 and the second wiring 1334 have similar configurations to the first wiring 1333 and the second wiring 1334 of the first embodiment, respectively, except that the positions are different.

In this example, one end portion of the first wiring 1333 is in contact with the end portion in the positive direction of the x-axis of the piezoresistive element PZ. The other end portion of the first wiring 1333 is located at the outer edge of the frame 131. The first wiring 1333 extends from the end portion in the positive direction of the x-axis of the piezoresistive element PZ to the outer edge of the frame 131 through the tip (in other words, the end, which is in contact with the frame 131, of the first supported member 1331) of the first supported member 1331. In other words, the first wiring 1333 connects the piezoresistive element PZ and the tip of the first supported member 1331.

One end portion of the second wiring 1334 is in contact with the end portion in the negative direction of the x-axis of the piezoresistive element PZ. The other end portion of the second wiring 1334 is located at the outer edge of the frame 131. The second wiring 1334 extends from the end portion in the negative direction of the x-axis of the piezoresistive element PZ to the outer edge of the frame 131 through the proximal end (in other words, the end, which is in contact with the extension member 1335, of the first supported member 1331) of the first supported member 1331, the end portion in the positive direction of the x-axis of the extension member 1335, and the second supported member 1332.

In other words, the second wiring 1334 connects the piezoresistive element PZ and the tip (in other words, the end, which is in contact with the frame 131, of the second supported member 1332) of the second supported member 1332 through the extension member 1335.

Similarly to the volume change body 14 of the first embodiment, the volume change body 14 is supported by the body member 132 so as to be stored in the storage space of the body member 132.

Furthermore, the first wiring 1333 and the second wiring 1334 are connected to a similar electric circuit to that of the first embodiment.

As described above, according to the sensor 1A of the second embodiment, operations and effects similar to those of the sensor 1 of the first embodiment are accomplished.

Further, in the sensor 1A of the second embodiment, the extension member 1335 extends from the second end 1322 to a position different from the position in contact with the second end 1322 in the second direction (the x-axis direction in this example) orthogonal to the first direction (the y-axis direction in this example). The first supported member 1331 extends from the tip of the extension member 1335. The tip of the first supported member 1331 is supported. The detection member 133 detects the stress caused by the change in the volume of the volume change body 14 in the first supported member 1331.

According to this, the bending stress caused by the change in the volume of the volume change body 14 in the first supported member 1331 can be increased. Therefore, the change in the volume of the volume change body 14 can be reflected with high accuracy in the stress occurring in the first supported member 1331. As a result, the target can be detected with high accuracy.

Further, in the sensor 1A of the second embodiment, the width of the first supported member 1331 is narrower than the width of the extension member 1335.

According to this, the stress caused by the change in the volume of the volume change body 14 in the first supported member 1331 can be larger than the stress occurring in the extension member 1335. Therefore, the change in the volume of the volume change body 14 can be reflected with high accuracy in the stress occurring in the first supported member 1331. As a result, the target can be detected with high accuracy.

Further, in the sensor 1A of the second embodiment, the detection member 133 includes the second supported member 1332, whose tip is supported, that extends from the tip of the extension member 1335. The detection member 133 has the piezoresistive element PZ located in the first supported member 1331. The detection member 133 includes the first wiring 1333 connecting the piezoresistive element PZ and the tip of the first supported member 1331, and the second wiring 1334 connecting the piezoresistive element PZ and the tip of the second supported member 1332 through the extension member 1335.

According to this, the leak current occurring between the first wiring 1333 and the second wiring 1334 can be suppressed. Therefore, the target can be detected with high accuracy.

Further, in the sensor 1A of the second embodiment, the width of the central portion in the extension direction, in which the first supported member 1331 extends, of the first supported member 1331 is narrower than the width of each of the end portions in the extension direction of the first supported member 1331. The detection member 133 detects the stress caused by the change in the volume of the volume change body 14 in the central portion in the extension direction of the first supported member 1331.

According to this, the stress caused by the change in the volume of the volume change body 14 in the central portion in the extension direction of the first supported member 1331 can be larger than the stress occurring in each of the end portions in the extension direction of the first supported member 1331. Therefore, the change in the volume of the volume change body 14 can be reflected with high accuracy in the stress occurring in the central portion. As a result, the target can be detected with high accuracy.

In the sensor 1A of the second embodiment, the volume change body 14 is entirely stored in the storage space of the body member 132. In the sensor 1A of a first modified example of the second embodiment, a part of the volume change body 14 may be stored in the storage space, and the other part of the volume change body 14 may cover at least a part of both end faces in the thickness direction of the body member 132. For example, the volume change body 14 may cover an area in which the space formation portion 1323 exists in both end faces in the thickness direction of the body member 132.

In the sensor 1A of the second embodiment, the extension member 1335 is in contact with the frame 131 at the tip of the extension member 1335 through two supported members consisting of the first supported member 1331 and the second supported member 1332. Alternatively, in the sensor 1A of a second modified example of the second embodiment, the extension member 1335 may be in contact with the frame 131 at the tip of the extension member 1335 through one supported member, or through three or more supported members.

Figure 28:
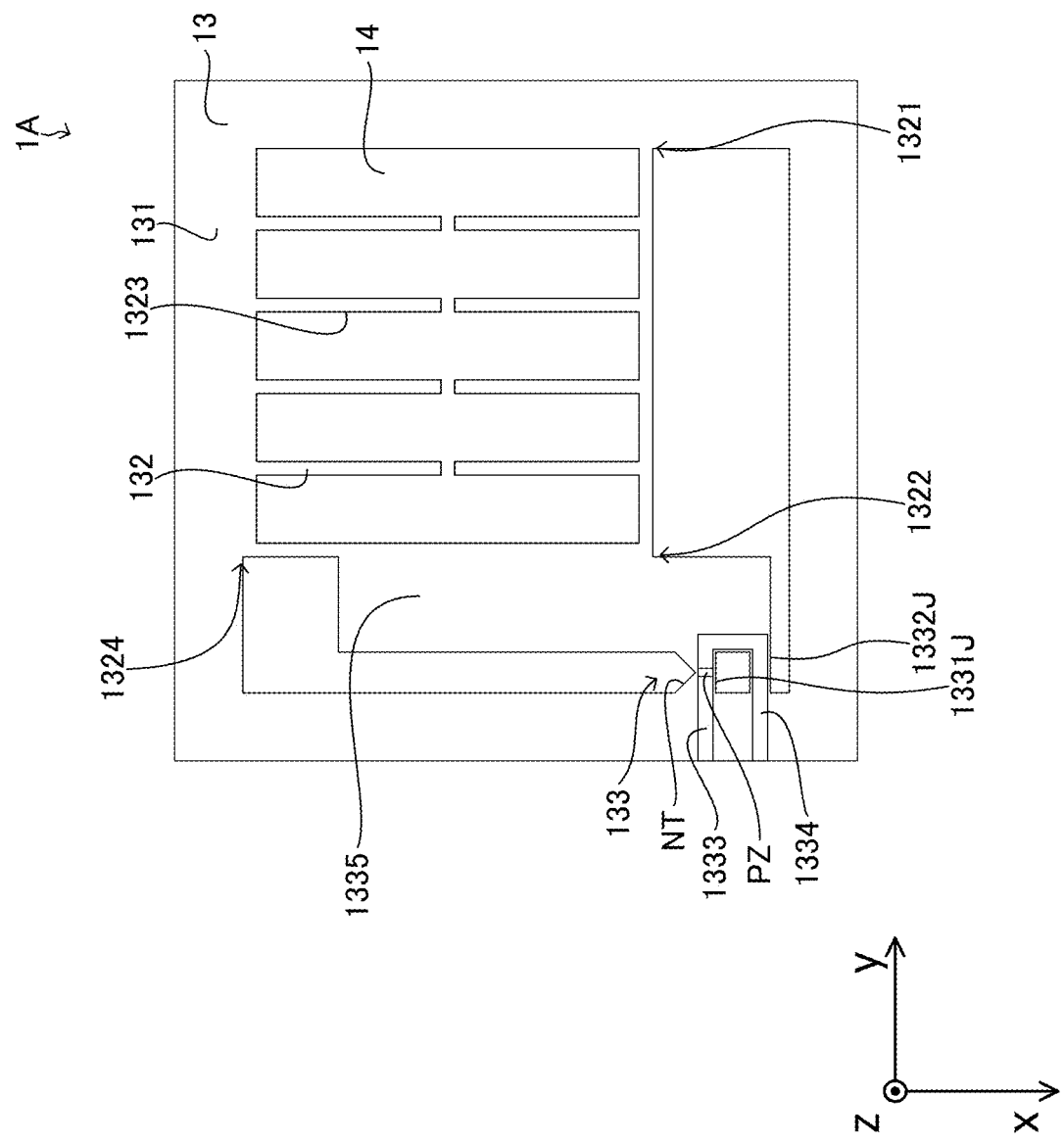
FIG. 28 is a plan view of a sensor of a third modified example of the second embodiment.

Alternatively, as illustrated in FIG. 26, in the sensor 1A of the second embodiment, the first supported member 1331 and the second supported member 1332 extend from both end portions in the y-axis direction in the end in the positive direction of the x-axis of the extension member 1335 to the positive direction of the x-axis, respectively. As illustrated in FIG. 28, in the sensor 1A of a third modified example of the second embodiment, the first supported member 1331J and the second supported member 1332J may extend from the end portion in the positive direction of the x-axis in the end in the negative direction of the y axis of the extension member 1335 to the negative direction of the y-axis, respectively.

Figure 29:
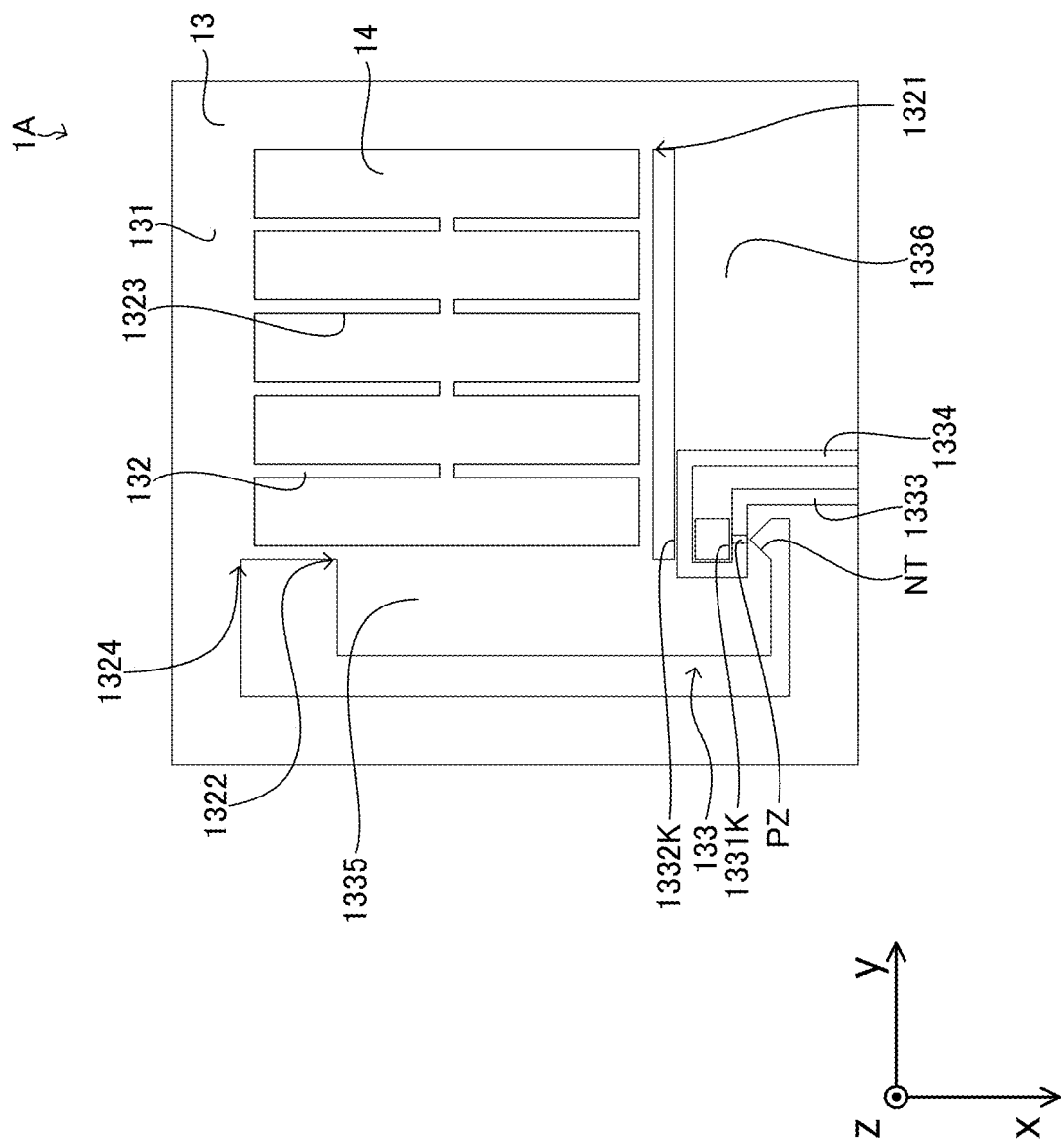
FIG. 29 is a plan view of a sensor of a fourth modified example of the second embodiment.

Alternatively, as illustrated in FIG. 29, in the sensor 1A of a fourth modified example of the second embodiment, the first supported member 1331K and the second supported member 1332K may extend from the end portion in the positive direction of the x-axis in the end in the positive direction of the y-axis of the extension member 1335 to the positive direction of the y-axis, respectively. In this case, the detection member 133 may include a connection portion 1336 that connects the first supported member 1331K and the second supported member 1332K to the frame 131.

Figure 30:
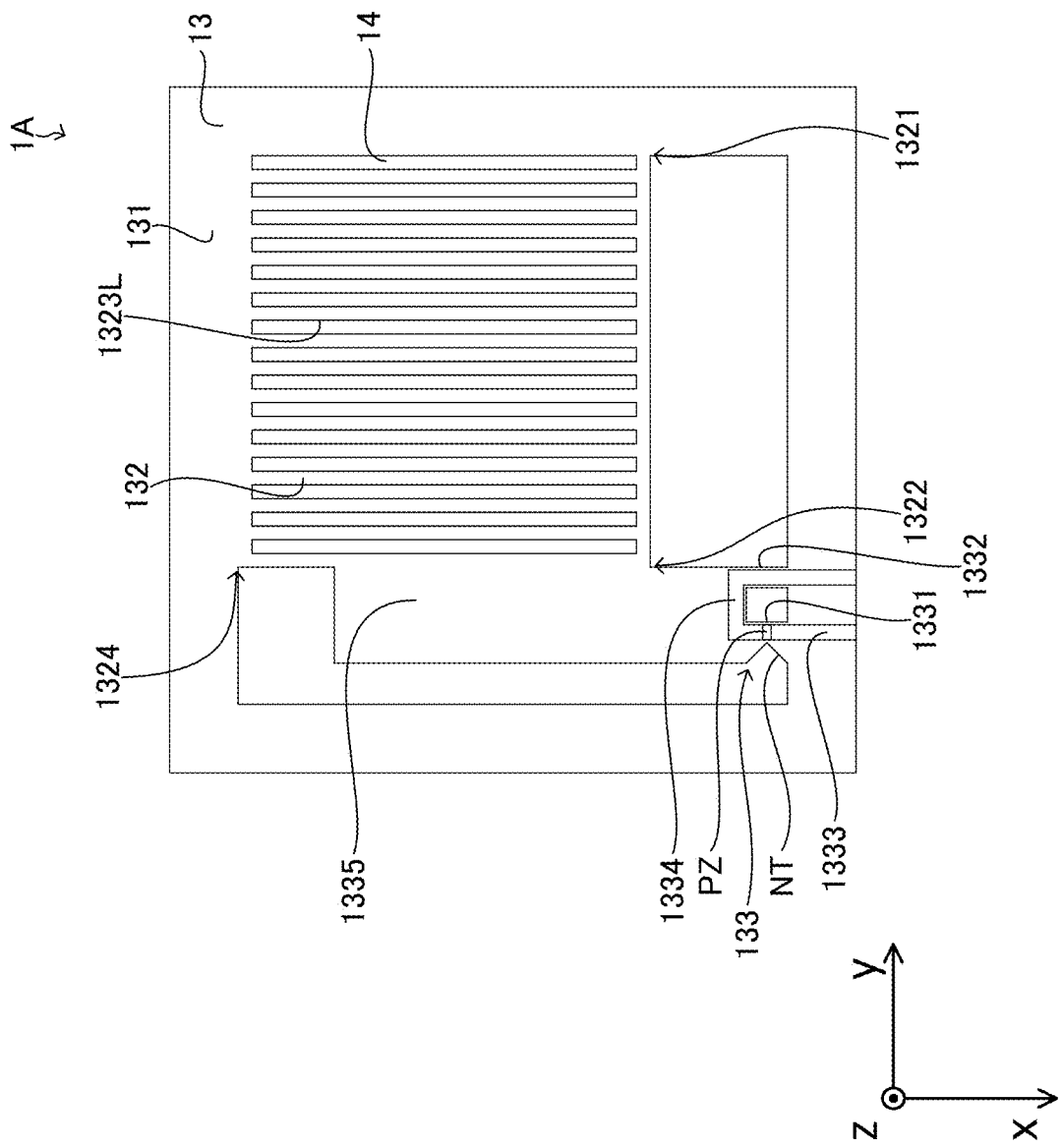
FIG. 30 is a plan view of a sensor of a fifth modified example of the second embodiment.

As illustrated in FIG. 26, in the sensor 1A of the second embodiment, the storage space formed by the space formation portion 1323 of the body member 132 is one hole including the slit portions. Alternatively, as illustrated in FIG. 30, in the sensor 1A of a fifth modified example of the second embodiment, the storage space formed by the space formation portion 1323L of the body member 132 may include multiple slit-like holes extending in the x-axis direction, similarly to the space formation portion 1323 of the first embodiment. In this case, each hole included in the storage space may be a bottomed hole that opens at the end face in the positive direction of the z-axis of the body member 132. Alternatively, each hole included in the storage space may be a first hole that is bottomed and opens at the end face in the positive direction of the z-axis of the body member 132, or a second hole that is bottomed and opens at the end face in the negative direction of the z-axis of the body member 132.

Figure 31:
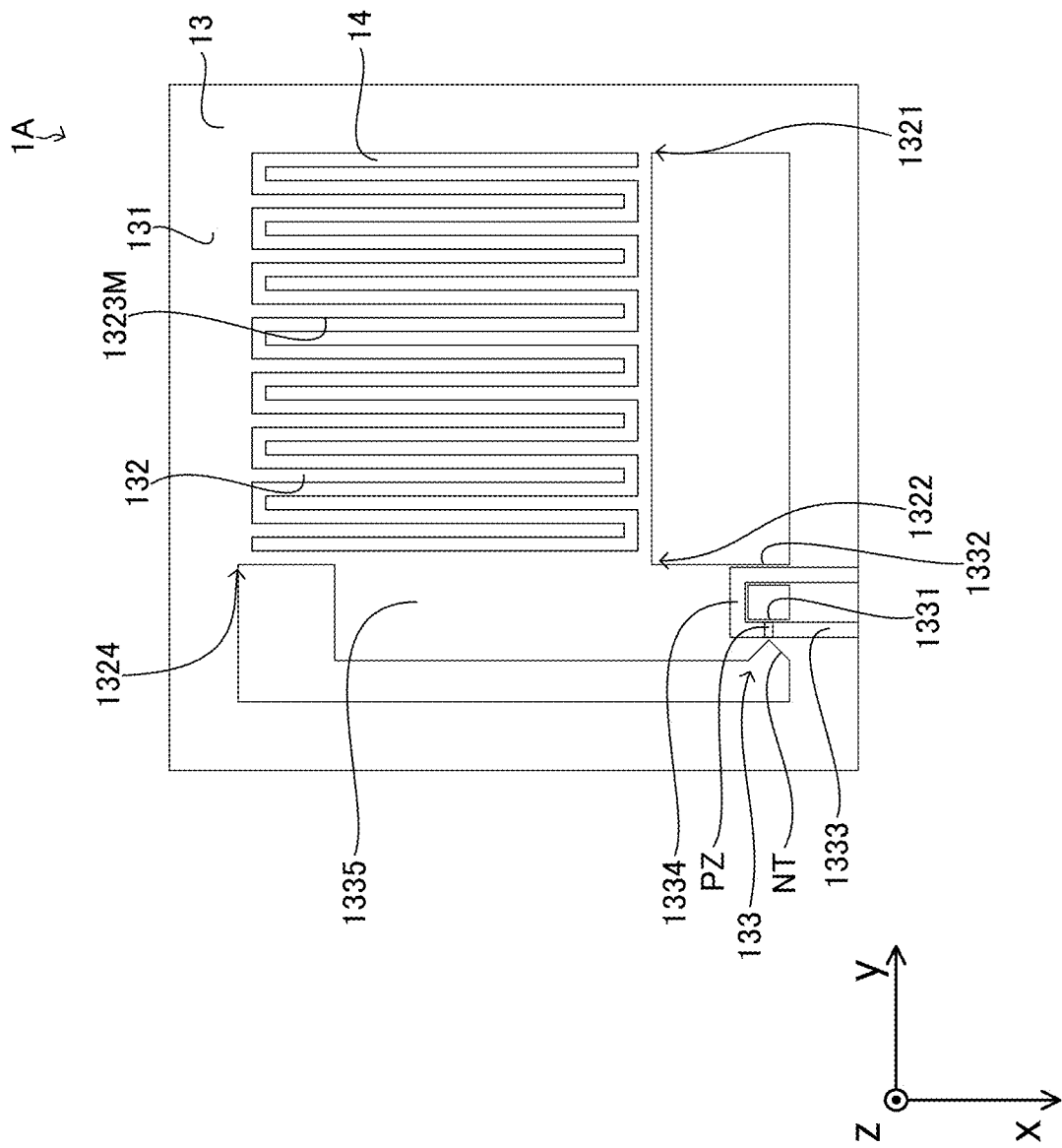
FIG. 31 is a plan view of a sensor of a sixth modified example of the second embodiment.

As illustrated in FIG. 26, in the sensor 1A of the second embodiment, the storage space formed by the space formation portion 1323 of the body member 132 includes the slit portions and the connection portion that connects the slit portions at the central portion. As illustrated in FIG. 31, in the sensor 1A of a sixth modified example of the second embodiment, the space formation portion 1323M of the body member 132 may have a comb teeth-like shape in the plan view of the body member 132 (in other words, when the body member 132 is viewed in the negative direction of the z-axis).

Figure 32:
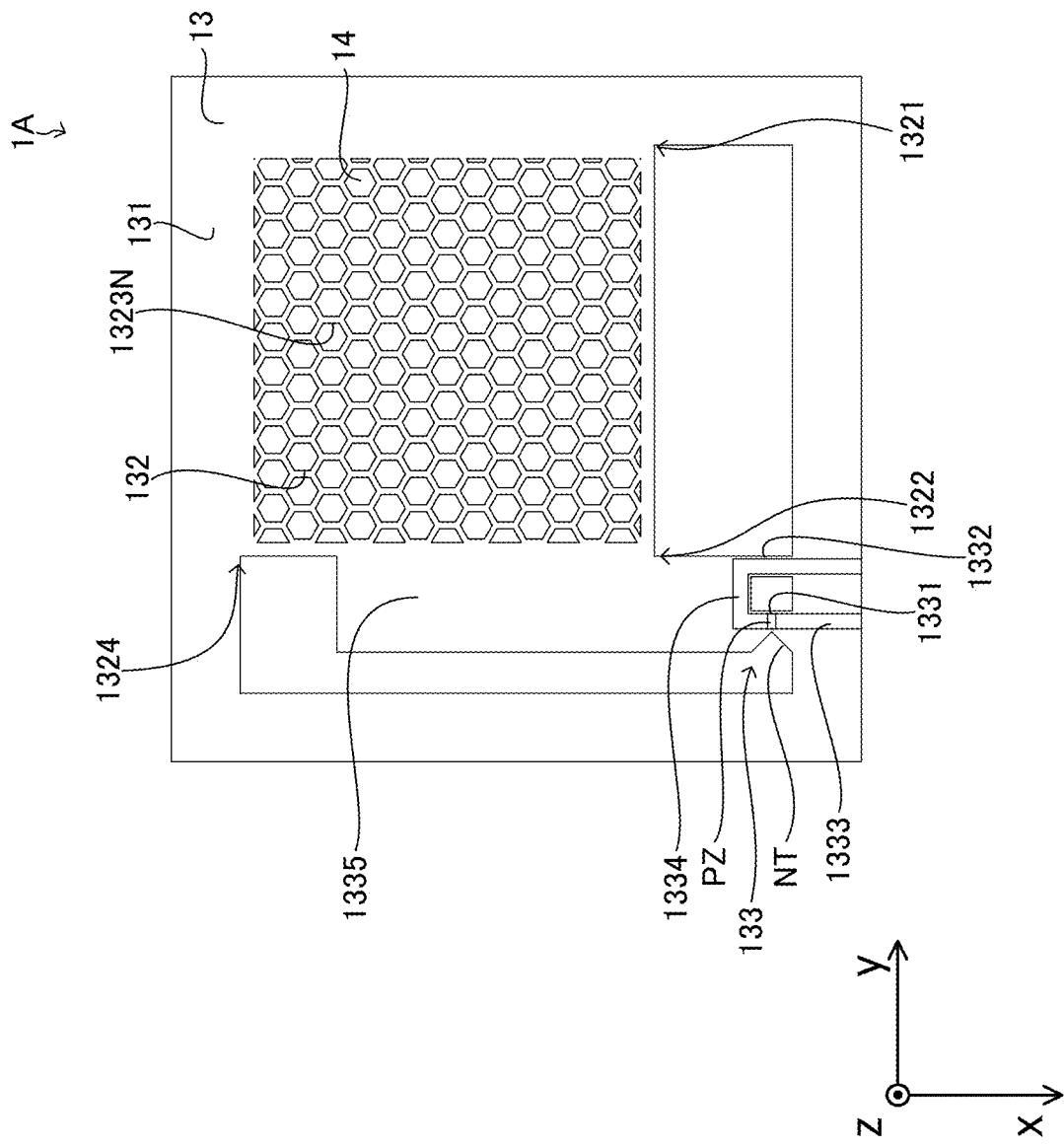
FIG. 32 is a plan view of a sensor of a seventh modified example of the second embodiment.

Alternatively, as illustrated in FIG. 32, in the sensor 1A of a seventh modified example of the second embodiment, the space formation portion 1323N of the body member 132 may have a mesh-like shape in the plan view of the body member 132 (in other words, when the body member 132 is viewed in the negative direction of the z-axis). For example, as illustrated in FIG. 32, each hole included in the storage space may be a regular hexagon in the plan view of the body member 132. Each hole included in the storage space may have a shape (circular, elliptical, or polygonal shape other than regular hexagon) other than regular hexagon in the plan view of the body member 132.

The sensor 1A of the second embodiment may be applied to a detecting device that detects each of different targets. In this case, the detecting device preferably includes a plurality of the sensors 1A having different sensing materials. For example, the plurality of sensors 1A may be arranged in a grid pattern.

Third Embodiment

Next, a sensor of the third embodiment will be described. The sensor of the third embodiment differs from the sensor of the first embodiment in that the target is detected based on vibration. The difference will be mainly described below. In the description of the third embodiment, the one with the same reference sign as used in the first embodiment is the same or substantially the same one.

As illustrated in FIGS. 33 to 36, similarly to the sensor 1 of the first embodiment, the sensor 1B of the third embodiment includes a first layered body 11, a second layered body 12, a third layered body 13, and a volume change body 14.

Figure 33:
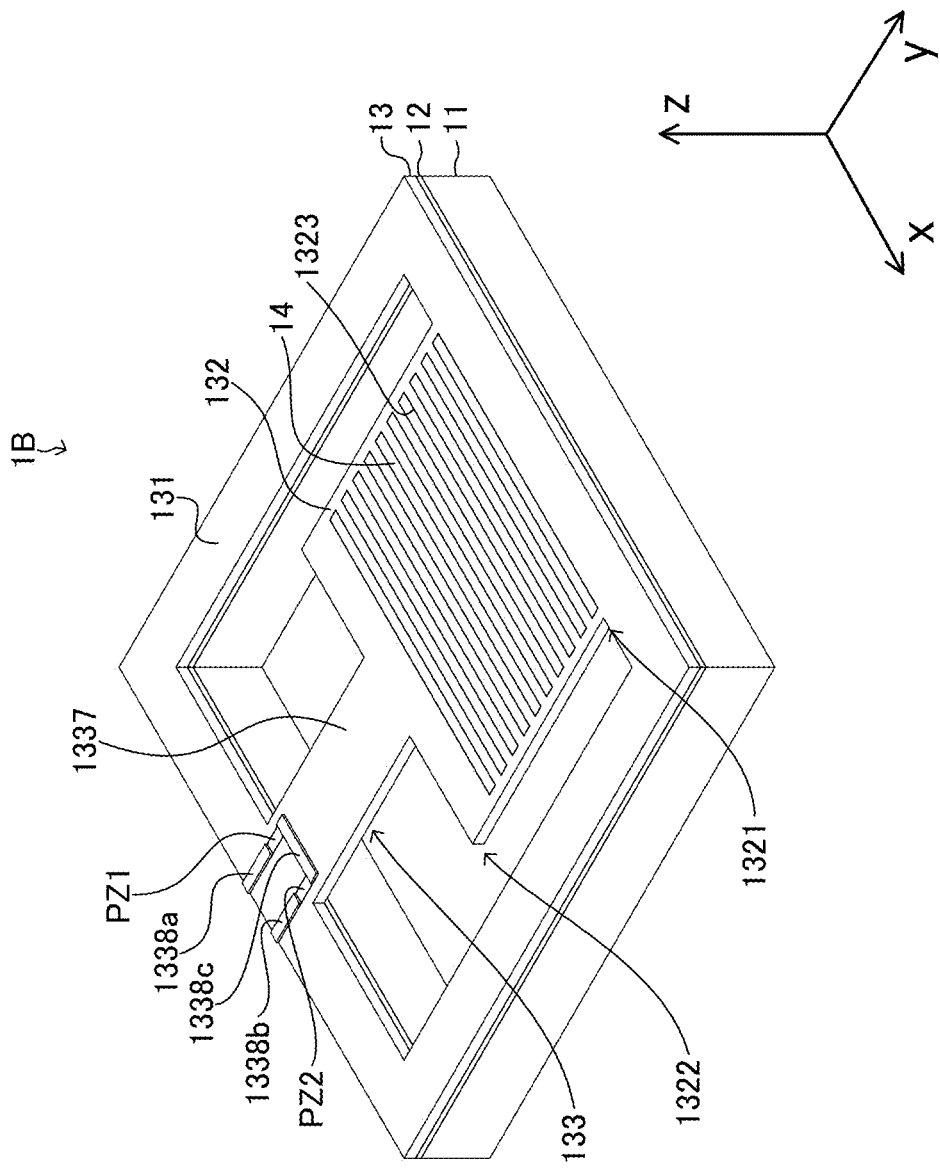
FIG. 33 is a right front upper perspective view of a sensor of a third embodiment.
Figure 34:
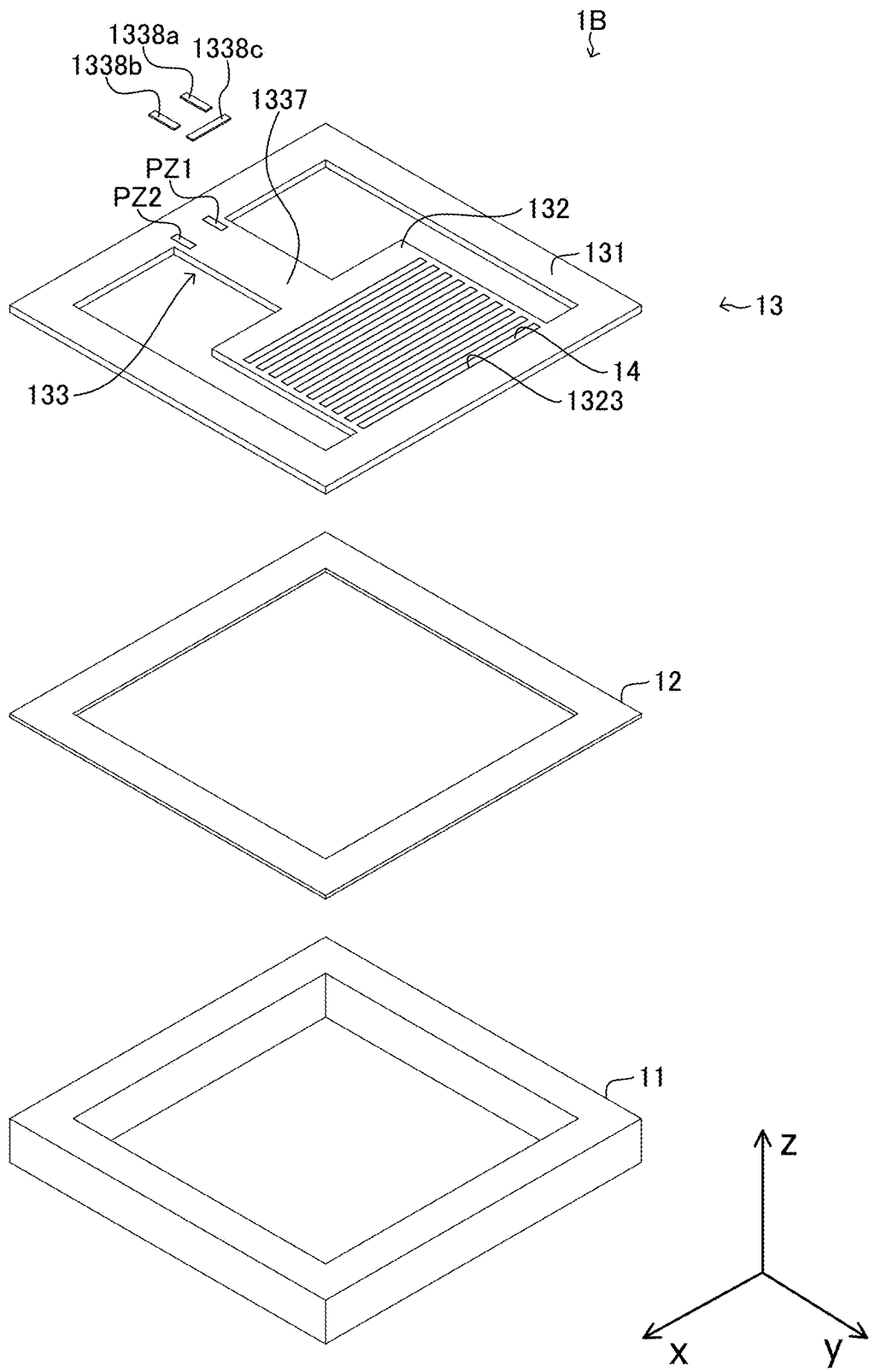
FIG. 34 is a right front upper perspective view of the sensor of the third embodiment in a state where the sensor is disassembled.
Figure 35:
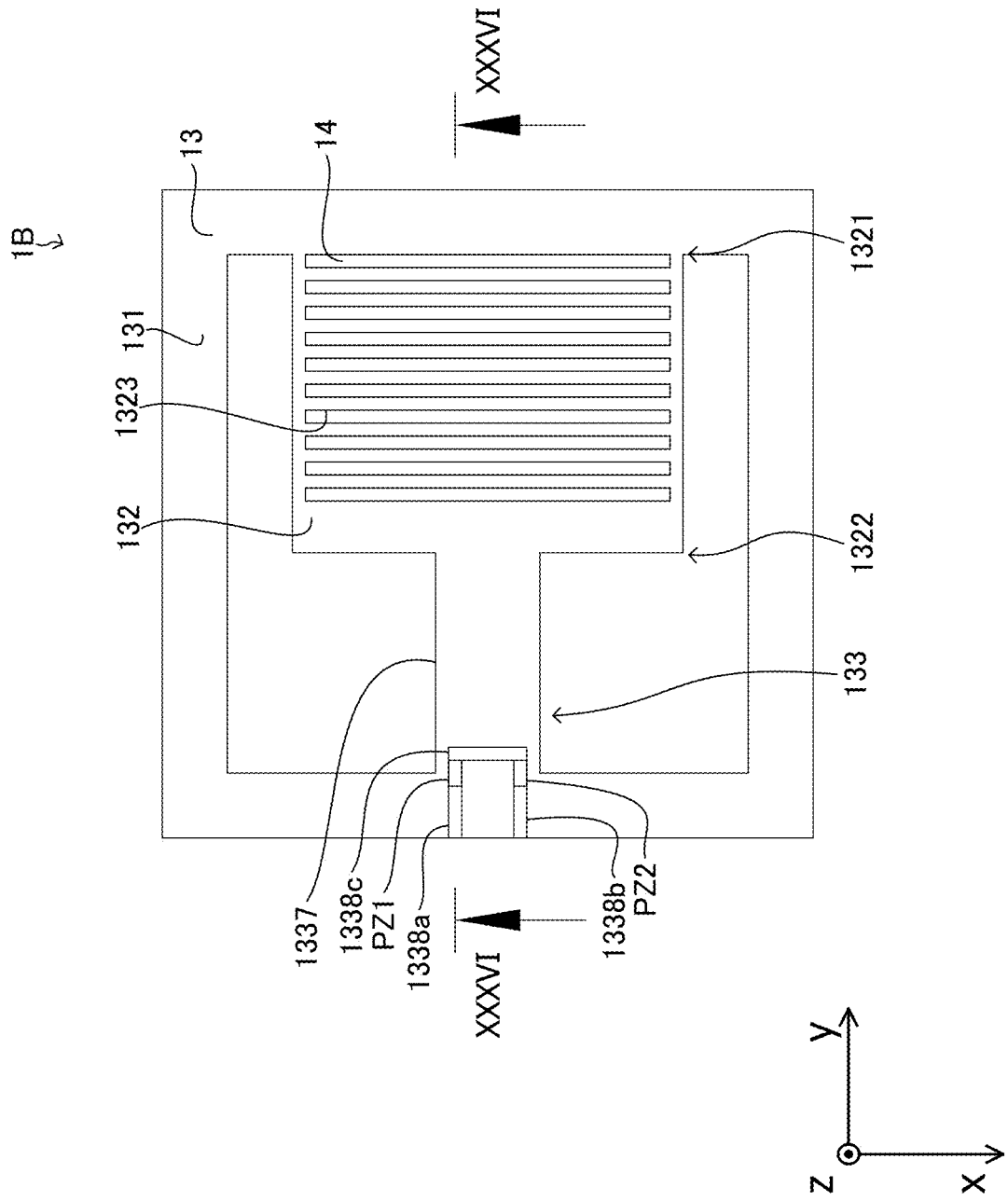
FIG. 35 is a plan view of the sensor of the third embodiment.
Figure 36:
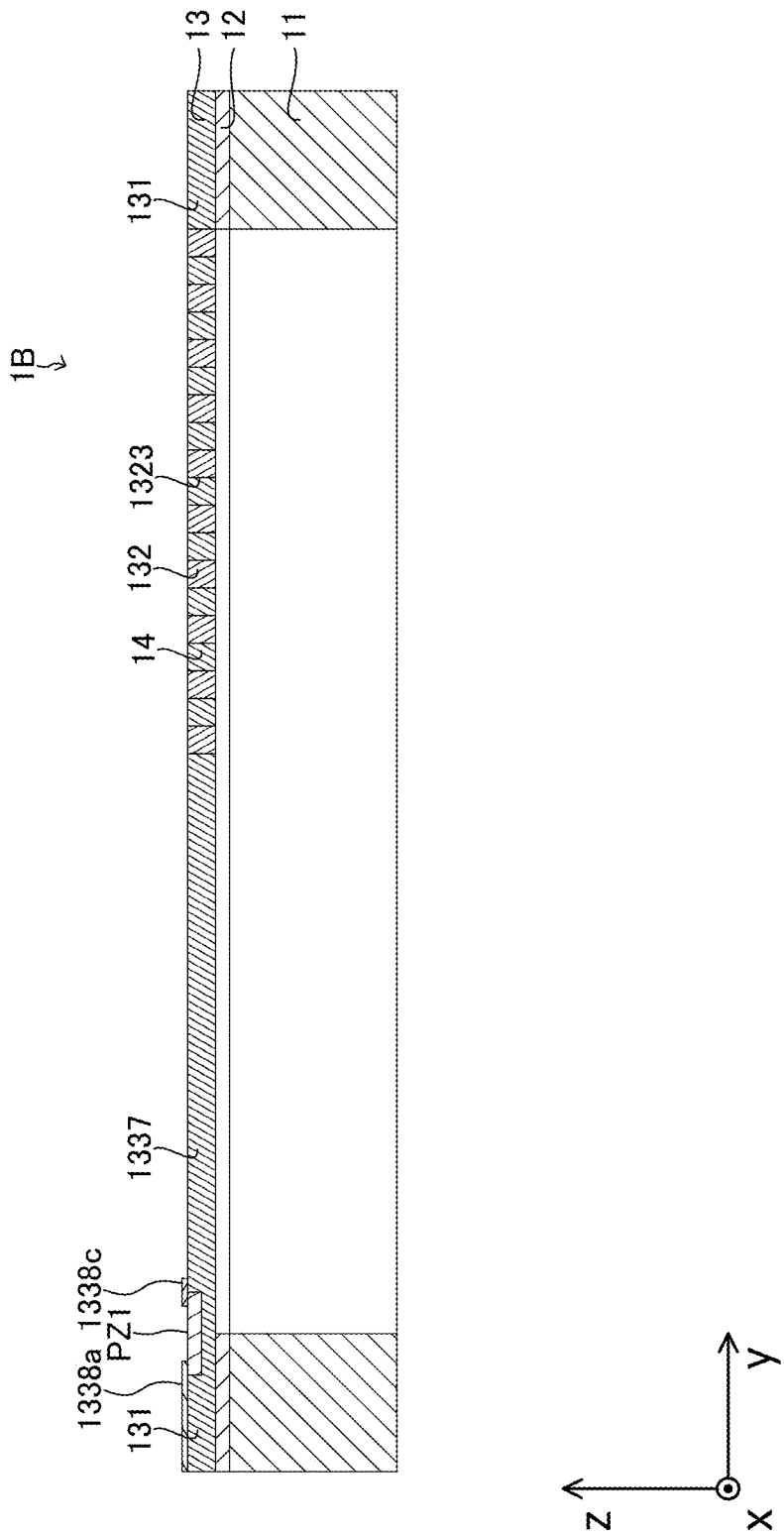
FIG. 36 is a cross-sectional view of the sensor cut by a plane represented by an XXXVI-XXXVI line of FIG. 35.

FIG. 33 is a right front upper perspective view of the sensor 1B. FIG. 34 is a right front upper perspective view of the sensor 1B in a state where the sensor 1B is disassembled. FIG. 35 is a plan view of the sensor 1B. FIG. 36 is a view of the cross section of the sensor 1B cut by a plane represented by an XXXVI-XXXVI line of FIG. 35 as viewed in the negative direction of the x-axis.

As illustrated in FIG. 35, the third layered body includes a frame 131, a body member 132, and a detection member 133.

The frame 131 has a similar configuration to the frame 131 of the first embodiment.

The body member 132 has a rectangular-like shape having long sides extending in the x-axis direction and short sides extending in the y-axis direction. The body member 132 may have a square-like shape. The length of the body member 132 in the y-axis direction is shorter than the length of the hole of the frame 131 in the y-axis direction. In this example, the length of the body member 132 in the y-axis direction is a length of ⅓ to ⅔ of the length of the hole of the frame 131 in the y-axis direction. For example, the length of the body member 132 in the y-axis direction is 220 µm.

The length of the body member 132 in the x-axis direction is shorter than the length of the hole of the frame 131 in the x-axis direction. In this example, the length of the body member 132 in the x-axis direction is 300 µm. Both ends in the x-axis direction of the body member 132 are separated from the frame 131.

The body member 132 is in contact with the frame 131 at the first end 1321 in the positive direction of the y-axis of the body member 132. In other words, in the body member 132, the first end 1321 in the positive direction of the y-axis of the body member 132 is supported by the frame 131.

The central portion in the x-axis direction in the second end 1322 in the negative direction of the y-axis of the body member 132 is in contact with the frame 131 through the detection member 133. A part of the body member 132 other than the central portion in the x-axis direction in the second end 1322 in the negative direction of the y-axis is separated from the frame 131.

The body member 132 has a space formation portion 1323 that forms the storage space. The storage space opens at both end faces in the z-axis direction (in other words, the thickness direction of the body member 132) of the body member 132. The storage space includes slit-like holes extending in the x-axis direction. In this example, each hole included in the storage space is a through hole that penetrates the body member 132 in the z-axis direction. In this example, the holes included in the storage space are arranged at equal intervals along the y-axis direction.

For example, the length in the y-axis direction of each hole included in the storage space is a length of 0.1 µm to 10 µm. In this example, the length in the y-axis direction of each hole included in the storage space is 1 µm. For example, the interval in the y-axis direction between the holes included in the storage space is a length of 0.1 µm to 10 µm. In this example, the interval in the y-axis direction between the holes included in the storage space is 1 µm. In this example, the number of the holes included in the storage space is 80. Note that in FIGS. 33 to 36, the holes included in the storage space are illustrated in an enlarged manner in the y-axis direction. Therefore, in FIGS. 33 to 36, the holes included in the storage space are illustrated in a reduced number manner.

In this example, the length of the slit-like holes included in the storage space in the x-axis direction is 280 µm.

The detection member 133 includes a supported member 1337, a first wiring 1338a, a second wiring 1338b, and a third wiring 1338c.

As illustrated in FIG. 35, the supported member 1337 has a strip-like shape extending in the y-axis direction. The end in the negative direction of the y-axis of the supported member 1337 is in contact with the frame 131. The end in the positive direction of the y-axis of the supported member 1337 is in contact with the central portion in the x-axis direction in the second end 1322 of the body member 132. In other words, the supported member 1337 extends from the second end 1322 of the body member 132 to the negative direction of the y-axis. The tip of the supported member 1337 is supported by the frame 131.

The width (in other words, the length of the supported member 1337 in the x-axis direction) of the supported member 1337 is narrower than the width of the body member 132 (in other words, the length of the body member 132 in the x-axis direction). In this example, the width of the supported member 1337 is 40 µm.

The supported member 1337 includes a pair of piezoresistive elements PZ1, PZ2 which are located in the end portion (in other words, the portion supported by the frame 131) in the negative direction of the y-axis of the supported member 1337. In this example, each piezoresistive element PZ1, PZ2 extends to the end portion in the positive direction of the y-axis of the frame 131. The piezoresistive elements PZ1, PZ2 are separated from each other in the x-axis direction.

Each piezoresistive element PZ1, PZ2 is an element whose electric resistance changes depending on the stress applied to respective piezoresistive element PZ1, PZ2. In other words, each piezoresistive element PZ1, PZ2 is an element having a piezoresistive effect.

As illustrated in FIG. 36, similarly to the piezoresistive element PZ of the first embodiment, each piezoresistive element PZ1, PZ2 is embedded in the supported member 1337 so as to be exposed at the end face in the positive direction of the z-axis of the supported member 1337.

Each of the first wiring 1338a, the second wiring 1338b, and the third wiring 1338c is made of conductor (aluminum in this example). As illustrated in FIGS. 35 and 36, the first wiring 1338a, the second wiring 1338b, and the third wiring 1338c are laid on the end face in the positive direction of the z-axis of the third layered body 13.

For example, the thickness (in other words, the length in the z-axis direction of each of the first wiring 1338a, the second wiring 1338b, and the third wiring 1338c) of each of the first wiring 1338a, the second wiring 1338b, and the third wiring 1338c is a thickness of 10 nm to 1 μm. In this example, the thickness of each of the first wiring 1338a, the second wiring 1338b, and the third wiring 1338c is 100 nm.

In this example, a part of the exposed surface of the first wiring 1338a, the second wiring 1338b, and the third wiring 1338c is covered with an oxide thin film (not illustrated). For example, the other part, which is not covered with the oxide thin film, of the exposed surface of the first wiring 1338a, the second wiring 1338b, and the third wiring 1338c may be used as terminals for connection.

As illustrated in FIG. 35, one end portion of the first wiring 1338a is in contact with the end portion in the negative direction of the y-axis of the piezoresistive element PZ1. The other end portion of the first wiring 1338a is located at the outer edge of the frame 131. In other words, the first wiring 1338a extends from the end portion in the negative direction of the y-axis of the piezoresistive element PZ1 to the outer edge of the frame 131.

One end portion of the second wiring 1338b is in contact with the end portion in the negative direction of the y-axis of the piezoresistive element PZ2. The other end portion of the second wiring 1338b is located at the outer edge of the frame 131. In other words, the second wiring 1338b extends from the end portion in the negative direction of the y-axis of the piezoresistive element PZ2 to the outer edge of the frame 131.

One end portion of the third wiring 1338c is in contact with the end portion in the positive direction of the y-axis of the piezoresistive element PZ1. The other end portion of the third wiring 1338c is in contact with the end portion in the positive direction of the y-axis of the piezoresistive element PZ2. In other words, the third wiring 1338c extends from the end portion in the positive direction of the y-axis of the piezoresistive element PZ1 to the end portion in the positive direction of the y-axis of the piezoresistive element PZ2.

Similarly to the volume change body 14 of the first embodiment, the volume change body 14 is supported by the body member 132 so as to be stored in the storage space of the body member 132.

Furthermore, the first wiring 1338a and the second wiring 1338b are connected to an electric circuit similar to that of the first embodiment.

As described above, according to the sensor 1B of the third embodiment, operations and effects similar to those of the sensor 1 of the first embodiment are accomplished.

Further, in the sensor 1B of the third embodiment, the detection member 133 includes the supported member 1337, whose tip is supported, that extends from the second end 1322 to the first direction (in this example, the y-axis direction). Further, the detection member 133 detects the stress caused by the change in the volume of the volume change body 14 at the tip of the supported member 1337.

According to this, the supported member 1337 vibrates in the thickness direction of the supported member 1337 (the z-axis direction in this example) by bending.

By the way, the greater the compressive stress occurs in the supported member 1337, the lower the resonance frequency of the supported member 1337 becomes. Also, the greater the tensile stress occurs in the supported member 1337, the higher the resonance frequency of the supported member 1337 becomes. On the other hand, the compressive stress or the tensile stress caused by the change in the volume of the volume change body 14 in the supported member 1337 changes. Therefore, the resonance frequency of the supported member 1337 changes due to the change in the volume of the volume change body 14.

As described above, according to the sensor 1B, the change in the volume of the volume change body 14 can be reflected with high accuracy in the frequency of the vibration of the supported member 1337.

Furthermore, according to the sensor 1B, the detection member 133 can detect the change with time in the stress caused by the vibration of the supported member 1337 at the tip (in other words, the portion where the supported member 1337 is supported by the frame 131) of the supported member 1337. Therefore, the detection member 133 can detect the frequency of the vibration of the supported member 1337. As a result, the target can be detected with high accuracy.

Further, in the sensor 1B of the third embodiment, the width of the supported member 1337 is narrower than the length of the body member 132 in the second direction (the x-axis direction in this example) orthogonal to the first direction.

According to this, the stress caused by the change in the volume of the volume change body 14 in the supported member 1337 can be larger than the stress occurring in the body member 132. Therefore, the change in the volume of the volume change body 14 can be reflected with high accuracy in the stress occurring in the supported member 1337. Further, the vibration in the thickness direction of the supported member 1337 can be larger than the vibration in the thickness direction of the body member 132. As a result, the target can be detected with high accuracy.

In the sensor 1B of the third embodiment, the volume change body 14 is entirely stored in the storage space of the body member 132. In the sensor 1B of a first modified example of the third embodiment, a part of the volume change body 14 may be stored in the storage space, and the other part of the volume change body 14 may cover at least a part of both end faces in the thickness direction of the body member 132. For example, the volume change body 14 may cover an area in which the space formation portion 1323 exists in both end faces in the thickness direction of the body member 132.

In the sensor 1B of the third embodiment, the body member 132 is in contact with the frame 131 through the supported member 1337 at the second end 1322. In the sensor 1B of a second modified example of the third embodiment, the body member 132 may be in contact with the frame 131 at the second end 1322 through multiple supported members. Alternatively, the body member 132 may be in contact with the frame 131 at the first end 1321 through one or more supported members.

As illustrated in FIG. 36, in the sensor 1B of the third embodiment, each hole included in the storage space formed by the space formation portion 1323 of the body member 132 is a through hole that penetrates the body member 132 in the thickness direction of the body member 132. Alternatively, in the sensor 1B of a third modified example of the third embodiment, each hole included in the storage space formed by the space formation portion 1323 of the body member 132 may be a bottomed hole that opens at the end face in the positive direction of the z-axis of the body member 132.

Alternatively, in the sensor 1B of a fourth modified example of the third embodiment, each hole included in the storage space formed by the space formation portion 1323 of the body member 132 may be a first hole that is bottomed and opens at the end face in the positive direction of the z-axis of the body member 132, or a second hole that is bottomed and opens at the end face in the negative direction of the z-axis of the body member 132. For example, the holes included in the storage space may be in such a manner that the first hole and the second hole are alternately arranged along the y-axis direction.

As illustrated in FIG. 36, in the sensor 1B of the third embodiment, the number of holes included in the storage space formed by the space formation portion 1323 of the body member 132 is 2 or more. In the sensor 1B of a fifth modified example of the third embodiment, the number of holes included in the storage space formed by the space formation portion 1323 of the body member 132 may be one. For example, the space formation portion 1323 of the body member 132 may have a comb teeth-like shape in the plan view of the body member 132 (in other words, when the body member 132 is viewed in the negative direction of the z-axis).

As illustrated in FIG. 35, in the sensor 1B of the third embodiment, the storage space formed by the space formation portion 1323 of the body member 132 includes the slit-like holes. Alternatively, in the sensor 1B of a sixth modified example of the third embodiment, the space formation portion 1323 of the body member 132 may have a mesh-like shape in the plan view of the body member 132 (in other words, when the body member 132 is viewed in the negative direction of the z-axis). For example, each hole included in the storage space may be a regular hexagon in the plan view of the body member 132. Each hole included in the storage space may have a shape (circular, elliptical, or polygonal shape other than regular hexagon) other than regular hexagon in the plan view of the body member 132.

Alternatively, the sensor 1B of a seventh modified example of the third embodiment may detect the vibration of the supported member 1337 using light instead of stress. In this case, for example, the sensor 1B may include a laser Doppler vibrometer and may detect the vibration of the supported member 1337 using the laser Doppler vibrometer.

Alternatively, the sensor 1B of an eighth modified example of the third embodiment may include a mechanism or a device for vibrating the supported member 1337.

In the sensor 1B of the third embodiment, when the volume of the volume change body 14 increases, the compressive stress occurs in the supported member 1337, while when the volume of the volume change body 14 decreases, the tensile stress occurs in the supported member 1337. Alternatively, as illustrated in FIG. 37, the sensor 1B of a ninth modified example of the third embodiment may be configured so that the tensile stress occurs in the supported member 1337 when the volume of the volume change body 14 increases, and the compressive stress occurs in the supported member 1337 when the volume of the volume change body 14 decreases.

Figure 37:
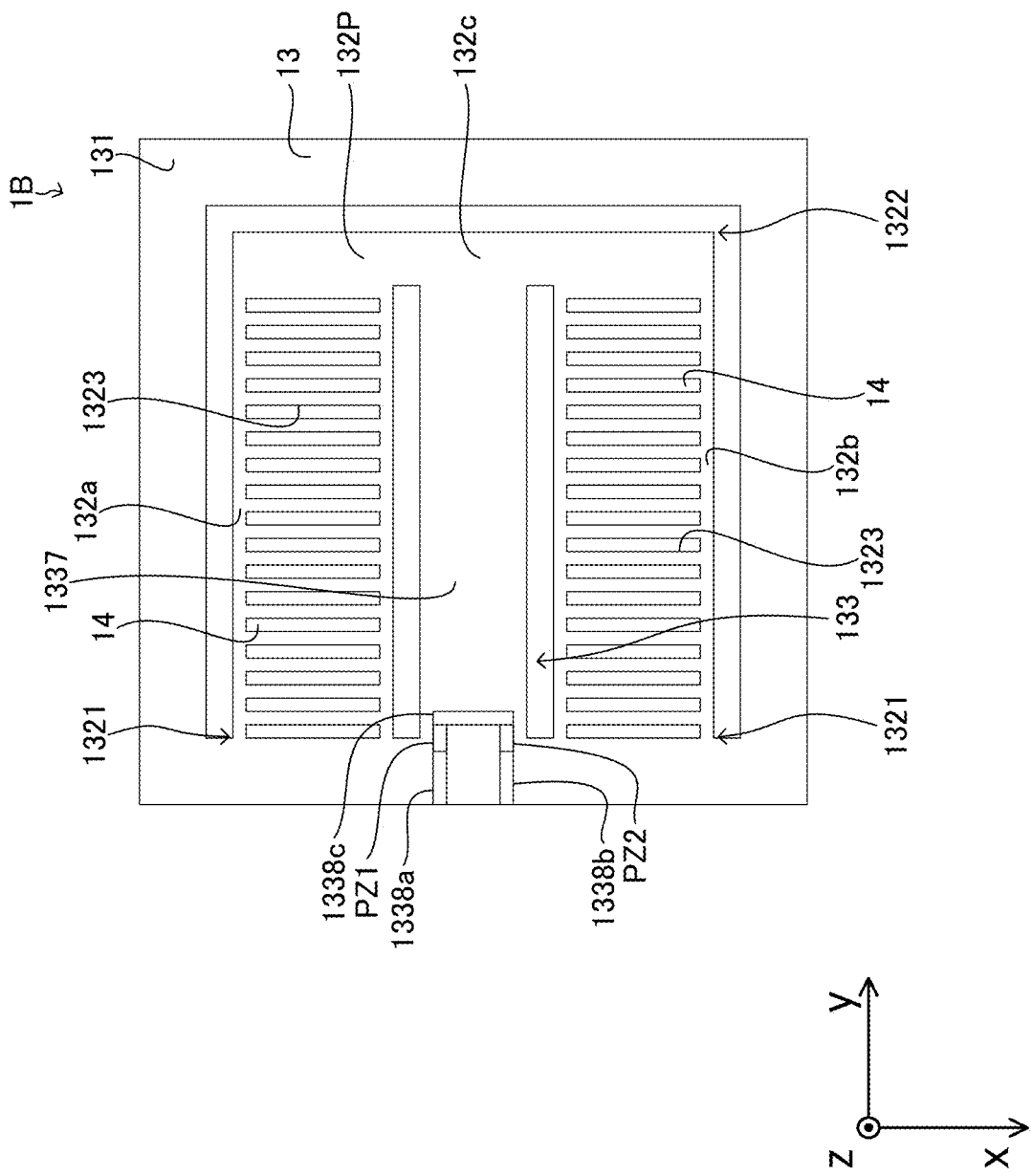
FIG. 37 is a plan view of a sensor of a ninth modified example of the third embodiment.

In this case, as illustrated in FIG. 37, the body member 132P includes a pair of extension members 132a, 132b and a connection portion 132c.

Each extension member 132a, 132b has a rectangular-like shape having long sides extending in the y-axis direction and short sides extending in the x-axis direction. Note that each extension member 132a, 132b may have a square-like shape. The length in the y-axis direction of each extension member 132a, 132b is shorter than the length in the y-axis direction of the hole of the frame 131. For example, the length in the y-axis direction of each extension member 132a, 132b is 290 µm.

The length in the x-axis direction of each extension member 132a, 132b is shorter than half the length in the x-axis direction of the hole of the frame 131. In this example, the length in the x-axis direction of each extension member 132a, 132b is 60 µm.

The extension members 132a, 132b are separated from each other in the x-axis direction. The end in the negative direction of the x-axis of the extension member 132a is separated from the frame 131. The end in the positive direction of the x-axis of the extension member 132b is separated from the frame 131.

The extension members 132a, 132b are in contact with the frame 131 at the first end 1321 in the negative direction of the y-axis of the extension members 132a, 132b. In other words, the extension members 132a, 132b are supported by the frame 131 at the first end 1321 in the negative direction of the y-axis of the extension members 132a, 132b, respectively.

Similarly to the body member 132 of the third embodiment, each extension member 132a, 132b has a space formation portion 1323.

The connection portion 132c has a rectangular-like shape having long sides extending in the x-axis direction and short sides extending in the y-axis direction. The end in the negative direction of the x-axis of the connection portion 132c is in contact with the end portion in the positive direction of the y-axis in the end in the positive direction of the x-axis of the extension member 132a. The end in the positive direction of the x-axis of the connection portion 132c is in contact with the end portion in the positive direction of the y-axis in the end in the negative direction of the x-axis of the extension member 132b. Both ends in the y-axis direction of the connection portion 132c are separated from the frame 131.

With such a configuration, the connection portion 132c is in contact with each second end 1322 in the positive direction of the y-axis of the extension members 132a, 132b.

The supported member 1337 extends in the y-axis direction between the extension members 132a, 132b. The end in the negative direction of the y-axis of the supported member 1337 is in contact with the frame 131. The end in the positive direction of the y-axis of the supported member 1337 is in contact with the central portion in the x-axis direction in the end in the negative direction of the y-axis of the connection portion 132c. In other words, the supported member 1337, whose tip is supported by the frame 131, extends from the second end 1322 of the body member 132P to the negative direction of the y-axis.

The width of the supported member 1337 (in other words, the length in the x-axis direction of the supported member 1337) is narrower than the width of each extension member 132a, 132b (in other words, the length in the x-axis direction of each extension member 132a, 132b). In this example, the width of the supported member 1337 is 40 µm.

The end in the negative direction of the x-axis of the supported member 1337 is separated from the extension member 132a in the x-axis direction. The end in the positive direction of the x-axis of the supported member 1337 is separated from the extension member 132b in the x-axis direction.

With such a configuration, according to the sensor 1B of the ninth modified example of the third embodiment, operations and effects similar to those of the sensor 1B of the third embodiment are accomplished.

Furthermore, according to the sensor 1B of the ninth modified example of the third embodiment, the supported member 1337 can be lengthened. As a result, the vibration of the supported member 1337 can be detected with high accuracy. As a result, the target can be detected with high accuracy.

In the sensor 1B of the third embodiment, the corner portion of the storage space formed by the space formation portion 1323 of the body member 132 may have a curved shape or a chamfered shape.

Note that the sensor 1B of the third embodiment may be applied to a detecting device that detects each of different targets. In this case, the detecting device preferably includes a plurality of the sensors 1B having different sensing materials. For example, the plurality of sensors 1B may be arranged in a grid pattern.

The present invention is not limited to the above embodiments. For example, various modifications that can be understood by those skilled in the art may be added to the above embodiments without departing from the spirit of the present invention.

The present invention is based upon and claims the benefit of priority of the prior Japanese Patent application No. 2018-63978 filed on Mar. 29, 2018, and the prior Japanese Patent application No. 2018-63987, filed on Mar. 29, 2018, the entire contents of which are incorporated herein by reference.

The invention claimed is:

1. A sensor comprising:
a body member that has a flat plate-like shape, a first end in a first direction being supported, and a storage space opening at at least one of end faces in a thickness direction;
a volume change body, whose volume changes depending on an amount of a target, that is supported by the body member so that at least a part of the volume change body is stored in the storage space; and
a detection member that is in contact with a second end in the first direction of the body member and detects stress caused by the change in the volume of the volume change body.

2. The sensor according to claim 1, wherein the storage space opens at both of the end faces in the thickness direction.

3. The sensor according to claim 1 or 2, wherein the storage space includes a slit-like hole extending in a second direction orthogonal to the first direction.

4. The sensor according to claim 3, wherein the storage space includes a plurality of the holes, and the plurality of holes are arranged along the first direction.

5. The sensor according to claim 1, wherein the detection member includes:
an extension member that extends from the second end to a position different from a position in contact with the second end in a second direction orthogonal to the first direction; and
a first supported member, whose tip is supported, that extends from a tip portion of the extension member, and
the detection member detects the stress at the first supported member.

6. The sensor according to claim 5, wherein the first supported member has a narrower width than a width of the extension member.

7. The sensor according to claim 5, wherein a central portion of the first supported member in an extension direction, in which the first supported member extends, has a narrower width than a width of each end portion of the first supported member in the extension direction, and the detection member detects the stress at the central portion of the first supported member.

8. The sensor according to claim 1, wherein the detection member includes a first supported member, whose tip is supported, that extends from the second end in the first direction, and the detection member detects the stress at the first supported member.

9. The sensor according to claim 8, wherein the first supported member has a narrower width than a length of the body member in a second direction orthogonal to the first direction.

10. The sensor according to claim 1, wherein the detection member includes a supported member, whose tip is supported, that extends from the second end in the first direction, and the detection member detects the stress at the tip.

11. The sensor according to claim 10, wherein the supported member has a narrower width than a length of the body member in a second direction orthogonal to the first direction.

12. The sensor according to claim 1, wherein the volume change body is made of material having a lower elastic modulus than an elastic modulus of the body member.

13. The sensor according to claim 12, wherein the body member has the elastic modulus larger than or equal to twice the elastic modulus of the volume change body.

14. The sensor according to claim 12, wherein the volume change body has a change in the elastic modulus before and after the change in the volume larger than the body member.

15. The sensor according to claim 1, wherein the volume change body includes a material that adsorbs, dissolves, or diffuses molecules by interacting with the molecules.

16. The sensor according to claim 1, wherein the volume change body includes a material that polymerizes by absorbing heat or light.

17. The sensor according to claim 1, wherein the volume change body includes a porous body, or a foam.

18. The sensor according to claim 1, wherein the storage space has a corner portion having a curved shape or a chamfered shape.

19. A detection method including:
changing a volume of a volume change body depending on an amount of a target, the volume change body being supported by a body member so that at least a part of the volume change body is stored in a storage space, the body member having a flat plate-like shape, a first end in a first direction being supported, and the storage space opening at at least one of end faces in a thickness direction; and
detecting stress caused by the change in the volume of the volume change body in a detection member that is in contact with a second end in the first direction of the body member.

20. A sensor manufacturing method including:
forming a storage space in a first member, the first member having a flat plate-like shape and a first end in a first direction being supported, the storage space opening at at least one of end faces in a thickness direction, and providing an element in a second member in contact with a second end in the first direction of the first member, the element detecting stress; and storing at least a part of the volume change body, whose volume changes depending on an amount of a target, in the storage space so as to be supported by the first member.

* * * * *